(12) United States Patent
Haynes et al.

(10) Patent No.: US 8,173,193 B2
(45) Date of Patent: *May 8, 2012

(54) PRODUCTION OF STABILIZED WHOLE GRAIN FLOUR AND PRODUCTS THEREOF

(75) Inventors: Lynn C. Haynes, Morris Plains, NJ (US); Harry I. Levine, Morris Plains, NJ (US); Louise Slade, Morris Plains, NJ (US); Ning Zhou, East Hanover, NJ (US); James Manns, Stockholm, NJ (US); Diane Gannon, Perrysburg, OH (US); Edward D. Howey, Toledo, OH (US); Mihaelos N. Mihalos, Palisades Park, NJ (US); Charles C. Epperson, Perrysburg, OH (US); Sarwat Gabriel, Wood Dale, IL (US); Domenico Cassone, Branchburg, NJ (US); Jeanny E. Zimeri, Budd Lake, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 399 days.

This patent is subject to a terminal disclaimer.

(21) Appl. No.: 12/302,665

(22) PCT Filed: Jun. 15, 2007

(86) PCT No.: PCT/US2007/014053
§ 371 (c)(1),
(2), (4) Date: Apr. 28, 2009

(87) PCT Pub. No.: WO2007/149320
PCT Pub. Date: Dec. 27, 2007

(65) Prior Publication Data
US 2009/0238935 A1    Sep. 24, 2009

Related U.S. Application Data

(63) Continuation-in-part of application No. 11/454,758, filed on Jun. 16, 2006.

(51) Int. Cl.
*A21D 2/00* (2006.01)
(52) U.S. Cl. ........ 426/622; 426/462; 426/508; 426/626; 426/618
(58) Field of Classification Search .................. 426/622
See application file for complete search history.

(56) References Cited

U.S. PATENT DOCUMENTS 580,834 A    4/1897 Wright
(Continued)

FOREIGN PATENT DOCUMENTS

CA    1247926    1/1989
(Continued)

OTHER PUBLICATIONS

Heiss, R., "Origin and Prevention of Undesirable Flavor Changes in Oat Products During Storage," *Food Technology*, pp. 688-692 (1958).

(Continued)

*Primary Examiner* — Elizabeth Gwartney
(74) *Attorney, Agent, or Firm* — Greenblum & Bernstein, P.L.C.

(57) ABSTRACT

A stabilized bran component and a stabilized whole grain flour containing the component are produced by subjecting a bran-enriched coarse fraction which contains bran, germ and starch to grinding or milling to reduce grittiness of the coarse fraction without substantially damaging the starch due to abrasion. The coarse fraction may be stabilized by heating to substantially reduce the lipase and lipoxygenase activity of the coarse fraction without substantial gelatinization of the starch. High levels of natural antioxidants and vitamins are retained while avoiding substantial acrylamide formation during the stabilization. The stabilized coarse fraction or stabilized bran component may be combined with a fine fraction which contains predominantly endosperm to obtain a stabilized whole grain flour. The stabilized whole grain flours and the stabilized bran component exhibit extended shelf life and may be used for making baked goods, such as cookies, with desirable oven spread, and a non-gritty mouthfeel.

82 Claims, 7 Drawing Sheets

U.S. PATENT DOCUMENTS

| | | | |
|---|---|---|---|
| 876,662 A | 1/1908 | Simons |
| 897,854 A | 9/1908 | Schluter, Jr. |
| 2,303,448 A | 12/1942 | Fisher et al. |
| 2,428,090 A | 9/1947 | Naeher et al. |
| 2,585,978 A | 2/1952 | Van Atta |
| 2,670,291 A | 2/1954 | Melnick |
| 2,725,300 A | 11/1955 | Cryns |
| 2,745,748 A | 5/1956 | McCashen |
| 2,754,212 A | 7/1956 | Wiseman |
| 3,036,919 A | 5/1962 | Kretschmer, Jr. et al. |
| 3,342,607 A | 9/1967 | Hickey |
| 3,428,461 A | 2/1969 | Hatton et al. |
| 3,474,722 A | 10/1969 | Watson |
| 3,477,855 A | 11/1969 | Freeman |
| 3,490,917 A | 1/1970 | Doe et al. |
| 3,498,796 A | 3/1970 | Bailey |
| 3,519,441 A | 7/1970 | Ferrara et al. |
| 3,620,764 A | 11/1971 | Watkins |
| 3,640,206 A | 2/1972 | Moisescu et al. |
| 3,694,220 A | 9/1972 | Pierce |
| 3,734,752 A | 5/1973 | Headley |
| 3,783,164 A | 1/1974 | Galle |
| 3,895,121 A | 7/1975 | Huessy |
| 3,962,479 A | 6/1976 | Coldren |
| 3,974,298 A | 8/1976 | Cauvain et al. |
| 4,165,392 A | 8/1979 | Kawai et al. |
| 4,299,848 A | 11/1981 | De Stefanis et al. |
| 4,329,371 A | 5/1982 | Hart |
| 4,377,601 A | 3/1983 | Dreese et al. |
| 4,413,018 A | 11/1983 | Webster |
| 4,431,674 A | 2/1984 | Fulger |
| 4,435,429 A | 3/1984 | Burrows et al. |
| 4,435,430 A | 3/1984 | Fulger et al. |
| 4,438,146 A | 3/1984 | Colby et al. |
| 4,465,447 A | 8/1984 | Cheigh et al. |
| 4,497,840 A | 2/1985 | Gould et al. |
| 4,500,558 A | 2/1985 | Fulger |
| 4,524,080 A | 6/1985 | Sugisawa et al. |
| 4,551,347 A | 11/1985 | Karwowski |
| 4,590,088 A | 5/1986 | Karwowski |
| 4,603,055 A | 7/1986 | Karwowski et al. |
| 4,604,289 A | 8/1986 | Spanier et al. |
| 4,614,664 A | 9/1986 | Karwowski |
| 4,664,931 A | 5/1987 | Karwowski |
| 4,710,386 A | 12/1987 | Fulger et al. |
| 4,737,371 A | 4/1988 | Bookwalter |
| 4,756,921 A | 7/1988 | Calandro et al. |
| 4,759,942 A | 7/1988 | Von Fulger |
| 4,824,033 A | 4/1989 | Buehler |
| 4,834,988 A | 5/1989 | Karwowski et al. |
| 4,956,190 A | 9/1990 | Chawan et al. |
| 5,063,079 A | 11/1991 | Ferrara et al. |
| 5,066,506 A | 11/1991 | Creighton et al. |
| 5,132,133 A | 7/1992 | Huber et al. |
| 5,169,660 A | 12/1992 | Collins et al. |
| 5,176,931 A | 1/1993 | Herbster |
| 5,182,127 A | 1/1993 | Schwab et al. |
| 5,194,276 A | 3/1993 | Hoseney et al. |
| 5,198,255 A | 3/1993 | Schwab et al. |
| 5,352,473 A | 10/1994 | Chiqurupati et al. |
| 5,362,510 A | 11/1994 | Mizoguchi et al. |
| 5,376,390 A | 12/1994 | Hammond |
| 5,382,441 A | 1/1995 | Lentz et al. |
| 5,387,430 A | 2/1995 | Tkac |
| 5,389,388 A | 2/1995 | Gusek |
| 5,393,547 A | 2/1995 | Balaban et al. |
| 5,413,800 A | 5/1995 | Bell et al. |
| 5,433,966 A | 7/1995 | Wolt et al. |
| 5,464,639 A | 11/1995 | Clyde et al. |
| 5,523,109 A | 6/1996 | Hellweg et al. |
| 5,614,242 A | 3/1997 | Fox |
| 5,759,602 A | 6/1998 | Kobussen et al. |
| 5,773,066 A | 6/1998 | Satake et al. |
| 5,972,413 A | 10/1999 | Whitney et al. |
| 6,063,424 A | 5/2000 | Wells et al. |
| 6,083,547 A | 7/2000 | Katta et al. |
| 6,086,935 A | 7/2000 | Delrue et al. |
| 6,098,307 A | 8/2000 | Pikus et al. |
| 6,372,281 B1 | 4/2002 | Metzger et al. |
| 6,383,547 B1 | 5/2002 | Delrue et al. |
| 6,471,149 B1 | 10/2002 | Bohm |
| 6,497,909 B1 | 12/2002 | Metzger |
| 6,610,341 B2 | 8/2003 | Vinelli |
| 6,616,957 B1 | 9/2003 | Wilhelm et al. |
| 6,706,305 B2 | 3/2004 | Wolt et al. |
| 7,258,888 B2 | 8/2007 | Dreese et al. |
| 7,419,694 B2 | 9/2008 | Korolchuk |
| 7,425,344 B2 | 9/2008 | Korolchuk et al. |
| 2003/0082290 A1 | 5/2003 | Dull |
| 2003/0087012 A1 | 5/2003 | Metzger |
| 2003/0108652 A1 | 6/2003 | Monsalve-Gonzalez et al. |
| 2005/0037391 A1 | 2/2005 | Kragh et al. |
| 2005/0136173 A1 | 6/2005 | Korolchuk |
| 2005/0136174 A1 | 6/2005 | Korolchuk et al. |
| 2005/0255219 A1 | 11/2005 | Dreese et al. |
| 2006/0073240 A1 | 4/2006 | David et al. |
| 2006/0073258 A1 | 4/2006 | Korolchuk |
| 2006/0246198 A1 | 11/2006 | Mingus et al. |
| 2006/0286269 A1 | 12/2006 | Shah et al. |
| 2007/0082092 A1 | 4/2007 | David et al. |
| 2007/0104855 A1 | 5/2007 | Arndt et al. |
| 2007/0259091 A1 | 11/2007 | Dreese et al. |
| 2007/0269579 A1 | 11/2007 | Mingus et al. |
| 2007/0292583 A1 | 12/2007 | Haynes et al. |
| 2008/0131582 A1 | 6/2008 | Karwowski et al. |
| 2008/0152781 A1 | 6/2008 | Dreese |
| 2008/0171114 A1 | 7/2008 | Castillo Rodriguez et al. |
| 2008/0311274 A1 | 12/2008 | Xu et al. |

FOREIGN PATENT DOCUMENTS

| | | |
|---|---|---|
| CA | 2047610 | 1/1992 |
| CA | 2082602 | 5/1993 |
| CA | 2077706 | 3/1996 |
| CA | 2087047 | 10/1996 |
| CA | 2141974 | 6/1998 |
| CA | 2384361 | 3/2001 |
| CA | 2563654 | 1/2005 |
| CA | 2553287 | 6/2005 |
| DE | 41 37 161 | 5/1993 |
| EP | 0117044 | 8/1984 |
| EP | 0105640 B1 | 11/1987 |
| EP | 0338787 | 10/1989 |
| GB | 558141 | 12/1943 |
| GB | 1561190 | 2/1980 |
| JP | 57-138352 | 8/1982 |
| JP | 59-183667 | 10/1984 |
| JP | 63-116657 | 5/1988 |
| JP | 1273555 | 11/1989 |
| JP | 2005-168451 | 6/2005 |
| WO | 99/11144 | 3/1999 |
| WO | 01/10244 | 2/2001 |
| WO | 2004/086870 | 10/2004 |
| WO | 2005/007749 | 1/2005 |
| WO | 2005/058044 | 6/2005 |
| WO | 2005/110117 | 11/2005 |
| WO | 2005/112663 | 12/2005 |
| WO | 2006/026558 | 3/2006 |
| WO | 2007/136891 | 11/2007 |
| WO | 2007/137106 | 11/2007 |
| WO | 2007/149320 | 12/2007 |

OTHER PUBLICATIONS

Hitchcock, Susan Tyler, "Nature's Almost Perfect Package," The Washington Post, pp. L1-L2 (Oct. 2, 1983).

Kent, N.L., "Recent Research On Oatmeal," *Cereal Science Today*, pp. 83-91 (Apr. 1957).

Kent, N.L., *Technology of Cereals*, 2$^{nd}$ ed. Pergamon Press, pp. 1, 234-237, 241-255 (1975).

Kent, N.L., *Technology of Cereals*, 4th ed. Pergamon Press, "Dry Milling Technology," pp. 129-168 (1994).

"Stone Ground Renaissance," The Washington Post, pp. L1-L2 (Oct. 2, 1983).

"The Secrets of Storage and Flavor," The Washington Post, pp. L1-L2 (Oct. 2, 1983).

Renwick, Ethel H., *The Real Food Cookbook*, Zondervan Publ. House, "Whole-Grain Flours and Meals," pp. 128-152 (1978).

Pomerantz, Y., Wheat: Chemistry and Technology vol. II, publ. American Assoc. of Cereal Chemists. Inc., pp. 24-27 (1988).

Pinelo, M. et al, "A thermal treatment to increase the antioxidant capacity of natural phenols: catechin, resveratrol and grape extract cases," Eur. Food Res. Technol (2005) 221:284-290.

Buhler AG Brochure, "Flour Heat Treatment," MU 11199 en (Mar. 2001).

Siemer Milling Company "Gold Standard Flour, NutraBran, NutraGerm, Enzyme Deactivated Flour, Low Micro Flour," www/siemermilling.com/html/heat-treated.html, (May 31, 2007), 4 pages.

Knehr, E., ed. "Going With the Grain", pp. 1-7 (Jun. 1, 1998).

Hoseney, R. Carl, *Principles of Cereal Science and Technology*, pp. 136-179 (1986).

Canadian Harvest, Product Description Sheets for Harvest Oat Bread, Low-Fat, High Fiber Granola, Wheat Germ Snickerdoodle, Oat Healthy Waffles, and Low-Fat Raison Bran Muffins (1999), 6 pages.

Abstract of Yondem-Makasclog-lu, et al., "Use of a spouted bed to improve the storage stability of wheat germ followed in paper and polyethylene packages," J. Sci. Food & Agriculture, vo. 85, No. 8 (Jun. 2005), pp. 1329-1336.

SunOpta Ingredients Group, Ingredients for Success, "Stabilized Brans" (no date).

Villanueva, R. M. et al., "Split Milling of Wheat for Diverse End-Use Products," Cereal Foods World, vol. 46, No. 8 pp. 363-369 (Aug. 2001).

Nelson, A. L., "Properties of High-Fiber Ingredients", Cereal Foods World, vol. 46, No. 3 (Mar. 2001), pp. 93-97.

Ambalamaatil, S., et al., "Milling and Quality Evaluation of Canadian Hard White Spring Wheats," Cereal Foods World, vol. 47, No. 7 (Jul.-Aug. 2002), pp. 319-327.

Rao, P. Haridas, et al, "Studies on Stabilization of Wheat Germ," IWT vol. 13, No. 6 (1980), pp. 302-308.

Hakansson, B., et al., "The Effect of Thermal Inactivation of Lipoxygenase on the Stability of Vitamin E in Wheat," J. Cereal Science, 12 (1990) 177-185.

"Building a Better Breakfast Cereal,", ed. Kuntz, Lynn A., *Food Product Design*, Weeks Publishing Co., (Apr. 1988), 14 pages.

Littleton Grist Mill web info, excerpts from "The Wellness Encyclopedia of Good and Nutrition," ed. S. Margen, M.D., Random House, 1992, and "The Bread and Circus Whole Food Bible," ed. Christopher Kilham, Addison-Wesley, (1991), 4 pages.

"Stabilized Wheat Germ Retains Natural Antioxidant," *Prepared Foods*, Fran Labell, ed., (Jan. 1994), p. 61.

Lakkakula, N. Rao, et al., "Rice bran stabilization and rice bran oil extraction using ohmic heating," Bioresource Technology 92 (2004) 157-161.

da Silva, Marco A., et al., "Prevention of hydrolytic rancidity in rice bran," J. Food Engineering, 75 (2006) 487-491.

Ramezanzadeh, Fatemeh M., et al., "Prevention of Oxidative Rancidity in Rice Bran during Storage," J. Agric. Food Chem. 1999, 47, 2997-3000.

Grain Millers Product Specification, Stabilized White Wheat Bran and Germ Blend Organic or Conventional Oct. 24, 2005, 3 pages.

Srivastava, Alok K., et al, "Studies on heat stabilized wheat germ and its influence on rheological characteristics of dough," Eur. Food Res. Technol (2007) 224: 365-372.

MacMurray, T. A., et al "Composition of Wheat-Flour Lipids," J. Sci. Fd Agric., 1970, vol. 21, October, pp. 520-528.

Galliard, T. "Rancidity in Cereal Products," *Rancidity in Foods*, Allen and Hamilton 1989.

W. A. Atwell, Cargill Bake Lab, Minnetonka, MN, An Overview of Wheat Development, Cultivation, and Production1, 2001 American Association of Cereal Chemists, Inc., pp. 59-62.

Bashir Adleh, General Flour Milling Company for Syria, entitled: "Bread in Syria", Food Reviews International, 10(4), 419-436 (1994).

G. Boggini et al., entitled "The Breadmaking Quality and Storage Protein Composition of Italian Durum Wheat", Experimental Institute for Cereal Research, Section of Catania, Via Varese 43, 95123 Catania, Italy, Section of S. Angelo Lodigiano. -20079 S. Angelo Lodigiano, Italy, *Journal of Cere.1 Science 9* (1989) 131-138.

M. H. Boyacioglu et al., entitled: "Characterization and Utilization of Durum Wheat for Breadmaking. II. Study of Flour Blends and Various Additives", 1994 American Association of Cereal Chemists, Inc., pp. 28-29.

M. H. Boyacioglu et al., entitled: "Characterization and Utilization of Durum Wheat for Breadmaking. I. Comparison of Chemical, Rheological, and Baking Properties Between Bread Wheat Flours and Durum Wheat Flours", 1994 American Association of Cereal Chemists, Inc., vol. 71, No. 1, 1994, pp. 21-28.

J. E. Dexter et al., entitled: "Comparison of Gluten Strength, Mixing Properties, Baking Quality and Spaghetti Quality of Some Canadian Durum and Common Wheats", *Can. Inst. Food Sci. Technol. J.* vol. 14, No. 2, Apr. 1981, pp. 108-111.

"Whole New World: Conagra Ultragrain whole wheat flour opens doors for healthy baked products", *Stagnito's New Products Magazing/Oct. 2005*, WWW.NEWPRODUCTSMAG.COM, pp. 30-32.

Keith Seiz, entitled: "IBIE 2004 proves a buyer's market IBIE 2004 proves a buyer's market", http://baking-management.com/equipment/bm_imp_7442/, Oct. 1, 2004, pp. 1-6.

ConAgra's White Whole-Wheat Flour, Prepared Foods Aug. 16, 2004 enewsletter. http://www.preparedfoods.com/CDA/Archives/889b992114788010VgnVCM100000f932a..., pp. 1-2.

ConAgra Foods®, "ConAgra Food Ingredients Introduces Breakthrough Ultragrain White Whole-Wheat Flour", Omaha, Neb., Aug. 9, 2004, http://media.conagrafoods.com/phoenix.zhtml?c=202310&p=irol-newsArticle_pf&ID=100..., pp. 1-2.

ConAgra Mills, Ultragrain®. White Flour Appeal. Whole Grain Nutrition., Omaha, NE, www.conagramills.com, 2 pages.

UPI.com, Business News: ConAgra to roll out new flour next week, Omaha, Aug. 9, 2004, Nebraska's ConAgra Foods, http://www.upi.com/Business_News/2004/08/09/ConAgra_to_roll_out_new_flour_next_w..., pp. 1-2.

Kay M. Behall et al., entitled "Back to the Old Grind-er", Agricultural Research/May 2000, p. 21.

"USDA" United States Department of Agriculture, Agriculture Research Service, Human Nutrition, ARS Quarterly Report, Oct. Dec. 2000. http://www.ars.usda.gov/is/qtr/q400/hn400.htm, pp. 1-3.

AllBusiness, A D&B Company, "Ultragrain: a breakthrough ingredient", Publication: Snack Food & Wholesale Bakery, Thursday, Jul. 1, 2004, http://www.allbusiness.com/retail-trade/food-beverage-stores-specialty-food/202541-1.html, pp. 1-3.

M. H. Boyacioglu et al., entitled: "Durum Wheat and Bread Products", Mar. 1994, vol. 39, No. 3, pp. 168-174.

Jiwan S. Sidhu et al., entitled: "Effect of adding wheat bran and germ fractions on the chemical composition of high-fiber toast bread", Biotechnology Department, Kuwait Institute for Scientific Research, PO Box 24885, 13109-Safat, Kuwait, Food Chemistry 67 (1999) 365-371.

P. Varoquaux et al., Determination Automatique de I'Inactivation Thermique et de la Regeneration des Enzymes Application a la Peroxydase du Pois (*Pisum sativum* L.), 1974, pp. 60-63.

Lilly Vamos-Vigyázó, Central Food Research Institute, Budapest, Hungary, "Polyphenol Oxidase and Peroxidase in Fruits and Vegetables", Sep. 1981, pp. 49, 84-110.

Bauermeister Probat Group, Complete Processing Systems From Start to Finish, Bauermeister Gap Mill GM-D, printed Aug. 5, 2009, http://www.bauermeisterusa.com/Equipment/Mills/GMD/GapMill_GM-D.html, pp. 1-2.

Zhong Yi Yuan et al., "Horseradish Peroxidase", *Institute of Biochemistry and Cell Biology, Chinese Academy of Sciences, Shanghai, China*, pp. 403-411.

Xianli Wu et al., "Lipophilic and Hydrophilic Antioxidant Capacities of Common Foods in the United States", *J. Agric. Food Chem.* 2004, 52, 4026-4037.

Johann Pütter, Peroxidases, pp. 1-6.

J.E. Dexter et al., "Recent Trends in Durum Wheat Milling and Pasta Processing: Impact on Durum Wheat Quality Requirements", Canadian Grain Commission, Grain Research Laboratory, 24 pages.

*Lesley MacLeod*, Cereal Chemistry Division Newsletter, Nov. 2004, 11 pages.

R.M. Villanueva et al., "Split Milling of Wheat for Diverse End-Use Products", 2001 American Association of Cereal Chemists. Inc., pp. 363-369.

Kay M. Behall, PhD, et al., "The Effect of Particle Size of Whole-Grain Flour on Plasma Glucose, Insulin, Glucagon and Thyroid-Stimulating Hormone in Humans", Journal of the American College of Nutrition, vol. 18, No. 6, 591-597 (1999), pp. 591-597.

Recipe by Rohani Jelani, The Star Online—CyberKuali, "Mutton Chapatti Puffs", Jun. 20, 2003. pp. 1-3.

Eric Schroeder, "Industry Activities: The whole grains wake-up call Global summit shows more work to be done on definition, taste", Food Business News; Jun 14, 2005, pp. 1-2.

U.S. Hard Red Spring Wheat, 2006 Regional Quality Report, Minnesota-Montana-North Dakota-South Dakota, pp. 1-30.

Joseph Erhard-Hudson, Bakery Manager, Sep. 2001 newsletter, Moscow Food Co-op Producer Profile, "Unifine flour from Azure Standard/Azure Farms", 2 pages.

Len Marquart, Ph.D., Gary Futcher, Ph.D. and Joanne Slavin, Ph.D., "Whole Grains and Health Past, Present, and Future", Department of Food Science and Nutrition, University of Minnesota, Technical Bulletin, vol. XXV, Issue 2, Feb. 2003, pp. 1-14.

Fredriksson et al., *Cereal Chemistry*, Sep./Oct. 2004, vol. 81, No. 5. pp. 650-653, Abstract only.

Buri et al., *Cereal Foods World*, Sep./Oct. 2004, vol. 49, No. 5, pp. 274-282, p. 274, col. 2, para 2; p. 276, table 1; p. 279, table IX.

Guttieri et al, *Crop Science*, Sep.-Oct. 2003, vol. 43, p. 1628-1633.

Molteberg et al, *Cereal Chem*. 1995, vol. 72. No. 1, p. 88-93, p. 90, col. 2, parag. 4, p. 88, col. 1 para. 2.

English Abstract of Chinese Patent Publication No. CN1206629, published Feb. 3, 1999.

Matz, "Manufacture of Breakfast Cereals", Cereal Technology, 1970, pp. 221-226.

Oat Check I, "Rapid Oat Product Testing for 'Cook' Quality", LSB Products, Sep. 1, 1993.

R. Vetrimani et al., "Studies on Stabilization of Wheat Bran", J.Fd. Sci.Technol., 1990, vol. 27, No. 5, pp. 332-335.

D. Fellers et al., "Storage Stability of Wheat Based Foods: A Review", J. of Food Science, vol. 42, No. 5 (1977), pp. 1143-1147.

P. Fox et al., "Enzymes in Wheat, Flour and Bread", Advances in Cereal Science and Technology, vol. 5, Pomeranz, Y., AACC (1982), pp. 107-156.

B. Fretzdorff et al., "Determination of Peroxidase Activity in Cereals", Lebensm Unters. Forsch., 170 (1980), pp. 187-193.

T. Galliard, "Rancidity in Cereal Products", Rancidity in Foods, 2d Edition, Allen, J., Hamilton, R., Elsevier Applied Science, New York, 1989, pp. 141-161.

T. Galliard, "Hydrolytic and Oxidative Degradation of Lipids During Storage of Wholemeal Flour: Effects of Bran and Germ Components", J. of Cereal Science 4 (1986), pp. 179-192.

P. Rao et al., "Studies on Stabilization of Wheat Germ", Lebensm-Wiss. u. Technol., 13, (1980), pp. 302-307.

Micronizer, Inc. Publication, "Infrared Cocoa Bean Pretreatment", (no date available).

"The Wheat Grain", New Zealand Cyberguide to Milling and Baking, Crop & Food Research Institute, 1996, 1997.

Hirsch, J.M., Associated Press Writer, "White Whole-Wheat Becoming Popular", Yahoo! News, May 10, 2006.

Chemical Engineers' Handbook, 4th Edition, McGraw-Hill, Inc., 1963, pp. 21-50-21-51.

The Washington Post, "Shopping Cart | whole-grain clarity", Feb. 22, 2006.

The Wall Street Journal, "How Sara Lee Spun White, Grain Into Gold", S. Gray, Apr. 25, 2006.

"2: The wheat grain," in Plant Foods for Human Nutrition, vol. 55, No. 1, Mar. 2000, p. 15-20.

Cooking Light, "Good-For-You Chocolate Chip Cookies," Nov. 1996.

Kempf, W., "Process for the Industrial Production of Wheat Starch from Whole Wheat," *Wheat is Unique*, ed.Y. Pomeranz, pp. 521-540.

Nov. 14, 2007 International Search Report with respect to PCT/US2007/014053.

Bloksma et al., "Rheology and Chemistry of Dough", Wheat Chemistry and Technology vol. II. Ed. Y. Pomeranz. American Association of Cereal Chemists: St. Paul, Minnesota, 1988, p. 173.

Hoseney, "Soft Wheat Products", Wheat Chemistry and Technology vol. II. Ed. Y. Pomeranz. American Association of Cereal Chemists: St. Paul, Minnesota, 1988, pp. 416-417.

Jacob et al., "Hydrothermal Modifications of Granular Starch With Retention of the Granular Structure," Journal. Agricultural and Food Chem.. vol. 46, #8, 1998 pp. 2895-2905.

Hoseney, R. Carl, "Principles of Cereal Science and Technology", American Association of Cereal Chemists: St. Paul, MN , 1986, pp. 47-57.

Kulp et al, K. "Heat-Moisture Treatment of Starches. I. Physicochemical Properties," Cereal Chemistry, vol. 58, #1, 1981, pp. 46-48.

Schnurer, Johan, "Distribution of Fungal Biomass Among Fine Bran, Coarse Bran, and Flour from Wheat Stored at Four Different Moisture Levels," Cereal Chem. 1991 68(4):434-437.

Hemery et al, Youna, "Biochemical markers: Efficient tools for the assessment of wheat grain tissue proportions in milling fractions," Journal of Cereal Science 2009 49:55-64.

PRODUCTION OF STABILIZED WHOLE GRAIN FLOUR AND PRODUCTS THEREOF

This application, which is a 371 U.S. national stage application of International Application PCT/US2007/014053 filed Jun. 15, 2007, is a continuation-in-part application of U.S. application Ser. No. 11/454,758, filed Jun. 16, 2006, the disclosure of which is herein incorporated by reference in its entirety.

FIELD OF THE INVENTION

The present invention relates to processes for making whole grain flours and bran components or ingredients for making whole grain flours which exhibit low rancidity and extended shelf-life. The present invention also relates to food products, such as baked goods made from such stabilized flours and stabilized bran components.

BACKGROUND OF THE INVENTION

Food products containing elevated levels of whole grain are recommended by the 2005 dietary guidelines published by the USDA as constituting half of a person's grain consumption, because whole grains are a good source of nutrients of concern. For adults, these nutrients include calcium, potassium, fiber, magnesium, and vitamins A (as carotenoids), C, and E. However, consumption of whole grain foods has lagged mainly due to certain qualities of whole grain foods, such as coarse, gritty appearance and texture from the whole grain flour ingredient typically available for use. More recently, commercial whole grain wheat flours are marketed with reduced particle size; however, these flours exhibit very poor food processing performance in cookies, crackers, breakfast cereals and other baked goods due to fine grinding of the whole grain to particle sizes of less than 150 microns, resulting in starch damage. Furthermore, these fine ground flours have much poorer storage stability than other whole grain wheat flours. Commercial stabilized whole grain wheat flours containing stabilized components such as bran and germ are expected to have better storage stability. However, the functionality of the flours, especially for cookie, cracker and cereal production, for example in terms of dough machinability and cookie spread, is greatly compromised due to significant amounts of gelatinized and damaged starch in the flour.

It is generally known that whole grain wheat flours containing bran and germ are less stable than white refined wheat flours. Storage of whole grain wheat flours for as little as 30 days at 75° F. can result in the development of undesirable odors and flavors in products made with the whole grain flour. Concurrent with the development of off-flavors is an increase in the amount of free fatty acids in the flours, correlated with increased rate of oxygen uptake in the flours and the formation of the oxidative components of rancidity. Decreasing particle size increases the rate and extent of the deterioration of grain components. Heat and moisture treatment is commonly used to inactivate enzymes responsible for flour deterioration, although it is recently shown to contribute to oxidative rancidity as measured by hexanal formation, a common marker used to detect oxidative rancidity, in oat flour. This increase in oxidative rancidity is believed to be due to disintegration of cellular structures that tend to stabilize lipids, or due to inactivation of heat-labile antioxidants.

Rancidity in cereal products may be due to hydrolytic (enzymatic) or oxidative degradation reactions, or both. Often, hydrolysis may predispose products to subsequent oxidative rancidity. Nature has provided a number of protective features in seeds to prevent rancidity and spoilage, enabling seeds to survive periods of adverse conditions before attaining an appropriate environment for germination and growth. Rancidity is less likely to develop when lipid materials, for example, seed oil, are unable to interact with reactants or catalysts such as air and enzymes. One protective feature in cereal grains is the provision of separate compartments for storing lipids and enzymes so that they cannot interact.

Milling cereal grains involves breaking down the separate compartments, bran, germ and endosperm, such that the lipid and enzymatic components of the grain are able to interact, greatly increasing the development of rancidity. Increasing milling to reduce grittiness caused by bran particles tends to increase surface area, reduce natural encapsulation of lipids, and increase interaction between the lipids and enzymatic components thereby increasing the development of rancidity.

Thus, high-extraction flours, that is, those containing substantial amounts of bran and germ, are less stable than white flours. Prolonged storage of high-extraction flours often leads to the development of rancidity. Rancidity includes adverse quality factors arising directly or indirectly from reactions with endogenous lipids, producing a reduction in baking quality of the flour, undesirable tastes and odors, and/or unacceptable functional properties. A main reason for the development of rancidity in high-extraction flours is the enzymatic degradation of unstable natural oils. Rich supplies of unstable natural oils are contained in the germ portion of grains used to make high-extraction flours. White flours, on the other hand, contain little or no unstable natural oils or fats because they are made predominantly from the endosperm portion of grains and are generally substantially free of bran and germ.

Another reason rancidity is a greater problem in products derived from bran and germ-containing flour is that bran and germ contain the enzymes involved in enzyme-catalyzed lipid degradation. One of the enzymes, lipase, causes hydrolytic rancidity in milled products of sound, ungerminated wheat. Lipase is found almost exclusively in the bran component. The other key lipid-degrading enzyme, lipoxygenase (LPO), is present almost exclusively in the germ and also is involved in the development of rancidity. Thus, bran-containing wheat flours or graham flours are much more susceptible to the development of rancidity than are white flours which contain little or no bran and germ.

Enzyme-catalyzed lipid degradation that occurs in high extraction wheat flour, causing rancidity in such flour, is believed to occur by the action of lipase followed by the action of LPO. When lipase, the enzyme found almost exclusively in the bran portion of the grain, is activated during milling, it reacts with unstable oils naturally occurring in the grain and breaks down the unstable oils to free fatty acids (FFA). This process may take weeks or even months. Then, LPO, the enzyme found almost exclusively in the germ portion of the grain, oxidizes FFA in the presence of oxygen, producing volatile breakdown products such as peroxides that, in turn, generate rancid aldehydes. In the absence of moisture, oxidation of FFA is also a very slow process and can take up to several weeks until noticeable amounts of rancid aldehydes can be detected. However, in the presence of moisture, or water, that is normally added to wheat flour in large amounts during the dough work-up stage, enzyme-catalyzed oxidation of free fatty acids tends to proceed to a great extent very quickly, causing formation of large amounts of rancid aldehydes in a matter of just a few minutes.

U.S. Patent Application Publication No. US 2005/0136173 A1, to Korolchuk, discloses a process of producing an ultrafine-milled whole-grain wheat flour and the products thereof. Ultrafine is defined as having a particle size of less than or equal to about 150 microns. The process is a continuous flow-grain-milling process, including the steps of separating a quantity of cleaned and tempered wheat kernels into a fine fraction, comprised primarily of endosperm along with small amounts of residual bran and germ, and a coarse fraction, comprised of bran, germ, and a small amount of residual endosperm. The coarse fraction is ground through a mill, such as a gap mill, to form an ultrafine-milled coarse fraction having a particle size of less than or equal to about 150 micron. Finally, the ultrafine-milled coarse fraction is mixed with the fine fraction in order to form the ultrafine-milled whole-grain wheat flour. In the Korolchuk process, the two fractions are milled to produce fractions and an ultrafine-milled whole-grain wheat flour having particle sizes less than or equal to about 150 microns. According to Korolchuk, the flour has the full nutritional value of wheat kernels, while retaining the texture of refined wheat flour and an appearance similar to refined wheat flour, and thus, the flour can be used in food products such as bakery products and snack food products, which typically use refined wheat flour. However, production of a coarse fraction with very little residual endosperm generally requires increased milling and grinding operations which can damage the starch and adversely affect dough machinability and cookie production. Also, grinding of the coarse fraction to a particle size of less than or equal to about 150 microns causes increased interaction between the lipids and lipid-degrading enzymes, which results in increased rancidity problems.

U.S. Patent Application Publication No. US 2006/0073258 A1, to Korolchuk, discloses the production of an ultrafine-milled whole-grain wheat flour which has the full nutritional value of wheat kernels, while retaining the texture of refined wheat flour and an appearance similar to refined wheat flour. Production of an ultrafine-milled coarse fraction which can be used as a replacement and to fortify refined wheat flour is also disclosed. An objective of the Korolchuk process is to obtain an ultrafine-milled whole grain wheat flour that has a particle size distribution that meets the FDA standards for a refined wheat flour product of a particle size in which not less than 98% passes through a U.S. Wire 70 sieve (210 microns). In the Korolchuk process, an ultrafine-milled fine fraction comprising endosperm and a coarse fraction comprising bran and germ are obtained. The coarse fraction is ground in a gap mill to reduce microbial load, and the ultrafine-milled coarse fraction is then mixed with the ultrafine-milled fine fraction to obtain an ultrafine-milled whole-grain wheat flour. According to Korolchuk, grinding the coarse fraction in a gap mill to a particle size less than or equal to 500 microns reduces the microbial load. After sifting, any ground coarse fraction having a particle size greater than 500 microns is returned to the process for further milling. Stabilization of a bran component or whole wheat flour by heating a coarse fraction comprising bran and germ to inactivate lipase is not disclosed.

Japanese Patent Publication No. JP 205168451 A discloses that a wheat flour having a mean particle diameter of 150 to 230 microns and an ash content of 0.8 to 1.2% does not have a grassy-smelling wheat bran smell, is rich in nutritive value and flavor, and can be used in the production of noodles, and confectionery. Heat-treatment of the flour to inactivate enzymes such as lipase and lipoxygenase is not disclosed.

Use of steam or other heat sources to inactivate enzymes such as lipase and lipoxygenase in whole grains is disclosed in U.S. Pat. No. 4,737,371 to Bookwalter, U.S. Pat. No. 5,066,506 to Creighton et al, and U.S. Pat. No. 6,616,957 to Wilhelm et al. However, treatment of the whole grain generally requires an increased amount of cooling and drying of the treated whole grains to reduce their moisture content to microbially shelf-stable levels. Also, steam heat treatment, such as employed in U.S. Pat. No. 4,737,371 to Bookwalter tends to substantially gelatinize starch in the berries or fails to substantially completely inactivate lipase and LPO.

In Bookwalter, U.S. Pat. No. 4,737,371, steam treatment for a 4-12 minute period of time only "significantly reduces" lipase activity but does not substantially inactivate lipase. When steam-treating under conditions sufficient to substantially inactivate lipase and LPO, steam penetrates the berries and gelatinizes a substantial amount of starch in the interior endosperm of the berries. The moisture from steam induces gelatinization of starch in the berries, when combined with the heat brought to the interior of the berries by the steam. The excessive moisture which penetrates the berries during steaming also necessitates long drying periods to reduce the moisture content to an acceptable level for milling.

In one embodiment, U.S. Pat. No. 4,737,371 to Bookwalter discloses that, in the case of large-grained cereals and those which are otherwise easily degerminated, such as corn and wheat, it would be advantageous to first mill the grain and then treat only the separated germ with steam, so that equipment and processing costs would be held to a minimum. Thereafter, it is disclosed, the germ can be recombined with the endosperm. The term "whole" as used by Bookwalter means that both the endosperm and germ are present, though the hull, husk, and bran layers may have been previously removed. However, the combined product, even though it is called a whole-grain product, does not contain bran in the natural proportions present in the original whole grain.

In U.S. Pat. No. 5,066,506 to Creighton et al, a short time (30 seconds to 60 seconds), high temperature (400° F. to 650° F.) and high pressure (50 psig to 70 psig) treatment of the whole grain kernel is employed to inactivate the enzymes involved in rancidity development. Gelatinization of starch can be as high as 40% of the total starch in the kernel, which can decrease dough machinability and cookie spread. Also, the high temperatures and pressures employed would tend to increase acrylamide production and vitamin destruction.

In U.S. Pat. No. 6,616,957 to Wilhelm et al, whole wheat berries having a moisture content of from about 15% by weight to about 20% by weight are irradiated with infrared (IR) energy, the berries are optionally maintained at an elevated temperature of from about 80° C. to about 110° F. for a period of time up to about one hour, and the treated berries are cooled, dried and comminuted. The moisture content of the berries can be adjusted by moistening or tempering the berries prior to treatment with IR energy. The moisture content, optional tempering conditions, amount of irradiated IR energy, the elevated temperature, and the various treatment periods are sufficient to inactivate lipase and lipoxygenase in the berries, yet insufficient to gelatinize more than about 20% of the starch in the berries.

Whole grain wheat flours having a high degree of starch damage and/or a high degree of gelatinization may be acceptable for ready-to-eat breakfast cereals or other applications where crunchiness is desired, but dough formation, sheeting, or cutting or oven spread during baking is not a concern. The present invention provides a process for making stabilized whole grain wheat flours containing natural proportions of bran, germ, and endosperm, with low degrees of starch damage due to abrasion and low degrees of starch gelatinization due to heat and moisture treatment. The stabilized whole wheat flours of the present invention have dough and baking functionalities approaching those of white refined wheat flour. They may be used in the consistent production of highly machinable, sheetable doughs for making baked goods such as cookies, crackers, and snacks with excellent oven spread and appearance, and a non-gritty mouthfeel.

The present invention provides stabilized whole grain wheat flour and a stabilized bran component which exhibit unexpectedly low sodium carbonate-water sorption, and an unexpectedly long shelf life, with unexpectedly low free fatty acid contents and hexanal contents at 1 month or more under accelerated storage conditions. A high level of enzyme inactivation is achieved, while retaining unexpectedly high levels of essential nutrients, such as antioxidants and vitamins that are lost with high temperature stabilization treatments. Furthermore, acrylamide formation is controlled to unexpectedly low levels using the stabilization conditions of the present invention.

The present invention also provides a method of whole wheat berry or whole grain stabilization which meets the standard of identity for ingredient labeling proposed by the FDA and AACCI for identifying the ingredient as "whole grain". As indicated in the U.S. Food and Drug Administration Feb. 15, 2006 draft guidance and as used herein, the term "whole grain" includes cereal grains that consist of the intact, ground, cracked or flaked fruit of the grains whose principal components—the starchy endosperm, germ and bran—are present in the same relative proportions as they exist in the intact grain. This definition is nearly the same as AACC International's definition of "Whole grains shall consist of the intact, ground, cracked or flaked caryopsis, whose principal anatomical components—the starchy endosperm, germ and bran—are present in the same relative proportions as they exist in the intact caryopsis" which was approved in 1999 and is applicable herein. The FDA outlined that such grains may include barley, buckwheat, bulgur, corn, millet, rice, rye, oats, sorghum, wheat and wild rice. Although this invention is primarily exemplified by reference to wheat berries, as well as corn, rice, and oats, it will be appreciated that other cereal grains are also contemplated to be within the scope of various or certain aspects of the invention. Examples of other whole grains that may be processed in accordance with various or certain embodiments of this invention include, for example, wild rice, rye, barley, buckwheat, bulgar, millet, sorghum, and the like.

SUMMARY OF THE INVENTION

A stabilized bran component and a stabilized whole grain flour containing the component, such as whole grain wheat flour, exhibiting unexpectedly superior biscuit baking functionality, are produced by subjecting a bran-enriched coarse fraction comprising bran, germ and starch to grinding or milling to reduce grittiness of the coarse fraction, without substantially damaging the starch due to abrasion. The coarse fraction may be stabilized by heating the coarse fraction before, during, or after the grinding or milling. In embodiments of the invention, stabilization may be by any combination of heating before, during and after grinding and milling. Preferably, the stabilization is performed after grinding or milling of the coarse fraction. The stabilization substantially reduces the lipase and lipoxygenase activity of the coarse fraction, without substantial gelatinization of the starch. Unexpectedly high levels of natural antioxidants and vitamins, such as tocopherols, thiamin and riboflavin are retained, with unexpectedly low levels of acrylamide formation during the stabilization. The stabilized coarse fraction or stabilized bran component may be combined with a fine fraction which contains predominantly endosperm, to obtain a stabilized whole grain flour, such as stabilized whole grain wheat flour. In embodiments of the invention, the fine fraction may contain endosperm or starch in an amount of at least about 90% by weight, for example from about 92% by weight to about 95% by weight solids basis, based upon the weight of the fine fraction. The stabilized whole grain flour contains endosperm, bran and germ in the same or substantially the same relative proportions as they exist in the intact grain, such as the intact wheat grain, corn grain, rice grain, or oat grain.

The coarse fraction may contain bran in an amount of at least about 50% by weight, based upon the weight of the coarse fraction, and less than about 40% by weight starch or endosperm, but generally at least about 10% by weight starch or endosperm, for example from about 15% by weight to about 35% by weight starch, based upon the weight of the coarse fraction. In preferred embodiments, the coarse fraction may contain at least about 60% by weight bran, at least about 10% by weight germ, and less than or equal to about 30% by weight starch, based upon the weight of the coarse fraction. In embodiments of the invention, the coarse fraction may have a particle size distribution of at least about 75% by weight having a particle size of greater than or equal to 500 microns, less than or equal to about 5% by weight having a particle size of less than 149 microns, and about 15% by weight to about 25% by weight having a particle size of less than 500 microns but greater than or equal to 149 microns.

The grinding or milling of the coarse fraction is sufficiently extensive to avoid a gritty mouthfeel in products containing it. However, the starch content and the amount or degree of grinding or milling are limited, so as to avoid substantial starch damage due to machine abrasion and abrasion between the bran particles and the starch particles. The coarse fraction may be ground or milled to obtain a ground or milled fraction, or ground or milled bran component, with the same or substantially the same bran, germ, and starch content as the coarse fraction. The ground or milled coarse fraction or bran component may have a particle size distribution of at least about 40% by weight of the fraction or component having a particle size greater than or equal to 149 microns, and less than or equal to about 35% by weight having a particle size greater than or equal to 500 microns. In preferred embodiments, the ground or milled coarse fraction or bran component may have a particle size distribution of about 0.5% by weight to about 5% by weight greater than or equal to 841 microns, about 10% by weight to about 30% by weight, more preferably from about 15% by weight to about 25% by weight less than 841 microns but greater than or equal to 500 microns, about 25% by weight to about 70% by weight, more preferably from about 45% by weight to about 60% by weight greater than or equal to 149 microns but less than 500 microns, and less than or equal to about 60% by weight, preferably from about 10% by weight to about 30% by weight less than 149 microns, with the percentages adding up to a total of 100% by weight.

Stabilization of the coarse fraction may be achieved by heating the coarse fraction under conditions of temperature, moisture content, and treatment times which are sufficient to at least substantially inactivate the lipase and the more easily inactivated lipoxygenase. The moisture content of the coarse fraction during the heat-treatment stabilization should be high enough to avoid substantial acrylamide production, but not so high to result in substantial gelatinization of the starch or require excessive post-stabilization drying. In embodiments of the invention, the stabilization temperature may be from about 100° C. to about 140° C., preferably from about 115° C. to about 125° C., and the moisture content of the coarse fraction subjected to the stabilization may be from about 7% by weight to about 17% by weight, preferably from about 9% by weight to about 14% by weight, based upon the weight of the coarse fraction. In embodiments of the invention, the heat treatment time may be from about 0.25 minutes to about 12 minutes, preferably from about 1 minute to about 7 minutes. The stabilization may be conducted without substantial or any alteration of the proportions of germ, bran, or starchy endosperm of the fraction or component subjected to the stabilization. In embodiments of the invention where the stabilization is conducted either before or after grinding, the stabilization may be conducted without substantial or any alteration of the particle size distribution of the fraction or component subjected to the stabilization. For example, in preferred embodiments of the invention, the stabilized ground or milled fraction or the stabilized ground or milled bran component may have the same or substantially the same bran, germ, and starch content and particle size distribution as the ground or milled coarse fraction before it is stabilized.

In embodiments of the invention, a stabilized bran component which includes a ground or milled, heat-treated coarse fraction may have a lipase activity of less than about 3, preferably less than about 2, most preferably less than about 1 micromole butyrate free acid formed per hour per 0.1 gram of the stabilized bran component or stabilized ground or milled coarse fraction, wet basis or dry basis, and an acrylamide content less than or equal to about 150 ppb, preferably less than or equal to about 100 ppb, based upon the weight of the stabilized bran component or stabilized coarse fraction. The stabilized coarse fraction may maintain an antioxidant free radical scavenging capacity of not less than about 150 micromoles Trolox equivalents per gram. Vitamin retention, such as retention of Vitamins E, B1 and B2, may be at least about 80% by weight, based upon the vitamin content in the bran component before stabilization. Starch gelatinization may be less than about 25%, preferably less than about 10%, most preferably less than about 5%, as measured by differential scanning calorimetry (DSC). The low degree of starch gelatinization and low degree of starch damage achieved in the wheat bran component and whole grain wheat flour of the present invention are exemplified by a starch melting enthalpy of greater than about 4 J/g, preferably greater than about 5 J/g, based upon the weight of starch in the stabilized bran component or ground coarse fraction, as measured by differential scanning calorimetry (DSC), at a peak temperature of from about 65° C. to about 70° C., and a sodium carbonate-water solvent retention capacity (SRC sodium carbonate) of less than about 200%, based upon the weight of the stabilized bran component or coarse fraction.

The stabilized whole grain flours of the present invention, such as stabilized whole grain wheat flour, include bran, germ and endosperm, where only a portion of the endosperm is subjected to heat stabilization in the presence of bran and germ, but at least a substantial portion of the bran and germ is subjected to stabilization by heating in the absence of a major portion of the endosperm. In embodiments of the invention, the stabilized whole grain wheat flour may have a lipase activity less than about 1.5, preferably less than about 1.25, most preferably less than about 1 micromole butyrate free acid formed per hour per 0.1 gram of the stabilized whole grain flour, wet basis or dry basis, and an acrylamide content less than about 45 ppb, preferably less than about 30 ppb, based upon the weight of stabilized whole grain flour. The stabilized whole grain wheat flours may have an unexpectedly low free fatty acid content of less than about 10% by weight of total flour lipids after one month under accelerated storage at 95° C., or less than about 3,000 ppm, based upon the weight of the stabilized whole grain flour, and an unexpectedly low hexanal content of less than about 10 ppm after 1 month accelerated storage at 95° C., based upon the weight of the stabilized whole grain flour.

The particle size distribution of the stabilized whole grain wheat flour may be less than about 10% by weight, preferably less than about 5% by weight on a No. 35 (500 micron) U.S. Standard Sieve, about 20% by weight to about 40% by weight on a No. 60 (250 micron) U.S. Standard Sieve, about 10% by weight to about 60% by weight, preferably from about 20% by weight to about 40% by weight on a No. 100 (149 micron) U.S. Standard Sieve, and less than about 70% by weight, for example from about 15% by weight to about 55% by weight, through a No. 100 (149 micron) U.S. Standard Sieve. The stabilized whole grain wheat flour exhibits excellent biscuit baking functionality, with a sodium carbonate-water solvent retention capacity (SRC sodium carbonate) of less than about 85%, preferably less than about 82%.

Food products which may be produced using the stabilized bran component or stabilized whole grain flour, such as stabilized whole grain wheat flour, as ingredients include farinaceous food products, such as bakery products and snack foods, such as cookies, crackers, biscuits, pizza crusts, pie crusts, breads, bagels, pretzels, brownies, muffins, waffles, pastries, cakes, quickbreads, sweet rolls, donuts, fruit and grain bars, tortillas, par-baked bakery products, and cereal crunch bars, and ready-to-eat breakfast cereals.

The stabilized whole grain flours, such as stabilized whole grain wheat flour, of the present invention may be used in the consistent production of highly machinable, sheetable doughs for making baked goods such as cookies, crackers, and snacks with unexpectedly superior oven spread and appearance, and a non-gritty mouthfeel. In embodiments of the invention, oven spread or cookie spread may be at least about 130% of the original prebaked dough diameter, as measured according to the AACC 10-53 bench-top method.

DETAILED DESCRIPTION OF THE INVENTION

Figure 1:
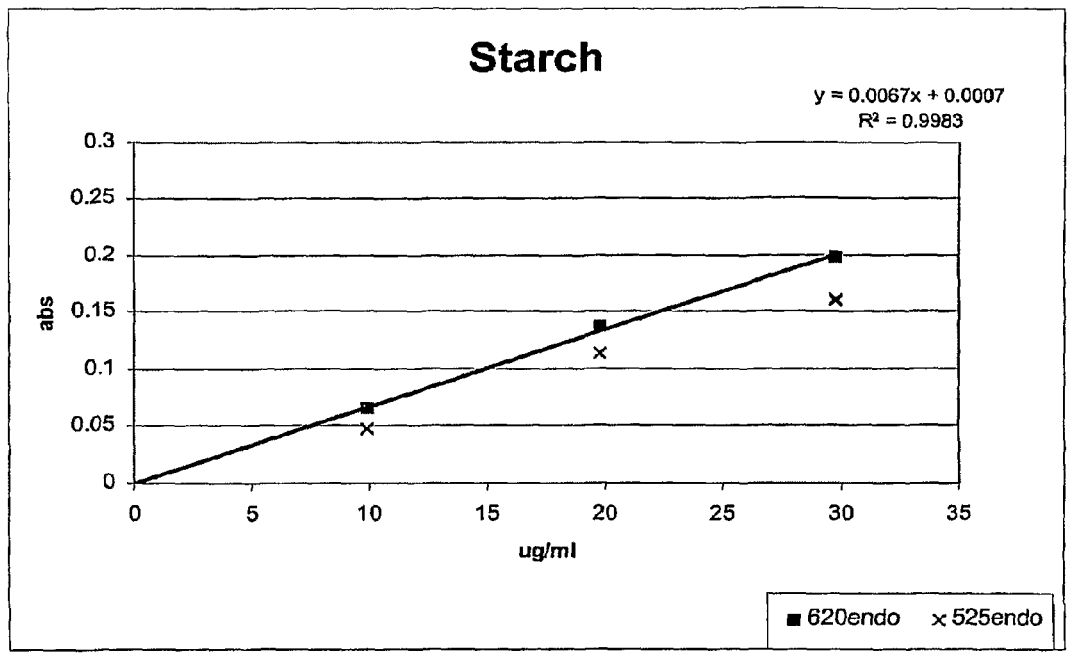
FIG. 1 shows a plot of absorbance at 620 nm and 525 nm vs. the concentration of starch in a sample, which is used to calculate the starch content of the bran fraction samples of Example 1.

The present invention provides a stabilized bran component, such as a wheat component highly enriched in bran, a stabilized whole grain flour containing the stabilized bran component, such as a stabilized whole grain wheat flour containing the stabilized wheat bran component, and processes for making the stabilized bran component and stabilized whole grain flour. Both the conditions of grinding or milling and the stabilization process provide a substantial reduction in lipase activity and lipoxygenase activity, and unexpectedly low free fatty acid, hexanal and acrylamide formation. Furthermore, an unexpectedly high retention of natural nutrients, such as vitamins and antioxidants in the stabilized bran component and stabilized whole grain flour, such as stabilized whole grain wheat flour, is achieved. The grinding or milling conditions and the stabilization conditions do not adversely affect dough machinability or baking functionality of the stabilized whole grain flour. The stabilized bran component has a low content of starch with a low iodine binding ratio, low starch damage and starch gelatinization, and low solvent retention capacity (SRC). The whole grain wheat flour, which contains natural proportions of endosperm, bran and germ as in the intact grain, has unexpectedly low solvent retention capacity (SRC), low starch damage and low degree of gelatinization, and an unexpectedly long shelf life. In accordance with the process of the present invention, only a small portion of the endosperm of the whole grain flour, such as whole grain wheat flour, is subjected to grinding or milling in the presence of the bran and germ, in order to reduce starch damage. Also, only that small portion of endosperm is subjected to stabilization by heating, in order to substantially reduce starch gelatinization. However, at least a substantial portion of the bran and germ of the whole grain flour, such as whole wheat flour, is subjected to stabilization by heating, in order to substantially reduce lipase and lipoxygenase activity. A whole grain product can be made from the stabilized whole grain flour, such as stabilized whole grain wheat flour, having an unexpectedly superior non-gritty texture, and cookie oven spread.

Production of the Coarse Fraction and the Fine Fraction

In embodiments of the invention for making a stabilized whole grain flour, such as stabilized whole grain wheat flour, and a stabilized bran component, whole cereal grains or berries may be comminuted, ground or milled in conventional manner using known flour milling equipment to obtain ground whole cereal grains. The whole cereal grains may be tempered or untempered, but are preferably untempered, raw whole cereal grains, which have been cleaned by washing with water. Moisture contents of from about 11% by weight to about 14.5% by weight are preferred for milling or grinding purposes, with moisture contents of about 12.5% by weight to about 13.5% by weight being particularly preferred. If there is too little moisture in the grains or berries, the grains or berries may undesirably shatter and create damaged starch. Too high an amount of moisture may render the grains or berries susceptible to excessive starch gelatinization and may also cause the grains or berries to be difficult to mill or grind. For these reasons, grain or berry moisture contents of from about 11% by weight to about 14.5% by weight are preferred just prior to milling or grinding. If the moisture content of the grains or berries is too low, moisture may be added to the dry grains or berries prior to milling or grinding to increase the moisture content to an acceptable level for milling or grinding. Moisture addition may be achieved in conventional manner by tempering the grains or berries or spraying their surfaces with water and permitting them to soak. Natural whole grains such as wheat berries generally have a moisture content of from about 10% by weight to about 14.5% by weight. Accordingly, in preferred embodiments of the invention, moistening or tempering of the whole berries or grains or moistening of the coarse fraction to achieve a desired moisture content for milling or grinding may not be needed or employed.

The comminuted, ground, or milled whole cereal grains may be subjected to conventional separating or screening operations, using known grain processing equipment to obtain a coarse fraction and a fine fraction. In accordance with the method of the present invention, the coarse fraction is enriched in bran and germ and also contains endosperm, and the fine fraction is predominately endosperm, and may also contain some bran and germ.

Whole grains contain primarily the endosperm, bran, and germ, in diminishing proportions, respectively. In whole wheat grains, for example, at field moisture of about 13% by weight, the endosperm or starch is about 83% by weight, the bran is about 14.5% by weight, and the germ is about 2.5% by weight, based upon the weight of the intact grain. The endosperm contains the starch, and is lower in protein content than the germ and the bran. It is also low in crude fat and ash constituents.

The bran (pericarp or hull) is the mature ovary wall which is beneath the cuticle, and comprises all the outer cell layers down to the seed coat. It is high in non-starch-polysaccharides, such as cellulose and pentosans. A pentosan is a complex carbohydrate present in many plant tissues, particularly brans, characterized by hydrolysis to give five-carbon-atom monosaccharides (pentoses). It is any member of a group of pentose polysaccharides having the formula $(C_5H_8O_4)_n$ found in various foods and plant juices. The bran or pericarp tends to be very tough due to its high fiber content and imparts a dry, gritty mouthfeel, particularly when present in large particle sizes. It also contains most of the lipase and lipoxygenase of the grain and needs to be stabilized.

As a result of the toughness or strength of the bran, during flour milling operations, it is generally broken down into smaller particles to a significantly lower extent than is the endosperm and germ. By using appropriate screen sizes, it is possible to obtain a coarse fraction which is enriched in bran relative to the natural proportions of bran, germ, and endosperm in the intact grain. As the extent of the grinding or milling increases, the bran particle size approaches the particle size of the starch, making the bran and starch harder to separate. Also, starch damage tends to increase due to more mechanical energy input, and abrasiveness of the bran compared to the endosperm, and rupturing of the starch granules. In embodiments of the present invention, the milling or grinding is conducted so as to enrich the coarse fraction in bran, without causing substantial starch damage. Also, in embodiments of the present invention, the bran is substantially reduced in particle size to substantially reduce grittiness, but the particle size reduction is limited so as to avoid substantial damage to the starch which is present in the coarse fraction. Also, mechanically damaged starch tends to be more susceptible to gelatinization. In accordance with the process of the present invention, little, if any mechanically damaged starch is carried over to or subjected to the stabilization process.

The scutulum and the embryonic axis are the major parts of the germ. The scutulum makes up 90% of the germ, and stores nutrients mobilized during germination. During this transformation, the embryonic axis grows into a seeding. The germ is characterized by its high fatty oil content. It is also rich in crude proteins, sugars, and ash constituents. The scutulum contains oil-rich parenchyma cells which have pitted cell walls. The germ is preferably subjected to the stabilization with the bran to inactivate any lipase and lipoxygenase which may present therein from the grinding or milling, while avoiding substantial destruction of the natural nutrients.

In more particular embodiments of the grain milling process, the production of the coarse fraction and the fine fraction can include conducting a quantity of whole grains, such as wheat, through at least one set of break rolls or rollermills, and a sifter downstream of each set of break rolls to provide milled grains. As more break rolls are employed more starch or endosperm is released, and the bran tends to remain in larger, coarser particles than the endosperm. During the breaking operation the bran particles tend to flatten while the endosperm tends to fragment into individual starch granules. The milled grains may be sifted or purified to collect the fine fraction and retain the coarse fraction. For example, in embodiments of the invention, the wheat berries may be conducted through at least one set of break rolls and their sifters to: 1) collect a first endosperm fraction having a particle size less than or equal to 500 microns, and retain a first ground coarse fraction having a particle size of greater than 500 microns, 2) grind the retained first ground coarse fraction to collect a second endosperm fraction having a particle size less than or equal to 500 microns, 3) combine the first endosperm fraction and the second endosperm fraction to obtain a fine fraction, and 4) retain a second ground coarse fraction having a particle size of greater than 500 microns for further size reduction. In conventional milling operations, five sets of break rolls and a sifter downstream of each set of break rolls may be employed. In preferred embodiments of the invention, fewer sets of break rolls and sifters, for example only two sets of break rolls and two sifters, may be employed to reduce starch damage and attain a larger particle size distribution for the fine fraction and the coarse fraction. Also, dull corrugations on each roll of each pair of break rolls are preferably employed to reduce dispersion of endosperm upon breaking of the grains, reduce starch damage during the breaking operations, and to attain a larger particle size distribution for the fine fraction and the coarse fraction.

When breaking whole grains and grinding without sifting, the endosperm starch and the pericarp starch are distributed evenly throughout the ground product, in their natural proportions. When breaking and sifting is employed, the coarse fraction which contains the bran, tends to become enriched in pericarp starch relative to endosperm starch. In another embodiment, a pearling operation may be employed which peels away the bran layer from the grain and tends to increase the proportion of pericarp starch relative to endosperm starch in the coarse fraction.

The coarse fraction may contain bran in an amount of at least about 50% by weight, based upon the weight of the coarse fraction. The amount of germ present in the coarse fraction may be about the same relative amount to the bran as it is in the intact grain. The amount of starch or endosperm present in the coarse fraction, may be less than about 40% by weight, but generally at least about 10% by weight starch or endosperm, for example from about 15% by weight to about 35% by weight starch, preferably less than or equal to about 30% by weight, based upon the weight of the coarse fraction. In preferred embodiments, the coarse fraction may contain at least about 60% by weight bran, and at least about 10% by weight germ, based upon the weight of the coarse fraction. In embodiments of the invention, the coarse fraction may have a particle size distribution of at least about 75% by weight having a particle size of greater than or equal to 500 microns, less than or equal to about 5% by weight having a particle size of less than 149 microns, and about 15% by weight to about 25% by weight having a particle size of less than 500 microns but greater than or equal to 149 microns.

The fine fraction is predominantly endosperm, and generally may contain starch or endosperm in an amount of at least about 90% by weight, for example from about 92% by weight to about 95% by weight solids basis, based upon the weight of the fine fraction. The amount of germ present in the fine fraction may be about the same relative amount to the bran as it is in the intact grain. The amount of bran present in the fine fraction, may be less than about 8% by weight, for example from about 5% by weight to about 6% by weight bran, based upon the weight of the fine fraction. In embodiments of the invention, the fine fraction may contain germ in an amount of less than about 1.5% by weight, for example less than about 1% by weight, based upon the weight of the fine fraction. In embodiments of the invention, the fine fraction may have a particle size distribution of less than about 10% by weight having a particle size of greater than or equal to 500 microns, less than or equal to about 80% by weight having a particle size of less than 149 microns, and about 20% by weight to about 65% by weight having a particle size of less than 500 microns but greater than or equal to 149 microns. More preferably, the fine fraction may have a particle size distribution of less than or equal to about 5% by weight having a particle size of greater than or equal to 500 microns, less than or equal to about 55% by weight having a particle size of less than 149 microns, and about 40% by weight to about 65% by weight having a particle size of less than 500 microns but greater than or equal to 149 microns. In embodiments of the invention, grinding or milling of the fine fraction to a particle size distribution greater than that of refined wheat flour helps to reduce starch damage and improve baking functionality without substantially adversely affecting texture of baked goods.

In embodiments of the invention, milling of the whole grain, such as wheat, yields about 60% by weight to about 83% by weight of fine fraction and from about 17% by weight to about 40% by weight of coarse fraction, based upon the weight of the whole grain.

Grinding of the Coarse Fraction

The retained or recovered coarse fraction is subjected to further grinding or milling to substantially reduce grittiness without substantially damaging the starch present in the coarse fraction by machine abrasion or by abrasion between the bran particles and the starch particles.

In preferred embodiments, the retained or recovered coarse fraction is subjected to the further grinding or milling through a grinder, which is preferably a gap mill. The gap mill employed may be a commercially available gap mill, such as a Bauermeister Gap Mill (Bauermeister, Inc., Memphis, Tenn.). The Bauermeister gap mill is designed for fine grinding and includes an adjustable grinding gap between a conical shaped rotor and a corrugated baffle. The coarse fraction may be continuously conveyed from the flour mill to the inlet of the gap mill at an approximate rate of about 600 pounds per hour to about 1000 pounds per hour. The ground coarse fraction may then be discharged out of the bottom of the gap mill by gravity.

Whichever process for milling or grinding of the coarse fraction is employed, the resulting ground or milled fraction, or ground or milled bran component may have the same or substantially the same bran, germ, and starch content as the coarse fraction. Thus, the ground or milled fraction or bran component may contain bran in an amount of at least about 50% by weight, based upon the weight of the ground coarse fraction. The amount of germ present in the ground coarse fraction or bran component may be about the same relative amount to the bran as it is in the intact grain. The amount of starch or endosperm present in the ground coarse fraction, may be less than about 40% by weight, but generally at least about 10% by weight starch or endosperm, for example from about 15% by weight to about 35% by weight starch, preferably less than or equal to about 30% by weight, based upon the weight of the ground coarse fraction. In preferred embodiments, the ground coarse fraction may contain at least about 60% by weight bran, and at least about 10% by weight germ, based upon the weight of the ground coarse fraction.

The ground or milled coarse fraction or bran component may have a particle size distribution of at least about 40% by weight of the fraction or component having a particle size greater than or equal to 149 microns, and less than or equal to about 35% by weight having a particle size greater than or equal to 500 microns. In preferred embodiments, the ground or milled coarse fraction or bran component may have a particle size distribution of about 0.5% by weight to about 5% by weight greater than or equal to 841 microns, about 10% by weight to about 30% by weight less than 841 microns but greater than or equal to 500 microns, about 25% by weight to about 70% by weight greater than or equal to 149 microns but less than 500 microns, and less than or equal to about 60% by weight less than 149 microns, with the percentages adding up to a total of 100% by weight.

More preferably, the ground or milled coarse fraction or bran component may have a particle size distribution of about 0.5% by weight to about 5% by weight greater than or equal to 841 microns, about 15% by weight to about 25% by weight less than 841 microns but greater than or equal to 500 microns, about 45% by weight to about 60% by weight greater than or equal to 149 microns but less than 500 microns, and from about 10% by weight to about 30% by weight less than 149 microns, with the percentages adding up to a total of 100% by weight.

Stabilization of the Coarse Fraction

Stabilization of the coarse fraction by heating to inactivate lipase and lipoxygenase may be performed before, during, or after the grinding or milling of the coarse fraction. In embodiments of the invention, stabilization may be by any combination of heating before, during and after grinding and milling. The stabilization is preferably performed after grinding or milling of the coarse fraction.

Irrespective of when it is conducted, stabilization of the coarse fraction may be achieved by heating the coarse fraction under temperature conditions, moisture content, and treatment times which are sufficient to at least substantially inactivate the lipase, and the more easily inactivated lipoxygenase. The moisture content of the coarse fraction during the heat treatment stabilization should be high enough to avoid substantial acrylamide production, Formation of acrylamide is believed to result after a Strecker degradation of asparagine and methionine in the presence of dicarbonyl Maillard browning products. High moisture contents are believed to inhibit acrylamide formation because water is more nucleophilic than asparagine and reduces the activity of the primary amino group on the asparagine. Lower stabilization temperatures and shorter stabilization times also result in lower acrylamide production. However, increasing the moisture content of the coarse fraction during stabilization so as to reduce acrylamide production tends to increase starch gelatinization or may require excessive post-stabilization drying to reduce the risk of mold growth. The moisture content of the coarse fraction during stabilization should not be so high so as to result in excessive starch gelatinization or to require extensive drying to achieve a shelf stable moisture content. In embodiments of the invention, the moisture content of the coarse fraction subjected to the stabilization may be from about 7% by weight to about 17% by weight, preferably from about 9% by weight to about 14% by weight, based upon the weight of the coarse fraction. During the stabilization it is preferred that the coarse fraction neither gain nor lose moisture. In some embodiments the coarse fraction may lose from about 10% by weight to about 70% by weight moisture, for example from about 15% by weight to about 25% by weight moisture during stabilization. In other embodiments, the coarse fraction may gain moisture, in the same amounts, as a result of steam injection throughout the stabilization process. However, moisture loss and moisture gain may be controlled in known manner so that the moisture content of the coarse fraction during stabilization is within the desired range for controlling acrylamide production, gelatinization, and drying requirements, and lipase activity, e.g. from about 7% by weight to about 17% by weight, preferably from about 9% by weight to about 14% by weight, based upon the weight of the coarse fraction.

In embodiments of the invention, the moisture content of the bran fraction may be controlled by treating or tempering the whole berries or grains such that exterior portions of the berries or grains are moistened without substantially moistening interior portions thereof. Such treatment avoids or substantially reduces the need to dry the fine fraction obtained from the interior or endosperm of the berry or grain, while moistening the exterior or bran and germ portions of the berry for subsequent stabilization treatment. Tempering methods which can be used to accomplish a surface or bran moistening include soaking the whole berries or grains or kernels, such as whole wheat berries, for limited time periods in a bath or vat, for example. In other embodiments, the whole berries may be surface sprayed with water and permitted to soak or temper. Soaking or tempering times of from about 10 minutes to about 24 hours may be employed according to some embodiments of the invention. Soaking the berries for a longer time period is not desirable because it may result in deep penetration of water into the berries, moistening the interior portion of the berries.

In other embodiments, the coarse fraction, rather than or in addition to the whole berry or grain may be moistened so as to achieve a desired moisture content in the coarse fraction. If moistening is needed, it is preferred that it be performed upon the bran fraction, rather than on the whole berries or grains.

Natural whole wheat berries generally have a moisture content of from about 10% by weight to about 14.5% by weight. Accordingly, in preferred embodiments of the invention, moistening or tempering of the whole berries or moistening of the coarse fraction to achieve a desired moisture content for stabilization may not be needed or employed.

While lower stabilization temperatures and shorter stabilization times help to reduce acrylamide production, starch gelatinization, and vitamin and antioxidant destruction, the lower temperatures reduce the amount of lipase and lipoxygenase which is destroyed. In embodiments of the invention, the stabilization temperature may be from about 100° C. to about 140° C., preferably from about 115° C. to about 125° C. The stabilization temperature may be measured with a temperature probe inserted into and centrally positioned within the lot of the treated coarse fraction. In embodiments of the invention, the heat treatment time may be from about 0.25 minutes to about 12 minutes, preferably from about 1 minute to about 7 minutes, generally with the longer treatment times being employed with the lower temperatures and lower moisture contents.

In embodiments of the invention, the stabilization temperature and stabilization time, and moisture contents may be controlled so that starch gelatinization resulting from the stabilization in the stabilized ground or milled coarse fraction or bran component may be less than about 25%, preferably less than about 10%, most preferably less than about 5%, as measured by differential scanning calorimetry (DSC). The low degree of starch gelatinization and low degree of starch damage achieved in the present invention are exemplified by a starch melting enthalpy of greater than about 4 J/g, preferably greater than about 5 J/g, based upon the weight of starch in the stabilized bran component or ground coarse fraction, as measured by differential scanning calorimetry (DSC), at a peak temperature of from about 65° C. to about 70° C. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," *Cereal Foods World*, Vol. 33, No. 3, pgs. 306-311 (March 1988).

The low degree of starch gelatinization and low amount of starch damage due to abrasion during grinding may be measured by the sodium carbonate-water solvent retention capacity (SRC sodium carbonate). Solvent retention capacity (SRC) may be measured by mixing a sample of the ingredient or component, such as the stabilized ground coarse fraction or bran component, or a stabilized whole-grain wheat flour, having a weight (A), e.g., about 5 g, with a large excess of water or other solvent, such as an aqueous solution of sodium carbonate (e.g. 5% by weight sodium carbonate) and centrifuging the solvent-flour mixture. The supernatant liquid may then be decanted and the sample may be weighed to obtain the weight of the centrifuged wet sample (B), wherein the SRC value is calculated by the following equation: SRC value= ((B−A)/A))×100. In embodiments of the invention, the stabilized ground or milled coarse fraction or bran component may have a sodium carbonate-water solvent retention capacity (SRC sodium carbonate) of less than about 200%, preferably less than about 180%.

Although starch gelatinization, acrylamide production, and vitamin and antioxidant destruction are substantially limited, the heat stabilization achieves unexpectedly superior inactivation of lipase and lipoxygenase. These two components are believed to be primarily responsible for enzyme catalyzed rancidity of whole grain flour. In embodiments of the invention, a stabilized bran component which includes a ground or milled, heat-treated coarse fraction may have a lipase activity of less than about 3, preferably less than about 2, most preferably less than about 1 micromole butyrate free acid formed per hour per 0.1 gram of the stabilized bran component or stabilized ground or milled coarse fraction, wet basis or dry basis. In embodiments of the invention, this may be a reduction from a lipase activity of about 4 to 6 micromole butyrate free acid formed per hour per 0.1 gram of the unstabilized bran component or unstabilized ground or milled coarse fraction, or lipase reduction of at least about 25%. Most preferably, both lipase and lipoxygenase activities are completely eliminated. Also, acrylamide content may be limited to less than or equal to about 150 ppb, preferably less than or equal to about 100 ppb, based upon the weight of the stabilized bran component or stabilized coarse fraction. Natural antioxidants are maintained so that the stabilized coarse fraction may have an antioxidant free radical scavenging capacity of not less than about 150 micromoles Trolox equivalents per gram. Vitamin retention, such as retention of Vitamins E, B1 and B2 may be at least about 80% by weight, based upon the vitamin content in the bran component before stabilization.

Stabilization of the coarse fraction by heating may be conducted without substantial or any alteration of the proportions of germ, bran, starch or endosperm of the fraction or component subjected to the stabilization. Thus, in embodiments of the invention, the stabilized ground or milled coarse fraction or stabilized ground or milled bran component, irrespective of whether the stabilization is performed before, during or after grinding of the coarse fraction, may contain bran in an amount of at least about 50% by weight, based upon the weight of the stabilized ground or milled coarse fraction, or stabilized ground or milled bran component. The amount of germ present in the stabilized ground coarse fraction or bran component may be about the same relative amount to the bran as it is in the intact grain. The amount of starch or endosperm present in the stabilized ground or milled coarse fraction or bran component, may be less than about 40% by weight, but generally at least about 10% by weight starch or endosperm, for example from about 15% by weight to about 35% by weight starch, preferably less than or equal to about 30% by weight, based upon the weight of the stabilized ground or milled coarse fraction or bran component. In preferred embodiments, the stabilized ground or milled coarse fraction may contain at least about 60% by weight bran, and at least about 10% by weight germ, based upon the weight of the stabilized ground coarse fraction or bran component.

In embodiments of the invention, the starch of the stabilized, ground coarse fraction or bran component is structurally distinct and forms the 'red' color which results from the high molecular weight, highly-branched amylopectin-like starch found in the pericarp. The starch still associated with the bran fraction may, in embodiments of the invention, form a starch-iodine complex which absorbs at about 525 nm and about 600 nm light. An iodine binding absorbance ratio, less than about 1.2 (e.g. 600 nm/525 nm=1.15), preferably less than about 1.0 is a distinguishing characteristic. It shows the stabilized ground coarse fraction or bran component is highly enriched in bran, containing little associated starch (i.e. the starch is from the outer pericarp rather than from the endosperm).

In embodiments of the invention, the stabilized, ground coarse fraction, or the purified bran, after stabilization and particle size reduction may have an ash content of about 3% by weight to about 7% by weight, for example about 5.5%, and a density of from about 0.15 g/ml to about 0.5 g/ml, for example about 0.3 g/ml and an RH/moisture content controlled to between 20% to 50%. At this RH, moisture is optimized in favor of low mobility, slow reactivity yet there is enough water to inhibit free radical reactivity. The moisture content of the stabilized bran component may range from about 7% by weight to about 13% by weight, based upon the weight of the stabilized bran component, and the water activity may be less than about 0.7, preferably from about 0.2 to about 0.5.

The stabilization of the coarse fraction, whether conducted before or after grinding, may be performed without substantial or any alteration of the particle size distribution of the fraction or component subjected to the stabilization. For example, in preferred embodiments of the invention, the stabilized ground or milled fraction, or the stabilized ground or milled bran component may have the same or substantially the same particle size distribution as the ground or milled coarse fraction before it is stabilized. In embodiments of the invention, the stabilization may increase or decrease the moisture content of the coarse fraction, which in turn may change the particle size distribution. For example, the heat stabilization may dry the unground or ground coarse fraction and cause some shrinkage or reduction in particle sizes. Also, increasing the moisture content during stabilization, such as by steam injection, may swell the unground or ground coarse fraction and increase the particle sizes. It is preferable to neither gain nor lose moisture content during stabilization and so there should be no actual change in particle size due to moisture change during heat-treatment. However, if the moisture content does change during heat treatment stabilization, it does so within the desired range, e.g. 9% by weight to about 14% by weight, and the particle size distribution remains within the desired range. Thus, even if the moisture content changes during the heat treatment, the stabilized, ground or milled coarse fraction or the stabilized, ground or milled bran component may have a particle size distribution of at least about 40% by weight of the stabilized fraction or component having a particle size greater than or equal to 149 microns, and less than or equal to about 35% by weight having a particle size greater than or equal to 500 microns. In preferred embodiments, the stabilized ground or milled coarse fraction or bran component may have a particle size distribution of about 0.5% by weight to about 5% by weight greater than or equal to 841 microns, about 10% by weight to about 30% by weight less than 841 microns but greater than or equal to 500 microns, about 25% by weight to about 70% by weight greater than or equal to 149 microns but less than 500 microns, and less than or equal to about 60% by weight less than 149 microns, with the percentages adding up to a total of 100% by weight.

More preferably, the stabilized ground or milled coarse fraction or stabilized bran component may have a particle size distribution of about 0.5% by weight to about 5% by weight greater than or equal to 841 microns, about 15% by weight to about 25% by weight less than 841 microns but greater than or equal to 500 microns, about 45% by weight to about 60% by weight greater than or equal to 149 microns but less than 500 microns, and from about 10% by weight to about 30% by weight less than 149 microns, with the percentages adding up to a total of 100% by weight.

Stabilization of the coarse fraction may be on a batch, semi-batch or continuous basis, with the latter being preferred. Known heating vessels, such as batch cookers, mixers, rotating drums, continuous mixers, and extruders may be employed for heating the coarse fraction to stabilize it. The heating apparatus may be jacketed vessels equipped with heating or cooling jackets for external control of the stabilization temperature and/or steam injection nozzles for direct injection of moisture and heat into the coarse fraction. In other embodiments, infrared (IR) radiation or energy may be employed to heat the coarse bran fraction to stabilize it. In a preferred embodiment, a Lauhoff bran cooker, manufactured by Lauhoff may be employed for stabilization of the coarse fraction on a continuous basis. In embodiments where grinding or milling is performed simultaneously with heat stabilization, heated rollers may be employed. In such embodiments, the temperature and moisture content may be adjusted upward to shorten the stabilization time to conform to a desired grinding time for achieving a targeted particle size distribution.

In other embodiments of the invention, at least one, or all, of the retained or recovered ground coarse fractions and the further, or gap mill, ground coarse fraction may be stabilized or enzymatically inactivated using an edible stabilizing agent or treatment alone or in combination with thermal treatment. However, heat stabilization alone is preferred as a method of stabilizing the coarse fraction. Exemplary of edible stabilizing agents which may be employed in a stabilizing effective amount to a stabilizing extent prior to mixing of the coarse fraction with the fine fraction are edible alkali bisulfates, bisulfites, metabisulfites, and metabisulfates, such as sodium metabisulfite, organic acids, such as sorbic acid, sulfur dioxide, cysteine, thioglycolic acid, glutathione, hydrogen sulfide, other edible reducing agents, and mixtures thereof.

In embodiments of the invention, the heat-treated coarse fraction may be permitted to cool in ambient air. In other embodiments, cooling of the ground or milled coarse fraction or bran component after heat treatment may optionally be controlled to further minimize undesired gelatinization of starch. According to some embodiments of the invention, rapid cooling of the heated coarse fraction is preferred, for example, with chilled or room temperature ambient air. The heat-treated coarse fraction may be cooled to a surface temperature preferably below about 60° C. within 60 minutes. Generally, no further significant gelatinization occurs in the stabilized bran component at temperatures lower than about 60° C. Then the heat-treated coarse fraction may be cooled to room temperature, or about 25° C. In embodiments of the invention, the average cooling rate used to achieve a surface temperature of about 25° C. may be a temperature decrease of from about 1° C./min to about 3° C./min.

The cooling rate should be selected to minimize further gelatinization of starch in the coarse fraction after heat-treatment, but should not be so fast as to prevent further inactivation of lipase and LPO, if needed. If no further inactivation of lipase or LPO is desired, cooling may be conducted to quickly reduce the temperature of the heat-treated coarse fraction to less than about 60° C. For example, a higher cooling rate may be employed for initial cooling of the heat-treated coarse fraction, followed by a lower cooling rate. Also, the cooling rate can be selected to dry the heat-treated coarse fraction to various degrees. For example, longer cooling periods at lower cooling rates provide a drier stabilized coarse fraction when compared to a stabilized coarse fraction cooled at higher cooling rates for shorter periods of time.

A cooler or cooling device may be located at the exit of a bin, for example a surge bin, or conveyer belt which receives the heat-treated coarse fraction. Coolers which may be used for the processes of the invention include cooling tubes or cooling tunnels through which the heat-treated coarse fraction passes under the force of gravity or on a conveyor device. While the heat-treated coarse fraction passes through the device, cooled air may be passed over and through the coarse fraction or bran component. The spent cooling air may then be collected or suctioned off, for example, by a hood, and further treated in a cyclone separator. A preferred cooler supplies cooling air to various regions along the length of a cooling tube or tunnel. Preferably, the cooling air is passed through a chilling device prior to contacting the heat-treated coarse fraction to achieve a temperature which is lower than that of ambient air.

After cooling, the moisture content of the heat-treated coarse fraction may optionally be further reduced by drying.

Drying temperatures of less than about 60° C. are preferred so that no further gelatinization of starch occurs during the drying process. In accordance with the present invention, drying temperatures may range from about 0° C. to about 60° C. However, drying at ambient temperature is less expensive than drying at a cooler temperature and will prevent further gelatinization of the starch in the heat-treated coarse fraction during drying. Drying is preferably conducted in an atmosphere having a low relative humidity, and may preferably be conducted in a reduced pressure atmosphere. In embodiments of the present invention drying may be performed until the moisture content of the heat-treated coarse fraction or bran component is reduced to the range of from about 7% by weight to about 14% by weight, preferably from about 10% by weight to about 13% by weight. If the heat treatment and optional cooling achieve moisture contents within a desired range, no drying step is deemed necessary.

Production of the Stabilized Whole Grain Flour

The stabilized ground coarse fraction or stabilized bran component may be combined with the fine fraction to obtain a stabilized whole grain flour, such as a stabilized whole grain wheat flour, of the present invention. The stabilized whole grain flour, such as stabilized whole grain wheat flour, includes bran, germ and endosperm, where only a portion of the endosperm has been subjected to heat stabilization but at least a substantial portion of the bran and germ have been subjected to stabilization by heating. The stabilized bran component or stabilized, ground coarse fraction are preferably derived from the same whole grains or berries or kernels from which the endosperm fraction is derived. However, in other embodiments, the stabilized bran component or stabilized, ground coarse fraction may be combined or blended with an endosperm fraction which is derived or obtained from a different source of grains or berries or kernels. In each embodiment however, the stabilized bran component and the endosperm fraction are combined or blended so as to provide a stabilized whole grain flour which contains endosperm, bran and germ in the same or substantially the same relative proportions as they exist in the intact grain.

The stabilized bran fraction which comprises a ground or milled, heat-treated coarse fraction comprising bran, germ and starch may be blended, combined, or admixed with the endosperm fraction using conventional metering and blending apparatus known in the art to obtain an at least substantially homogeneous stabilized whole grain flour. Exemplary of mixing or blending devices which may be employed include batch mixers, rotating drums, continuous mixers, and extruders.

In embodiments of the invention, the stabilized whole grain wheat flour may have a lipase activity less than about 1.5, preferably less than about 1.25, most preferably less than about 1 micromole butyrate free acid formed per hour per 0.1 gram of the stabilized whole grain flour, wet basis or dry basis. The acrylamide content of the stabilized whole grain flour may be less than about 45 ppb, preferably less than about 30 ppb, based upon the weight of stabilized whole grain flour. The stabilized whole grain wheat flours may have an unexpectedly low free fatty acid content of less than about 10% by weight of total flour lipids after one month under accelerated storage at 95° C., or less than about 3,000 ppm, based upon the weight of the stabilized whole grain flour. The stabilized whole grain wheat flours may exhibit an unexpectedly low hexanal content of less than about 10 ppm after 1 month accelerated storage at 95° C., based upon the weight of the stabilized whole grain flour.

The moisture content of the stabilized whole grain flour, such as stabilized whole grain wheat flour, may range from about 10% by weight to about 13% by weight, based upon the weight of the stabilized whole grain flour, and the water activity may be less than about 0.7. In embodiments, the stabilized whole grain wheat flour may have a protein content of from about 10% by weight to about 14% by weight, for example about 12% by weight, a fat content of from about 1% by weight to about 3% by weight, for example about 2% by weight, and an ash content of from about 1.2% by weight to about 1.7% by weight, for example about 1.5% by weight, each of the percentages being based upon the weight of the stabilized whole grain flour.

The stabilized whole grain flour, such as stabilized whole grain wheat flour, may have a substantial portion of starch which is non-gelatinized or essentially non-gelatinized because it comes from the fine fraction which does not undergo heat stabilization. A smaller portion of the starch may be partially gelatinized to a low degree, because it comes from the heat-treated coarse fraction or bran component. In embodiments of the invention, the stabilized whole grain flour, such as stabilized whole grain wheat flour, may have a low degree of starch gelatinization of less than about 25%, preferably less than about 10%, most preferably less than about 5%, as measured by differential scanning calorimetry (DSC). The starch melting enthalpy of the starch contained in the stabilized whole grain wheat flour may be greater than about 4 J/g, preferably greater than about 5 J/g, based upon the weight of starch in the stabilized whole grain flour, as measured by differential scanning calorimetry (DSC), at a peak temperature of from about 65° C. to about 70° C.

The stabilized whole grain flour, such as stabilized whole grain wheat flour, may have a particle size distribution of less than about 10% by weight, preferably less than about 5% by weight on a No. 35 (500 micron) U.S. Standard Sieve, about 20% by weight to about 40% by weight on a No. 60 (250 micron) U.S. Standard Sieve, about 10% by weight to about 60% by weight, preferably from about 20% by weight to about 40% by weight on a No. 100 (149 micron) U.S. Standard Sieve, and less than about 70% by weight, for example from about 15% by weight to about 55% by weight, through a No. 100 (149 micron) U.S. Standard Sieve.

The stabilized whole grain wheat flour exhibits excellent baking functionality with a sodium carbonate-water solvent retention capacity (SRC sodium carbonate) of less than about 85%, preferably less than about 82%, for example from about 70% to about 80%. In embodiments of the invention, oven spread or cookie spread may be at least about 130% of the original prebaked dough diameter, as measured according to the AACC 10-53 bench-top method.

The present invention is applicable to any and all types of wheat. Although not limited thereto, the wheat berries may be selected from soft/soft and soft/hard wheat berries. They may comprise white or red wheat berries, hard wheat berries, soft wheat berries, winter wheat berries, spring wheat berries, durum wheat berries, or combinations thereof. Examples of other whole grains that may be processed in accordance with various or certain embodiments or aspects of this invention include, for example, oats, corn, rice, wild rice, rye, barley, buckwheat, bulgar, millet, sorghum, and the like, and mixtures of whole grains.

The present invention provides an improved raw material stability and greater than one month shelf life, for example 2 months or more, under accelerated storage conditions, for a stabilized bran component or ingredient and for a stabilized whole grain flour, such as stabilized whole grain wheat flour. A more stable food product can be stored under similar conditions for a longer period of time than a less stable food product before going rancid. The presence of rancidity can be monitored and measured in a multiplicity of different manners, including sensory testing (e.g., taste and/or odor analysis), lipoxygenase or lipase activity level measurements, free fatty acid level measurements, and/or hexanal level measurements.

In other embodiments of the invention, the stabilized bran component or the stabilized whole grain flour, such as stabilized whole grain wheat flour, may be combined, admixed, or blended with refined wheat flour to obtain a fortified flour, product or ingredient, such as fortified wheat flour. The fortified wheat flour product may contain the stabilized bran component or the stabilized whole grain flour, such as stabilized whole grain wheat flour, in an amount of from about 14% by weight to about 40% by weight, for example from about 20% by weight to about 30% by weight, based upon the total weight of the fortified flour product, such as fortified wheat flour product.

The stabilize whole grain flour, such as stabilized whole grain wheat flour, may be employed to partially or completely replace refined wheat flour, or other flours, in a variety of food products. For example, in embodiments of the invention, at least about 10% by weight, at most 100% by weight, for example from about 30% by weight to about 50% by weight of the refined wheat flour, may be replaced by the stabilized whole grain wheat flour to increase nutritional values of refined wheat flour products with little, if any detriment to product appearance, texture, aroma, or taste.

The stabilized bran components and stabilized whole grain products, such as stabilized whole grain wheat products, obtained in the present invention can be packaged, stabley stored, and subsequently or immediately further used in food production. The stabilized bran products and flour products are ready for further processing into the finished food products by adding water and other applicable food ingredients, mixing, shaping, and baking or frying, etc. Doughs containing the stabilized bran and whole grain flours, such as whole grain wheat flour, may be continuously produced and machined, for example sheeted, laminated, molded, extruded, or coextruded, and cut, on a mass production basis. The finished whole grain products (e.g., biscuits, cookies, crackers, snack bars, etc.) have a pleasant texture with the characteristics of a whole grain taste.

The stabilized bran components and stabilized whole-grain flours products, such as stabilized whole-grain wheat flour products, of the present invention may be used in a wide variety of food products. The food products include farinaceous food products, and biscuit type products in particular, pasta products, ready-to-eat cereals, and confections. In one embodiment, the food products may be bakery products or snack foods. The bakery products may include cookies, crackers, pizza crusts, pie crusts, breads, bagels, pretzels, brownies, muffins, waffles, pastries, cakes, quickbreads, sweet rolls, donuts, fruit and grain bars, tortillas, and par-baked bakery products. The snack products may include snack chips and extruded, puffed snacks. The food product particularly may be selected from cookies, crackers, and cereal crunch bars. The cookies may be bar-type products, extruded, coextruded, sheeted and cut, rotary molded, wire cut, or sandwich cookies. Exemplary of cookies which may be produced include sugar wafers, fruit filled cookies, chocolate chip cookies, sugar cookies, and the like. The crackers may be fermented or non-fermented type crackers, and graham crackers. The baked goods produced in accordance with the present invention may be crackers or cookies having a full fat content or they may be a reduced fat, low-fat, or no-fat product.

In addition to water, cookie, cracker, and snack ingredients which may be admixed with the stabilized whole grain flour, such as stabilized whole grain wheat flour, of the present invention include enriched wheat flour, vegetable shortening, sugar, salt, high fructose corn syrup, leavening agents, flavoring agents and coloring agents. Enriched wheat flours which may be used include wheat flours enriched with niacin, reduced iron, thiamine mononitrate and riboflavin. Vegetable shortenings which may be used include those made of partially hydrogenated soybean oil. Leavening agents which may be used include calcium phosphate and baking soda. Coloring agents which may be used include vegetable coloring agents such as annatto extract and turmeric oleoresin.

Dough made in accordance with the present invention includes dough comprising various combinations of the aforementioned cookie, cracker, and snack ingredients. According to some embodiments, all of the foregoing ingredients are homogeneously admixed and the amount of water is controlled to form a dough of desired consistency. The dough may then be formed into pieces and baked or fried to produce products having excellent moisture, geometry, appearance, and texture attributes.

The present invention is illustrated by the following non-limiting examples wherein all parts, percentages, and ratios are by weight, all temperatures are in ° C., and all temperatures are atmospheric, unless indicated to the contrary:

EXAMPLE 1

Preparation of Stabilized Bran Component

In this example, a stabilized wheat bran component, from the milling of tempered soft red and soft white wheat, is prepared and analyzed to determine the lipase activity, vitamin retention and the melting profile of the starch in the bran. Bran fractions having two different particle size distributions were subjected to stabilization treatments in accordance with the present invention. The larger particle size bran component has a particle size distribution representative of an unground coarse fraction. The smaller particle size bran component has a particle size distribution representative of a ground or milled coarse component.

Stabilized bran component was produced using bran obtained from the milling of tempered soft red and soft white wheat used in the production of white, refined flour. The bran, a by-product of milling, has an ash content of about 6.5% by weight, a moisture content of about 9.5% by weight to about 11.5% by weight, a relative humidity of about 45%, and a density of about 0.29 g/ml. The particle size of the bran was measured using a Ro Tap shaker with the aid of silicon beads to break up particle aggregates. Two particle sizes of bran were tested. The larger size had at least about 80% of the particle weight>500 microns and the smaller size had about 25% particle weight>500 microns, about 35%>250 microns, about 20%>149 microns and about 20%<149 microns. The bran contained about 22% to 25% starch as determined by iodometric measurement. Prior to stabilization, the bran moisture was adjusted by placing the bran in a covered container over a saturated salt solution, for one week at room temperature, to uniformly adjust moisture of the bran in increments from about 9.5% by weight to about 14% by weight moisture content according to Table 1:

TABLE 1

Bran Moisture Content

| Saturated Salt Solution | Relative Humidity | Bran Moisture Content, wt. % |
|---|---|---|
| $Mg(NO_3)_2 \cdot 6H2O$ | 52% | 9.56% to 10.23% |
| Atmosphere controlled room | 63% | 11.19% to 11.58% |
| $NH_4Cl$ | 79% | 13.94% to 14.09% |

The bran, 20 g, was placed in a sealed foil bag with three to four small pinholes to release pressure upon heating. The study was performed according to an experimental design outlined in Table 2. The bran was heated in a preheated forced air convection oven (Thelco Model 26, Precision Scientific) for either 3, 5 or 7 minutes and at either 100° C., 120° C. or 140° C., in order to determine the affect of bran moisture, heating time and temperature on lipase activity, vitamin retention and starch crystallinity. After heating, the bran was cooled in a refrigerator and then was placed in a sealed container and stored frozen. A portion of the sample was analyzed to determine: 1) lipase activity, 2) vitamin retention, and 3) starch crystallinity.

Determination of Lipase Activity

The lipase activity, expressed as μmoles hydrolysis product formed per hour per unit weight of bran, was found to be 5.87 μmoles/hr/0.1 g for the small particle size starting material and was reduced to 1.2 μmoles/hr/0.1 g at 11.58% by weight moisture after stabilization treatment for 5 minutes at 120° C. For the larger particle size, lipase activity was found to be 4.23 μmoles/hr/0.1 g for the starting material and was reduced to 0.83 μmoles/hr/0.1 g for material of 11.19% by weight moisture treated for 5 minutes at 120° C.

The experimental design for the stabilization conditions for treating the coarse fraction and the ground coarse fraction or bran component is shown in Table 2:

TABLE 2

Experimental Design for Coarse Fraction and Ground Coarse Fraction or Bran Component Stabilization

| Std | Run | Block | Factor 1 A: Temp., ° C. | Factor 2 B: Time, min. | Factor 3 C: Moisture, wt. % |
|---|---|---|---|---|---|
| 5 | 5 | Block 1 | 100 | 3 | 14.5 |
| 3 | 8 | Block 1 | 100 | 7 | 12.5 |
| 7 | 9 | Block 1 | 100 | 7 | 14.5 |
| 1 | 10 | Block 1 | 100 | 3 | 12.5 |
| 9 | 4 | Block 1 | 120 | 5 | 13.5 |
| 10 | 6 | Block 1 | 120 | 5 | 13.5 |
| 2 | 1 | Block 1 | 140 | 3 | 12.5 |
| 8 | 2 | Block 1 | 140 | 7 | 14.5 |
| 6 | 3 | Block 1 | 140 | 3 | 14.5 |
| 4 | 7 | Block 1 | 140 | 7 | 12.5 |

Retention of Vitamin E (tocopherol), B1 (thiamine) and B2 (riboflavin) in the stabilized bran was measured according to standard methods for vitamin analysis in foods.

The method used for lipase esterase activity measurement involves: 1) dispersing the bran in pH 7.0 buffer, 2) adding p-nitrophenyl butyrate substrate (Sigma 9876), and 3) spectrophotometric measurement of the esterase activity of the bran through release of p-nitrophenol which absorbs at 340 nm.

Measurement of Lipase Activity

The materials, instruments, and methods employed to measure lipase activity are:

Materials:
1. Phosphate buffer (pH 7.5, 0.2 M);
2. p-Nitrophenyl Butyrate (Sigma, 1045-5G);
3. acetonitrile;

Instruments:
1. Spectrophotometer;
2. Centrifuge, capable of 1000 g.

Methods:
1. Dissolve p-NPB in acetonitrile so that its concentration is 10.75 mM;
2. Weigh samples into centrifuge tube (for wheat: flour—0.05 g, bran and germ—0.02 g). Add 9 ml phosphate buffer (pH7.5) in the tube;
3. Add 1 ml of 10.75 mM p-NPB, the final concentration of p-NPB is 1.075 mM in the sample solution). Record the exact time of p-NPB addition; shake the sample tube, leave it in 25° C. water bath;
4. After 20 min of p-NPB addition, centrifuge the sample at 1000 g for 5 min.;
5. Measure the supernatant absorbance at 400 nm at exactly 30 min. after p-NPB addition;
6. Use phosphate buffer (9 ml) and p-NPB (1 ml) mixture as blank, leave the blank in 25° C. water bath for 20 minutes, centrifuge, and measure the absorbance at 30 min at 400 nm;
7. Calculate the sample absorbance by subtracting blank absorbance from it;

The lipase activity can be expressed as:
(sample A-blank A)/unit time/unit weight
or:
μmole of p-NPB hydrolyzed/hour/0.1 g Calculation:

$$\mu\text{mole of } p\text{-}NPB \text{ hydrolyzed} = (A - 0.0555)/1380$$

make adjustment according to time and sample weight.

Note:
1.) p-NPB can be hydrolyzed by water. So the substrate solution (in acetonitrile) must be handled carefully to avoid water. Mixing the substrate with buffer (the blank) will result in absorbance of 0.25-0.3 in this test;
2.) A blank must be tested each day.

Determination of Amount and Crystalline Melt Profile of Starch in Bran

The method for determining the amount of starch in the bran is adopted and modified from "Iodometric Determination of Amylose" Iodine Sorption: "Blue Value" by G. A. Gilbert and S. P. Spragg, Methods in Carbohydrate Chemistry, Volume IV, p. 168 (1964). The method involves: 1) dissolving of starch in boiling alkali, 2) neutralizing and buffering, 3) iodine binding of the amylose regions of starch, and 4) spectrophotometric measurement at 600 nm and 525 nm of the starch-iodine complex formed.

In determining the amount of starch in the bran, a purified wheat starch standard solution is prepared:

Preparation of Standard Wheat Starch Solution

Weigh 35 mg of purified wheat starch (Aytex-P, ADM) accurately (nearest 0.1 μg) and put in a 100 ml volumetric flask.

1. Add 1 ml of 1N NaOH and 2 ml of distilled water.
2. Place 3 minutes in a boiling water bath. Swirl each minute to disperse sample. At the end of 3 minutes remove and cool to room temperature.

3. Add an additional 9 ml of 1N NaOH.
4. Fill flask to 100 ml mark with distilled water.
5. Calculate final concentration of starch [μg/ml].

Develop Starch Concentration Curve
Measure 0, 2, 5, 10 and 15 ml of amylose standard into each of 5, 100 ml volumetric flasks.
  1. Measure 15, 13, 10, 5 and 0 ml of 0.1N NaOH into each of the five 100 ml volumetric flask so that each flask now contains 15 ml solution, each.
  2. Add 15 ml of 0.1 N HCl to each flask to neutralize.
  3. Add distilled water until the flask is three quarters full.
  4. Weigh into each 100 ml flask, 0.07 g to 0.09 g potassium hydrogen tartrate to buffer the solution.
  5. Add 1 ml of iodine solution (200 mg of iodine and 2 g of potassium iodide in 100 ml of water).
  6. Fill flask to 100 ml mark, mix thoroughly and let stand 30 minutes for color to stabilize.
  7. Read absorbance at 620 nm and 525 nm using standard 3 ml cuvettes.
  8. Develop standard curve, abs 620 nm vs. [starch, μg/ml]. Verify linearity over concentration range studied. Linear regression coefficient should be at least $R^2=0.99$.

Preparation of Bran Samples for Measurement
  1. Weigh 75 mg of bran accurately (to nearest 0.1 μg) and place in a 100 ml volumetric flask.
  2. Follow steps 2 through 5 above.
*Vigorous shaking of the flask during alkali treatment will help disperse bran.

Determine the Amount of Starch in Bran
Measure 2, 5 and 10 ml of bran sample solution prepared above into each of three 100 ml volumetric flasks.
  1. Add, 13 ml, 10 ml, and 5 ml of 0.1N NaOH so that each flask now has 15 ml solution.
  2. Add 15 ml of 0.1N HCl to neutralize.
  3. Follow steps 8 through 13 above.
  4. Use Beer's law (y=mx+b) to calculate concentration of starch in sample.

The starch content, of the bran samples and the leading commercial stabilized bran, is calculated according to the formula:

$$Abs620\ nm/(\text{slope of std. curve for purified wheat starch})=[\text{starch}, \mu g/ml]+\text{y-intercept(usually 0)}*100\ ml.$$

The proportion of starch in the bran samples is calculated as:

(weight of starch measured, μg/total weight of bran sample, μg)*100=% starch in bran.

The results are shown in FIG. 1 and Table 3:

TABLE 3

Proportion of Starch in the Bran Samples

| | weight starch measured (mg) | 620 bran | 525 bran | Ratio | Bran weighed out (mg) | wt. % starch |
|---|---|---|---|---|---|---|
| Purified Wheat Starch | 9.91 | 0.065 | 0.048 | 1.35 | | |
| | 19.82 | 0.137 | 0.114 | 1.2 | | |
| | 29.74 | 0.199 | 0.161 | 1.24 | | |
| | 29.74 | 0.198 | 0.16 | 1.24 | | |
| Commercial Bran | 25.37 | 0.085 | 0.095 | 0.89 | 74.79 | 41.96% |
| | 21.34 | 0.143 | 0.159 | 0.9 | | 35.30% |
| Bran | 16 | 0.052 | 0.051 | 1.02 | 72.03 | 22.21% |
| | 16.31 | 0.053 | 0.049 | 1.08 | | 22.64% |
| | 15.08 | 0.098 | 0.097 | 1.01 | | 20.93% |

Determination of the Crystalline Melt Profile of Starch in Bran

The crystalline melting profile of the starch in stabilized bran was determined by standard differential scanning calorimetry. The instrument and method used to characterize the starch in the bran are:

Instrument: TA Instruments Differential Scanning Calorimeter (DSC), which includes the TA Instruments DSC Q1000 Controller software, TA Instruments Q1000 Module and the TA Instruments RCS unit.

Sample Pans: Perkin-Elmer stainless steel high pressure capsules with o-ring.

Sample preparation: The ingredients are mixed with water at a 1:1 solids to water ratio. Approximately 35 to 50 milligrams of the moist ingredient are weighed in a DSC sample pan.

Instrument calibration: the DSC is calibrated for baseline, cell constant, temperature and heat capacity in a known manner:

Baseline calibration: using two empty sample pans the baseline slope and baseline offset are determined over a temperature range from 10° C. to 150° C., with a heating rate of 5° C./min.

Cell constant calibration: indium is used as a standard.

Temperature calibration: calibrated at one point using indium.

The DSC calibration data analysis software program is used to make the proper DSC calibration corrections with the instrument in the calibration mode. Heat capacity is calibrated using sapphire, in a known manner. The sample is characterized with the DSC in the standard mode using a ramp rate of 5° C. from 50° C. to 100° C. To analyze the results, the total heat flow curve is integrated from 57.5° C. to 80° C. to measure the enthalpy of the crystalline starch in the bran sample. Samples are run at least in duplicate.

Figure 2:
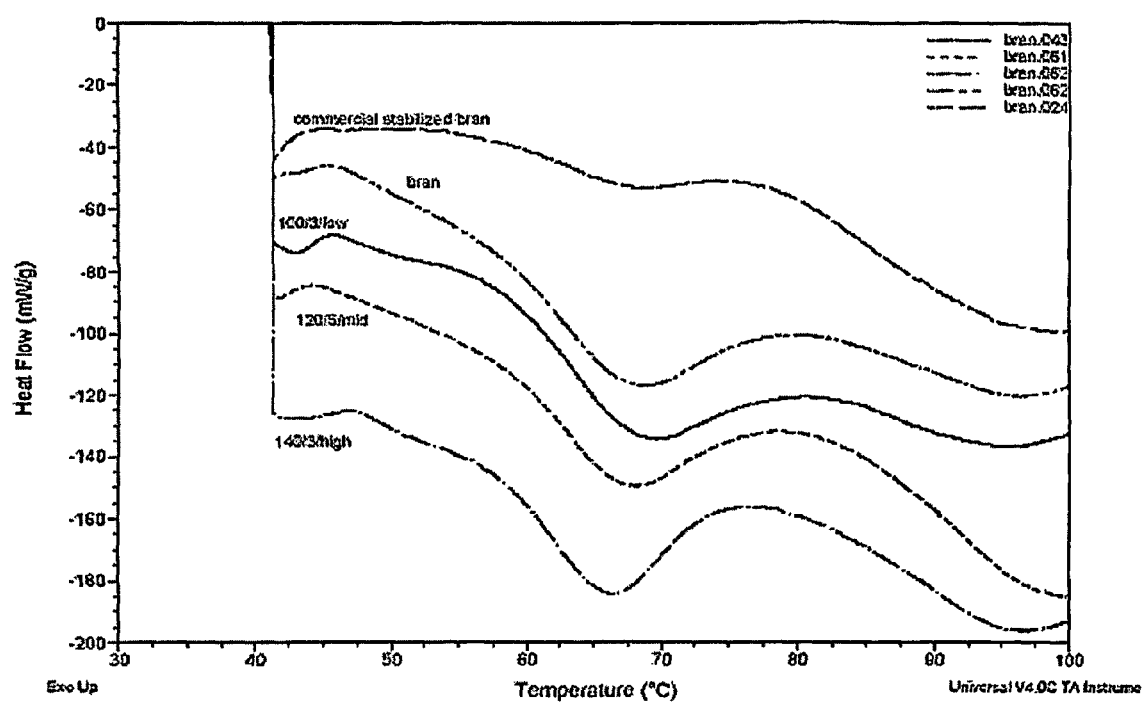
FIG. 2 shows the crystalline melting profile of starch in stabilized bran samples as determined by standard differential scanning calorimetry (DSC).

Results of the DSC analysis for bran containing starch are shown in FIG. 2. The onset of melting occurs at about 57.5° C., the endothermic peak or melting point is about 67° C., and the endpoint of melting occurs at about 80° C. The software calculates the enthalpy of the endothermic peak in J/g starch in bran. Starch enthalpy values for stabilized bran ranged from about 4.8 J/g starch to about 5.3 J/g starch and are substantially higher than starch enthalpy values of 0.8 J/g recorded for the leading commercial stabilized bran.

Summarized in Table 4 and 5, for the stabilization treatment of eight samples of large particle bran samples and eight smaller particle bran samples, are: 1) the amount of lipase enzyme activity, wet and dry weight basis, 2) percent lipase activity reduction, 3) treatment conditions including moisture, time, and temperature, 4) vitamin content, 5) starch melting enthalpy, and 6) percent starch gelatinized. As indicated in Tables 4 and 5, the treatment of bran at a moisture content of 11.5% for 5 minutes at 120° C. reduced lipase activity from 5.87 μmoles/hr/0.1 g bran (dwb) down to 1.23 μmoles/hr/0.1 g and from 4.23 μmoles/hr/0.1 g (dwb) down to 0.83 μmoles/hr/0.1 g, depending on particle size of bran. The results also indicate that 86% of Vitamin E, 91% of Vitamin B1 and 88% of Vitamin B2 are retained. Furthermore, as shown in Table 5, the degree of starch gelatinization is controlled to <10% of the total starch in the material treated:

TABLE 4

Effect of Stabilization Conditions on Lipase Activity, Vitamin Retention and Starch Gelatinization
Coarse Fraction

| Std | Bran Run | Block | Factor 1 A: temp, °C. | Factor 2 B: time, min. | Factor 3 C: moisture, wt. % | actual moisture, wt. % before treatment | actual moisture, wt. % after treatment | Lipase Activity (µmoles/hr/0.1 g) wet base | Lipase Activity (µmoles/hr/0.1 g) dry base | % reduction wet base | % reduction dry base | vitamin retention E (IU/100 g) | vitamin retention B1 (mg/100 g) | vitamin retention B2 (mg/100 g) |
|---|---|---|---|---|---|---|---|---|---|---|---|---|---|---|
| 1 | 10 | Block 1 | 100 | 3 | 12.5 | 10.23 | 9.45 | 2.58 | 2.85 | 39.01 | 32.62 | 0.6 | 0.43 | 0.15 |
| 5 | 5 | Block 1 | 100 | 3 | 14.5 | 14.09 | 13.14 | 2.04 | 2.35 | 51.77 | 44.44 | | | |
| 3 | 8 | Block 1 | 100 | 7 | 12.5 | 10.23 | 9.92 | 1.9 | 2.11 | 55.08 | 50.12 | 0.6 | 0.42 | 0.14 |
| 7 | 9 | Block 1 | 100 | 7 | 14.5 | 14.09 | 12.54 | 0.9 | 1.03 | 78.72 | 75.65 | | | |
| 9 | 4 | Block 1 | 120 | 5 | 13.5 | 11.19 | 10.97 | 0.76 | 0.83 | 82.03 | 80.38 | | | |
| 10 | 6 | Block 1 | 120 | 5 | 13.5 | 11.19 | 9.23 | 0.87 | 0.98 | 79.43 | 76.83 | | | |
| 2 | 1 | Block 1 | 140 | 3 | 12.5 | 10.23 | 9.81 | 1.05 | 1.16 | 75.18 | 72.58 | | | |
| 6 | 3 | Block 1 | 140 | 3 | 14.5 | 14.09 | 11.16 | 0.57 | 0.64 | 86.52 | 84.87 | 0.6 | 0.39 | 0.15 |
| 4 | 7 | Block 1 | 140 | 7 | 12.5 | 10.23 | 5.59 | 0.88 | 0.94 | 79.2 | 77.78 | | | |
| 8 | 2 | Block 1 | 140 | 7 | 14.5 | 14.09 | 8.59 | 0.35 | 0.38 | 91.73 | 91.02 | | | |
| 11 | 11 | Block 1 | 140 | 7 | 13.5 | 11.19 | 9.37 | 0.63 | 0.7 | 85.11 | 83.45 | | | |
| 12 | 12 | Block 1 | 140 | 3 | 13.5 | 11.19 | 9.93 | 1.98 | 2.2 | 53.19 | 47.99 | 0.6 | 0.42 | 0.14 |
| Starting material (A bran moisture = 10.51%) | | | | | | | | 3.83 | 4.23 | | | 0.7 | 0.43 | 0.16 |

TABLE 5

Effect of Stabilization Conditions on Lipase Activity and Starch Gelatinization
Ground Bran

| Std | Run | Block | Factor 1 A: temp, °C. | Factor 2 B: time, min. | Factor 3 C: moisture, wt. % | actual moisture, wt. % before treatment | actual moisture, wt. % after treatment | Lipase Activity (µmole/hr/0.1 g) wet base | Lipase Activity (µmole/hr/0.1 g) dry base | % reduction wet base | % reduction dry base | Starch Gelatinization Starch melting enthalpy (J/g) | Starch Gelatinization % gelatinized |
|---|---|---|---|---|---|---|---|---|---|---|---|---|---|
| 1 | 10 | Block 1 | 100 | 3 | 12.5 | 9.56 | 7.49 | 3.51 | 3.79 | 35.6 | 35.43 | 5.327 | 0 |
| 5 | 5 | Block 1 | 100 | 3 | 14.5 | 13.94 | 11.87 | 2.15 | 2.44 | 60.55 | 58.43 | | |
| 3 | 8 | Block 1 | 100 | 7 | 12.5 | 9.56 | 7.7 | 2.5 | 2.71 | 54.13 | 53.83 | | |
| 7 | 9 | Block 1 | 100 | 7 | 14.5 | 13.94 | 11.36 | 1.08 | 1.22 | 80.18 | 79.22 | | |
| 9 | 4 | Block 1 | 120 | 5 | 13.5 | 11.58 | 9.6 | 1.12 | 1.23 | 79.45 | 79.05 | 4.784 | 8.86 |
| 10 | 6 | Block 1 | 120 | 5 | 13.5 | 11.58 | 9.38 | 1.19 | 1.32 | 78.17 | 77.51 | | |
| 2 | 1 | Block 1 | 140 | 3 | 12.5 | 9.56 | 8.35 | 1.57 | 1.71 | 71.19 | 70.87 | | |
| 6 | 3 | Block 1 | 140 | 3 | 14.5 | 13.94 | 11.79 | 0.88 | 0.99 | 83.85 | 83.13 | 4.943 | 5.83 |
| 4 | 7 | Block 1 | 140 | 7 | 12.5 | 9.56 | 7.64 | 1.17 | 1.27 | 78.53 | 78.36 | | |
| 8 | 2 | Block 1 | 140 | 7 | 14.5 | 13.94 | 9.13 | 0.7 | 0.77 | 87.16 | 86.88 | | |
| Starting material (ground bran, moisture = 7.19%) | | | | | | | | 5.45 | 5.87 | | | 5.249 | |

EXAMPLE 2

Preparation of Stabilized Bran Component

In this example, a stabilized wheat bran component, containing bran, germ and starch from the milling of untempered soft red whole grain wheat flour milling, is prepared and analyzed to determine the lipase activity, vitamin retention, and formation of acrylamide in the stabilized component mixture.

A stabilized bran component was produced using bran and germ obtained from the milling of untempered soft red wheat used in the production of whole grain wheat flour. The mixture has an ash content of 5.5% by weight, a moisture content of about 10% by weight to about 12% by weight, a relative humidity of about 50%, and a density of about 0.2 g/ml to 0.4 g/ml. The particle size of the bran component was measured using a Ro Tap shaker with the aid of silicon beads to break up particle aggregates. The particle sizes of the mixture were: about 17%-20% particle weight>500 microns; about 40% by weight to about 42% by weight<500 micron but >250 microns; about 18% by weight to about 20% by weight<250 but >149 microns; and about 20% by weight<149 microns. The mixture contained about 22% by weight to about 25% by weight starch as determined by iodometric measurement as in Example 1. Prior to stabilization, the moisture was adjusted as in Example 1, to uniformly adjust moisture of the bran component in increments from about 9.5% to 14% moisture content according to Table 6:

TABLE 6

Bran Component Moisture Content

| Saturated Salt Solution | Relative Humidity | Bran Component Moisture, wt. % |
|---|---|---|
| Mg(NO$_3$)$_2$•6H$_2$0 | 52% | 10.84% |
| Atmosphere controlled room | 63% | 11.33% |
| NH$_4$Cl | 79% | 12.89% |

The bran component, 200 g, was placed in a sealed foil bag with three to four small pinholes to release pressure upon heating. The study was performed according to an experimental design outlined in Table 7. The bran was heated in a pre-heated forced air convection oven (Thelco Model 26, Precision Scientific) for either 3, 5 or 7 minutes and at either 100° C., 120°, or 140° C., in order to determine the effect of bran moisture, heating time and temperature on lipase activity, vitamin retention and acrylamide production. After heating the bran component was cooled in a refrigerator and then was placed in a sealed container and stored frozen. A portion of the sample was analyzed to determine: 1) lipase activity, 2) vitamin retention, and 3) acrylamide content.

Determination of Lipase Activity

The lipase activity, expressed as μmoles hydrolysis product formed per hour per unit weight of bran, was found to be about 4.4 μmole/hr/0.1 g for the starting material and was reduced to about 1.25 to 1.52 μmole/hr/0.1 g at 11.33% by weight moisture after stabilization treatment for 5 minutes at 120° C. Measurement of lipase activity was according to the method set forth in Example 1.

The experimental design for the stabilization conditions for the bran component is shown in Table 7 where Factor 3 is an arbitrary moisture content number that the statistician uses as a placeholder until the actual low, medium and high moisture values are determined as shown in Table 9:

TABLE 7

Experimental Design for Stabilization of Bran Component

| Std | Run | Block | Factor 1 A: Temp., ° C. | Factor 2 B: Time, min. | Factor 3 C: Moisture, wt. % |
|---|---|---|---|---|---|
| 5 | 5 | Block 1 | 100 | 3 | 14.5 |
| 3 | 8 | Block 1 | 100 | 7 | 12.5 |
| 7 | 9 | Block 1 | 100 | 7 | 14.5 |
| 1 | 10 | Block 1 | 100 | 3 | 12.5 |
| 9 | 4 | Block 1 | 120 | 5 | 13.5 |
| 10 | 6 | Block 1 | 120 | 5 | 13.5 |
| 2 | 1 | Block 1 | 140 | 3 | 12.5 |
| 8 | 2 | Block 1 | 140 | 7 | 14.5 |
| 6 | 3 | Block 1 | 140 | 3 | 14.5 |
| 4 | 7 | Block 1 | 140 | 7 | 12.5 |

Determination of Acrylamide

Formation of acrylamide in the stabilized bran was measured according to "Acrylamides by LCMS", United States Food and Drug Administration, Center for Food Safety and Applied Nutrition, Office of Plant and Dairy Foods and Beverages, "Detection and Quantization of Acrylamide in Foods". (2002).

Determination of the Amount of Starch in Bran Component

Figure 3:
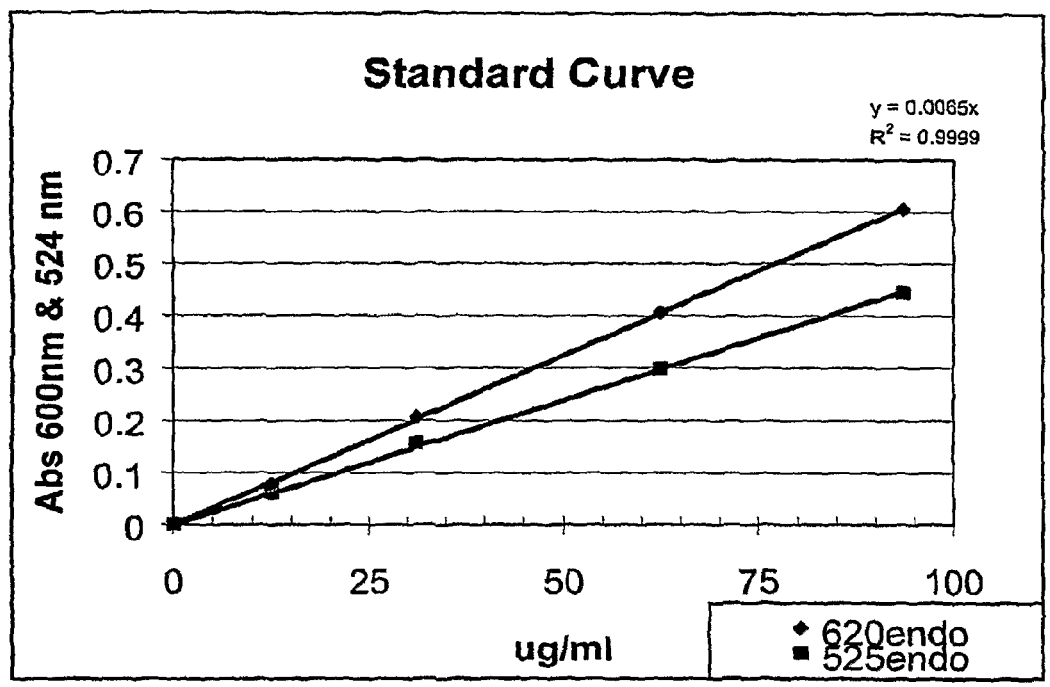
FIG. 3 shows a plot of absorbance at 620 nm and 525 nm vs. the concentration of starch in a sample, which is used to calculate the starch content of the bran fraction samples of Example 2.

The method for determining starch in the bran component is according to the method set forth in Example 1. The results are shown in FIG. 3 and Table 8:

TABLE 8

Proportion of Starch in the Samples

| Sample ID | weight starch measured (mg) | 620 nm | 525 nm | ratio | Bran-Germ weight (mg) | wt. % starch |
|---|---|---|---|---|---|---|
| Purified | 0 | 0 | 0 | | | |
| Wheat | 12.5 | 0.079 | 0.061 | 1.3 | | |
| Starch | 31.2 | 0.207 | 0.156 | 1.33 | | |
| | 62.4 | 0.405 | 0.298 | 1.36 | | |
| | 93.6 | 0.605 | 0.443 | 1.37 | | |
| Bran- | 33.73 | 0.113 | 0.104 | 1.09 | 132.81 | 25.40% |
| Germ | 34.18 | 0.229 | 0.213 | 1.08 | 132.81 | 25.74% |
| Bran- | 68.55 | 0.104 | 0.098 | 1.06 | 15.52 | 22.64% |
| Germ | 137.1 | 0.217 | 0.205 | 1.06 | 32.39 | 23.62% |

Summarized in Table 9, for the stabilization of eight samples of the stabilized bran component are: (1) the amount of lipase enzyme activity, wet and dry basis, (2) percent lipase activity reduction, (3) treatment conditions including moisture, time, and temperature, (4) vitamin content, and (5) acrylamide formed:

TABLE 9

Effect of Bran Component Stabilization Conditions on Lipase Activity, Vitamin Retention and Acrylamide Formation

| Factor 1 A: temp, ° C. | Factor 2 B: time, min. | Factor 3 C: moisture, wt. % | actual moisture wt. % before treatment | actual moisture wt. % after treatment | lipase activity, μmole/hr/0.1 g wet base | lipase activity, μmole/hr/0.1 g dry base | % lipase reduction wet base | % lipase reduction dry base | vitamin retention E (IU/100 g) | vitamin retention B1 (mg/100 g) | vitamin retention B2 (mg/100 g) | acrylamide (ppb) |
|---|---|---|---|---|---|---|---|---|---|---|---|---|
| none | none | 10.12 | | | 4.03 | 4.43 | | | 1.7 | 0.38 | 0.16 | 50.5 |
| 100 | 3 | 12.5 | 10.84 | 9.64 | 2.69 | 2.98 | 33.18 | 32.71 | 1.6 | 0.38 | 0.15 | 33 |
| 100 | 7 | 14.5 | 12.89 | 12.4 | 1.55 | 1.77 | 61.42 | 59.92 | 1.5 | 0.4 | 0.15 | 95.7 |
| 120 | 5 | 13.5 | 11.33 | 10.06 | 1.12 | 1.25 | 72.2 | 71.87 | 1.7 | 0.43 | | 56.1 |
| 120 | 5 | 13.5 | 11.33 | 10.56 | 1.36 | 1.52 | 66.21 | 65.62 | 1.6 | 0.37 | 0.13 | 81.1 |
| 140 | 3 | 12.5 | 10.84 | 9.83 | 1.86 | 2.06 | 53.87 | 53.45 | 1.7 | 0.41 | 0.16 | 67.8 |
| 140 | 7 | 14.5 | 12.89 | 10.84 | 0.48 | 0.54 | 88 | 87.75 | 1.8 | 0.35 | 0.15 | 138 |
| Commercial stabilized bran & germ mixture, Grain Millers | | | | | 1.25 | | | | | | | 132 |

As indicated in Table 9, treatment of the bran component at a moisture content in the range of about 9% by weight to about 13% by weight for about 3 minutes to about 7 minutes at about 100° C. to about 140° C. reduced lipase activity from about 4.4 μmole/hour/0.1 g for the non-stabilized starting material down to the range of from 2.98 μmole/hour/0.1 g to about 0.5 μmole/hour/0.1 g, depending upon treatment conditions, with the longest treatment time, highest moisture content and highest treatment temperature providing the lowest lipase activity. The results also indicate the values of Vitamin E (tocopherol), Vitamin B1 (Thiamine), and Vitamin B2 (Riboflavin) were well retained. Furthermore, acrylamide production increased with increasing stabilization temperatures and times.

EXAMPLE 3

Effect of Grinding and Stabilization on Functional Characteristics of Bran

In this example particle size and solvent retention capacity (SRC) of an unground, unstabilized coarse fraction, an unstabilized ground coarse fraction or bran component, and a ground coarse fraction or bran component stabilized in accordance with the present invention, were compared to commercial stabilized bran-germ ingredients manufactured by Grain Millers.

Determination of Particle Size Distribution

Particle size of the ground bran-germ mixture or bran component was determined using a RoTap Shaker. The method is applicable to a wide variety of products and ingredients and uses a uniform mechanical action to assure accurate, dependable results. The shaker reproduces the circular and tapping motion used in hand sieving. The method was adapted from the ASTA 10.0 RoTap Shaker method with the following modifications and adaptations:

Apparatus
1. Tyler RoTap electric testing sieve shaker (Fisher Scientific), with automatic timer.
2. U.S. Standard Sieves, #20, #35, #40, #50, #60, #80, #100, bottom separator pan, and cover.
3. Weigh balance, accurate to 0.1 g
4. Brushes for cleaning screens
5. Silicon powder flow aid (Syloid #244, W.R. Grace & Co.)

Procedure
1. Use clean, thoroughly dried, tared sieves.
2. Accurately weigh the designated size of sample (to nearest 0.1 g) into a 250 ml or 400 ml beaker.
3. Tare the appropriate sieves and bottom pan individually.
4. Stack the sieves on the shaker with the coarsest opening at the top and increase in fineness until the finest opening is at the bottom. Place a bottom pan underneath.
5. Transfer the sample quantitatively from the beaker to the top sieve.
6. Place the sieve cover on top, then the shaker plate, circular frame and lower the tap arm.
7. Set the timer for 5 minutes.
8. After completion of shaking, remove sieves from RoTap and carefully weigh each sieve and the pan separately.

Calculations
1. Using one sieve $$a)\ \%\ on = \frac{(\text{wt. of sieve} + \text{material}) - \text{wt. of sieve}}{\text{wt. of sample}} \times 100$$

b) % thru=100−% on
c) Using three sieves or more
Sieve A ($S_a$), coarse, top
Sieve B ($S_b$), medium, middle
Sieve C ($S_c$), fine, bottom
Etc.

$$a.\ \%\ on_a = \frac{(\text{wt. of } S_a + \text{material}) - \text{wt. of } S_a}{\text{wt. of sample}} \times 100$$

$$b.\ \%\ on_b = \frac{(\text{wt. of } S_b + \text{material}) - \text{wt. of } S_b}{\text{wt. of sample}} \times 100$$

$$c.\ \%\ on_c = \frac{(\text{wt. of } S_c + \text{material}) - \text{wt. of } S_c}{\text{wt. of sample}} \times 100$$

d) The amount of silicon powder flow aid added to the sample should be subtracted from the weight in pan before doing the above calculation.
e) The sum of the percentages on all the screens (plus pan) should be equal to or closely approximate 100%.

Figure 4:
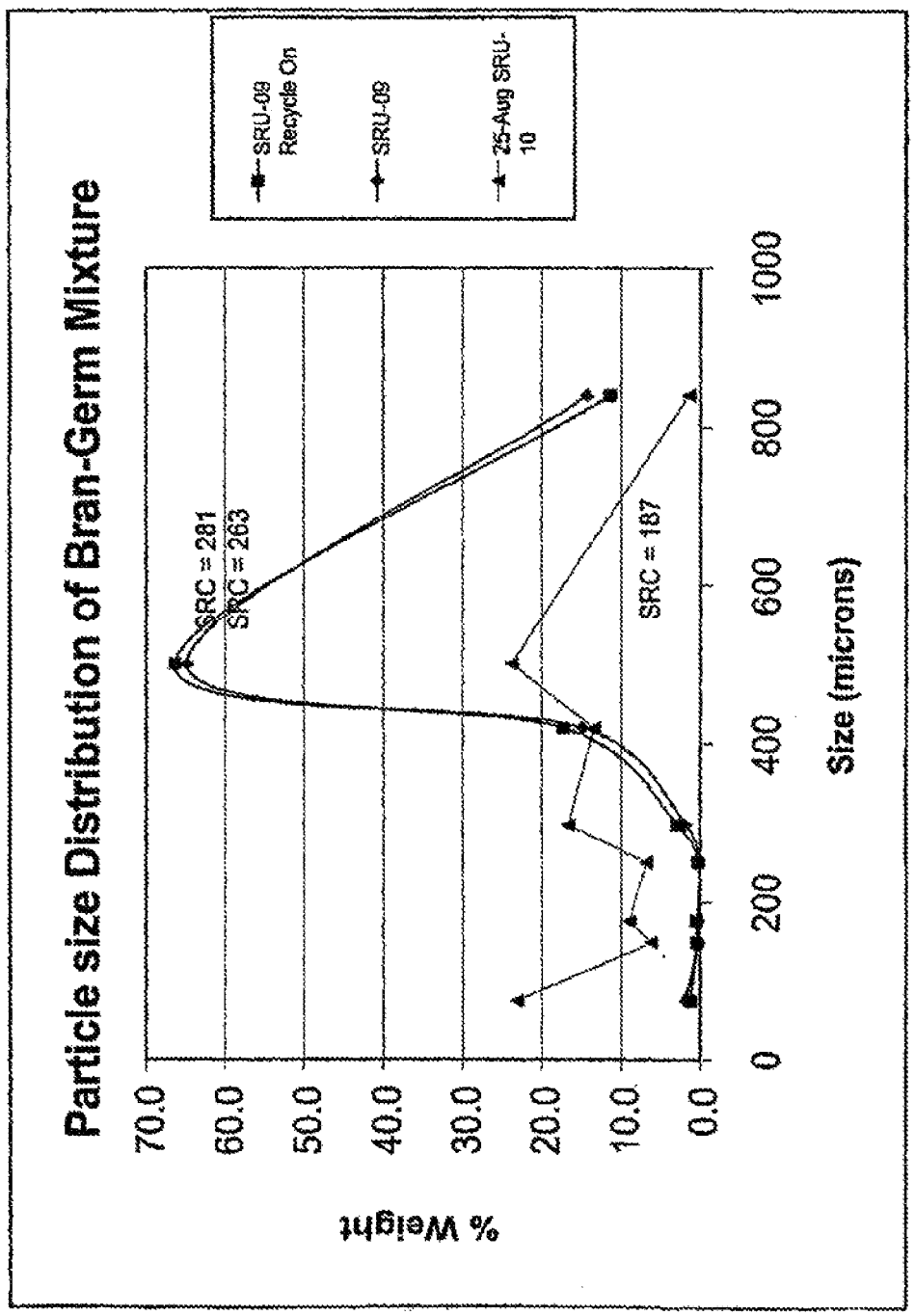
FIG. 4 shows particle size distributions and solvent retention capacities (SRC) of Example 3 coarse fractions or bran components containing mixtures of bran and germ before and after grinding.

The results of the particle size analysis of the coarse fraction and the ground coarse fraction are presented in Table 10. FIG. 4 shows a typical distribution for a coarse fraction and a ground coarse fraction or bran component.

Determination of Solvent Retention Capacity (SRC)

Solvent Retention Capacity (SRC) serves as a practical test to monitor the function of specific flour components, such as the amount of damaged starch. The SRC assay method used was adapted and modified from AACC method 56-10, according to the following procedure:

Materials:
50 ml centrifuge tubes+caps
5% by weight sodium carbonate solvent
Centrifuge (IEC, Centra GP8, 269 rotor, 2130 rpm)

Procedure:
1. Weigh 50 ml centrifuge tubes+caps (for special tubes weight O-ring seals).
2. Weigh and add 5.00 g of bran-germ mixture to each tube (determine moisture content of mixture).
3. Add 25 g of solvent (pre-weighed solvent aliquots) to each tube.
4. Allow it to hydrate for 20 minutes, shaking every 5 min. (5, 10, 15, 20 minutes)
5. Centrifuge for 15 minutes at 1000×g.
6. Decant supernatant and drain 5 minutes at 45° angle and 5 minutes at 90° angle.
7. Put cap back and weigh pellet.
8. Calculate:

$$\%\ SRC = \left[\frac{\text{tube, cap, gel} - \text{tube, cap}}{\text{flour}} * \frac{86}{100 - \text{flour moisture}} - 1\right] * 100$$

Summarized in Table 10 for the tested brans are: (1) moisture content, (2) protein content, (3) ash content, (4) % water retention, (5) % carbonate water retention, (6) stabilization conditions, (7) lipase activity, and (8) particle size. In Table 10, SRU stands for a bran sample obtained from an untempered, soft red wheat bran, with SRU-9 indicating a coarse fraction, and SRU-10 indicating a ground coarse fraction, and SWW stands for a bran sample obtained from an untempered, soft white wheat, each sample being unstabilized, unless indicated to the contrary:

or, in the case of stabilized bran, starch gelatinized by stabilization treatment. The carbonate water SRC did not increase beyond an acceptable limit, for example >85%, until there were at least 55% of particles below 149 microns in size. It is believed that this results in a critical amount of damaged starch, as measured by a net increase in carbonate water

TABLE 10

Ingredient Characteristics

| Bran Characteristics | Moisture (wt. %) | Protein (wt. %) | Ash (wt. %) | SRC Water (%) | SRC Carbonate Water (%) | Lipase Activity (μmole/hr/0.1 g) | Particle Size, wt. % ||||
|---|---|---|---|---|---|---|---|---|---|---|
| | | | | | | | >500 μm | >250 μm | >149 μm | <149 μm |
| SRU-09 Soft Red, Coarse Fraction | 12.1 | 14.7 | 5.2 | nm | nm | — | 3.2 | 93.2 | 4.6 | 0.2 | 1.2 |
| SRU-09 Soft Red Coarse Fraction | 10.9 | 15 | 5.89 | 285.37 | 297 | — | nm | 84.8 | 15 | 0.4 | 0.6 |
| SRU-09 Soft Red Coarse Fraction | 11.7 | 15.3 | 5.15 | 269.27 | 263 | — | 2.8 | 79 | 16.8 | 0.4 | 1.8 |
| SRU-09 Soft Red Coarse Fraction Recycle On | 11.8 | 13.9 | 5.47 | 281.07 | 281 | — | 3.7 | 77.8 | 20.2 | 0.8 | 1.2 |
| SRU-09 Soft Red Coarse Fraction | 10.3 | 14.1 | 5.11 | 253.6 | 246 | — | nm | 90.2 | 8.6 | 0.4 | 0.6 |
| SRU 9 Soft Red Coarse Fraction 70% extraction | 11.2 | 14 | 5.16 | 283.6 | 268 | — | nm | 89.6 | 8.8 | 0.8 | 0.2 |
| SRU 9 Soft Red Coarse Fraction 60% extraction | 11.5 | 12.6 | 4.44 | 254.3 | 241 | — | nm | 92.4 | 6.6 | 1 | 0.8 |
| SRU-10 Soft Red Ground Coarse Fraction | 8.6 | 13.5 | 5.42 | nm | 187 | — | 4.8 | 25.8 | 31 | 14.2 | 28.6 |
| SRU-10 Soft Red Ground Coarse Fraction | 8 | 16.1 | 6.15 | 219.07 | 187 | — | nm | 25.2 | 36.8 | 15.2 | 23.2 |
| SRU-10 Soft Red Ground Coarse Fraction | 14.1 | 15.5 | 5.35 | 156.72 | 211 | — | 5.1 | 17.6 | 41.6 | 18 | 22.6 |
| SRU regular grind 12-9 | 9.3 | 14.6 | 5.26 | 180.87 | 187.9 | 60 | nm | 23 | 33 | 26 | 16.8 |
| SRU medium grind 12-9 (60% extraction) | 9.1 | 14.6 | 5.26 | 97.89 | 177.2 | 82 | 5.5 | 2 | 25.2 | 21.8 | 51.5 |
| SRU medium grind 12-9 (60% extraction); stabilized @ 120° C., 5 min. | 9.1 | 14.6 | 5.26 | 99.91 | 124.81 | — | 1.15 | 0.4 | 25.2 | 21.8 | 54.0 |
| SRU fine grind 12-9 | 9.0 | 14.6 | 5.26 | 97.6 | 113.9 | 86 | nm | 0.0 | 10.8 | 6.8 | 87.6 |
| SWW ground bran 12-9 (60% extraction) | 7.2 | nm | 6.03 | 199.22 | 200.95 | — | nm | 31 | 30.6 | 22.4 | 15.8 |
| Grain Millers coarse grind stabilized SWW bran | 9 | nm | 5 | 137.3 | 161.2 | 153 | 0.44 | 59.6 | 29.8 | 5.8 | 3.8 |
| Grain Millers fine grind stabilized SWW bran | 9 | nm | 5 | 148.8 | 178.5 | 149 | 1.43 | 0.8 | 1.6 | 4.8 | 92.0 |

As indicated in Table 10 and shown in FIG. 4, except for the SRU-fine grind, the grinding of the coarse fraction or germ-bran mixture reduced the amount of coarse particles greater than 500 microns from greater than about 75% down to less than or equal to about 31% and increased the amount of finer particles, in the size range less than 500 micron to greater than 149 microns, from less than about 21% up to at least about 45% while the amount of particles less than 149 microns was not more than 55%. Within a given particle size distribution, especially for coarse particles, SRC increases as ash content increases. It is known that the bran coat, aleurone and germ carry the greater concentration of ash (minerals), than does the endosperm. Ash content is a widely used index of refined flour purity and provides a means to measure mechanical separation of the kernel components during the milling process. Ash is measured by AOAC method 923.03. For stabilized and unstabilized ground bran-germ mixtures produced in accordance with the present invention, the sodium carbonate water SRC did not increase with grinding or stabilization, and the SRC of the stabilized product of the present invention remained below that of commercial stabilized bran. Bran particle size influenced the sodium carbonate water retained such that the smaller the bran particles, the smaller the amount of solvent retained. It is believed that during grinding the spongy, fibrous network of the bran coat is broken down and becomes less water/sodium carbonate water sorptive. Removing large bran particles, so that all particles, starch and bran, were the same small size, for example testing only the portion of bran component <149 microns, enabled a better assessment of starch damaged due to excessive grinding and/ or solvent retention of the fraction below 149 micron particle size, beyond which detrimental function in baking would result.

EXAMPLE 4

Baking Function of Stabilized Whole Grain Wheat Flour Made with Stabilized Bran Component In this example the baking functionality of whole grain wheat flour made with a ground coarse fraction or bran component stabilized according to the present invention was compared to baking functionality of whole grain wheat flour made with commercially available ground stabilized bran and germ, and a commercially available unstabilized whole grain wheat flour using a refined wheat flour as a control. Whole grain wheat flours made with natural proportions of stabilized and unstabilized ground bran and germ, or bran components, and endosperm are listed in Table 11 along with the test formulas used in baking. Particle size distributions of the whole grain wheat flours were measured using the RoTap method described in Example 3. Flour moisture, ash, water holding capacity, carbonate water holding capacity or solvent retention capacity (SRC) and lipase activity were also measured according to methods described in previous examples. The cookie test baking method used to evaluate the baking functionality of the whole grain wheat flours was the AACC 10-53 Cookie Test Baking The method, equipment, standard formulation, mixing method, baking conditions, and cookie geometry measurements employed to evaluate baking functionality were:

Method:

AACC 10-53 Cookie Test Baking Method was designed at Nabisco Biscuit Company for evaluation of ingredient functionality and predictive correlation between sensory and mechanical texture analysis (mechanical texture analysis by TAXT2 Texture analyzer 3-point bend or puncture test). The test is an improvement over AACC 10-52 Sugar-Snap Cookie Test Baking Method as confirmed by USDA Soft Wheat Quality Lab (Wooster Ohio). The AACC 10-53 test was adopted as the official method of the American Association of Cereal Chemists after collaborative testing by the Soft Wheat Quality Committee in 1992. The equipment, cookie dough composition, mixing procedure, baking procedure, measurement procedure, etc. used in the test are:

Equipment

The equipment employed in the cookie baking test is:
1. Moisture Analyzer, disposable sample pans for determination of flour moisture.
2. Digital Thermometer (Omega model 872A) with thermocouple.
3. C-100 Hobart Mixer with 3-quart mixing bowl and paddle.
4. National Test Baking Oven.
5. Aluminum cookie sheet-26 cm width×30 cm length with 2 gauge bars 12 mm width×30 cm length×7 mm height.
6. Cookie cutter (60 mm internal diameter).
7. Rolling pin with sleeve (sleeve lines run along length of pin).
8. Spatulas, brown absorbent paper, aluminum foil, plastic beakers.
9. TA-XT2 Texture Analyzer Optional test for dough rheology—special pan dimensions with 10 cm, length 10.5 cm, height 3.2 cm Standard Formulation AACC 10-53 Single Batch to Make 4 Test Cookies:

The ingredients and their amounts used to make the test cookies are:

| | |
|---|---|
| Stage-1 | |
| Nonfat dry milk powder | 2.25 g |
| Salt | 2.81 g |
| Sodium bicarbonate | 2.25 g |
| Vegetable shortening (Sans Trans 39, Cargill) | 90.00 g |
| Stage-2 | |
| Ammonium bicarbonate | 1.13 g |
| High fructose corn syrup; 42% fructose, 71% solids | 3.38 g |
| Water | 49.50 g |
| Stage-3 | |
| Flour (at 13% moisture) | 225.00 g |

Measure flour moisture content on each day of baking; adjust levels of flour and water to compensate for deviations from 13% moisture content:

a. Record flour moisture content and insert as FM into equation to calculate actual flour weight per batch:

$$\text{Actual flour weight (g)} = \frac{87}{(100-FM)} * 225 \text{ g}$$

b. Record actual flour weight per batch and insert as AFW in equation to calculate actual weight of added water per batch:

Actual added water (g)=49.5 g+225–$AFW$*225 g

General Mixing Procedure:

The mixing procedure employed to obtain a cookie dough is:
1. Stage-1: blend dry ingredients (nonfat dry milk, salt, bicarbonate, sugar).
2. Add fat.
3. Mix in Hobart mixer 3 minutes at low speed; scrape paddle and sides of bowl after each minute of mixing.
4. Stage-2: dissolve ammonium bicarbonate in water; add high fructose corn syrup.
5. Add total solution of Stage 2 ingredients to stage-1 ingredients.
6. Mix 1 minute at low speed, scraping bowl and paddle after each 30 seconds.
7. Mix 2 minutes at medium speed, scraping bowl and paddle after each 30 seconds.
8. Stage-3: Add flour, fold into liquid mixture 3 times; mix 2 minutes at low speed scraping paddle and bowl after each 30 seconds.

Bake-Time Determination:

The bake-time is defined as the time required to produce a weight loss of 13.85% during baking of the formulation at 400° F.

Measurement of Bake-Time:

Bake formulation at 400° F. for 10, 11, 12, 13 minutes and for some whole grain flours up to 16 minutes, weighing the bake sheet+cookies after each minute interval. Plot % weight loss during baking vs. bake time in minutes, then interpolate bake-time required to achieve a 13.58% weight loss.

Baking Specifications:

Preheat the oven to 400° F. (202° C.), record the weight of the cold cookie sheet, and then place the cookie sheet in the oven for the standard bake-time, record the weight of the hot sheet.

Procedure for Preparation of 4 Dough Blanks for Cookie Test Baking:

Portion four 60 g pieces of dough with minimum deformation and place on a cookie sheet. Lay a rolling pin across the gauge bars of the cookie sheet allowing the weight of the pin to compress the dough pieces without additional compressive force. Pick up the rolling pin and place it on the gauge bars at the end of the cookie sheet, and roll only once away from you. Cut the cookie dough pieces with a 60 mm cutter, and carefully lift the scrap dough with a small spatula. Lift the cutter straight up to avoid horizontal distortion. Record the weight of the dough blanks and cookie sheet.

Baking the Cookie Dough:

Place the dough blanks and cookie sheet in the oven in the direction of sheeting. Bake cookies at 400° F. for the predetermined bake-time. Weigh the cookie sheet with cookies on it immediately upon removal from the oven. Carefully remove cookies from the sheet with a flat spatula and place them flat on brown paper in the same direction in which they were sheeted and baked.

Geometry Measurements:

Geometry measurements are taken when the cookies are cooled, at least 30 minutes, after baking. The width, length, and stack height are measured as follows:

A. Width-diameter perpendicular to direction of sheeting: Lay 4 cookies in a row with rolling-pin-sleeve lines parallel to the length of the meter stick. Record the measurement in centimeters.

B. Length-diameter parallel to sheeting: Rotate the cookies 90° so the rolling-pin-sleeve lines are perpendicular to the meter stick. Record the measurement in centimeters.

C. Stack Height: Stack 4 cookies and place the stack on side between flat guides. Record the measurement in centimeters. Gently shuffle the cookie order and repeat the measurement.

In Table 12, for each flour, bran component or bran-germ mixture used, ash content, water holding capacity, carbonate water holding capacity, or solvent retention capacity (SRC), lipase activity, cookie width, cookie bake time and flour particle size distribution are shown. The whole grain wheat flour baking test formulas are shown in Table 11. The stabilization conditions for the stabilized flour of the present invention (the sample with 29.6% by weight SRU medium ground stabilized bran and 70.4% by weight flour endosperm) are 120° C. at 9.9% by weight moisture for 5 minutes. The Climax flour, Graham flour, and ConAgra Ultrafine Whole Grain Flour, were all commercial flours used "as is". The first five flours listed (SRU 3-05, HRU 7-26, SWW 7-26, SRU 8-26, and SWW 8-26) and the soft white wheat flour, SWW ground bran 12-9 were all milled in a continuous plant process. For the reconstituted flours, Grain Millers commercial stabilized bran was recombined with white refined endosperm at the same ratio as used for the SRU, fine and medium grind flours (29.6% by weight bran and 70.4% by weight endosperm). In Tables 11 and 12, SRU stands for a sample obtained from an untempered, soft red wheat bran, SWW stands for a sample obtained from an untempered, soft white wheat, HRU stands for a sample obtained from an untempered, hard red wheat, and GM stands for Grain Millers, each sample being unstabilized, unless indicated to the contrary:

TABLE 11

Whole Grain Wheat Flour Baking Test Formulas, wt. %

| Ingredient | Flour Moistures | Climax Control | SWW unstb | SRU unstab | SRU stab | Commercial stabilized ground, GM | Commercial Stabilized Coarse, GM | Con Agra whole wheat | SRU 3-05 | HRU 7-26 | SWW 7-26 | SRU 8-26 | SWW 8-26 |
|---|---|---|---|---|---|---|---|---|---|---|---|---|---|
| STAGE 1 | | | | | | | | | | | | | |
| Non fat dry milk | | 4 | 4 | 4 | 4 | 4 | 4 | 4 | 4 | 4 | 4 | 4 | 4 |
| salt | | 5 | 5 | 5 | 5 | 5 | 5 | 5 | 5 | 5 | 5 | 5 | 5 |
| sodium bicarbonate | | 4 | 4 | 4 | 4 | 4 | 4 | 4 | 4 | 4 | 4 | 4 | 4 |
| fine granulated sugar | | 168 | 168 | 168 | 168 | 168 | 168 | 168 | 168 | 168 | 168 | 168 | 168 |
| san trans 39 | | 160 | 160 | 160 | 160 | 160 | 160 | 160 | 160 | 160 | 160 | 160 | 160 |
| STAGE 2 | | | | | | | | | | | | | |
| ammonium bicarbonate | | 2 | 2 | 2 | 2 | 2 | 2 | 2 | 2 | 2 | 2 | 2 | 2 |
| high fructose corn syrup | | 6 | 6 | 6 | 6 | 6 | 6 | 6 | 6 | 6 | 6 | 6 | 6 |
| water | | 88.09 | 96.24 | 96.86 | 100.9 | 100.13 | 97.69 | 105.54 | 95.31 | 90.79 | 93.58 | 92.19 | 92.55 |
| STAGE 3 | | | | | | | | | | | | | |
| Climax | 12.98 | 400 | — | — | — | — | — | — | — | — | — | — | — |
| SWW unstabilized | 11.17 | — | 400 | — | — | — | — | — | — | — | — | — | — |
| SRU unstabilized | 11.03 | — | — | 400 | — | — | — | — | — | — | — | — | — |
| SRU stabilized | 10.11 | — | — | — | 400 | — | — | — | — | — | — | — | — |
| Commercial stabilized ground, Grain Millers | 10.28 | — | — | — | — | 400 | — | — | — | — | — | — | — |
| Commercial stabilized coarse, Grain Millers | 10.84 | — | — | — | — | — | 400 | — | — | — | — | — | — |
| Con Agra whole wheat | 9.01 | — | — | — | — | — | — | 400 | — | — | — | — | — |
| SRU 3-05 | 11.38 | — | — | — | — | — | — | — | 400 | — | — | — | — |
| HRU 7-26 | 12.39 | — | — | — | — | — | — | — | — | 400 | — | — | — |
| SWW 7-26 | 11.77 | — | — | — | — | — | — | — | — | — | 400 | — | — |
| SRU 8-26 | 12.08 | — | — | — | — | — | — | — | — | — | — | 400 | — |
| SWW 8-26 | 12 | — | — | — | — | — | — | — | — | — | — | — | 400 |
| Actual flour wt. | | 399.91 | 391.76 | 391.1 | 387.1 | 387.87 | 390.31 | 382.46 | 392.69 | 397.21 | 394.42 | 395.81 | 395.45 |

TABLE 12

Whole Grain Wheat Flour Characteristics and Baking Functionality

| Reconstituted Whole Grain Wheat Flour | Ash | SRC water | SRC Carbonate water | Lipase Activity (µmole/hr/0.1 g) | Cookie width, 4 (cm) | Bake Time (min) | Particle Size, wt. % | | | | |
|---|---|---|---|---|---|---|---|---|---|---|---|
| | | | | | | | >500 | >250 | >149 | <149 | sum > 250 micron |
| SRU 3-05 (27.2% bran-germ: 72.8% endosperm) | 1.67 | 66.5 | 77.6 | nm | 33.6 | nm | 5.2 | 26.6 | 14.8 | 52.2 | 31.8 |
| HRU 7-26 | 1.54 | 68 | 78.7 | nm | 33.8 | 13 | 8 | 28.2 | 19.6 | 44.8 | 36.2 |
| SWW 7-26 | 1.47 | 65.3 | 74.5 | nm | 34.6 | 12 | 8.2 | 36 | 18.4 | 34.2 | 44.2 |
| SRU 8-26 | 1.52 | 63.85 | 78.27 | 2 | 33.8 | 13 | 2.8 | 35.8 | 23.2 | 38.6 | 38.6 |

TABLE 12-continued

Whole Grain Wheat Flour Characteristics and Baking Functionality

| Reconstituted Whole Grain Wheat Flour | Ash | SRC water | SRC Carbonate water | Lipase Activity (μmole/hr/ 0.1 g) | Cookie width, 4 (cm) | Bake Time (min) | Particle Size, wt. % | | | | |
|---|---|---|---|---|---|---|---|---|---|---|---|
| | | | | | | | >500 | >250 | >149 | <149 | sum > 250 micron |
| SWW 8-26 | 1.53 | 62.57 | 76.58 | nm | 34.5 | 13 | 1.8 | 33.6 | 17.4 | 45.6 | 35.4 |
| 29.6% SRU fine ground bran + 70.4% flour endosperm | 1.58 | 67.3 | 81.7 | nm | 29.7 | 16 | 1.4 | 35 | 54 | 8 | 36.4 |
| 29.6% SRU medium ground bran + 70.4% flour endosperm | 1.58 | 67.3 | 81.7 | 2.5 | 30.4 | 13 | 1.6 | 26.4 | 35.6 | 35.8 | 28 |
| 29.6% SRU medium ground stabilized bran + 70.4% flour endosperm | 1.58 | 62 | 80 | 0.9 | 33.7 | 13 | 1.6 | 26.4 | 35.6 | 35.8 | 28 |
| SWW ground bran 12-9 (29.6% bran + 70.4% flour endosperm) | 1.66 | 64 | 80 | 2.5 | 33.7 | 12 | 2 | 25.8 | 29.4 | 42.4 | 27.8 |
| Grain Millers coarse grind stabilized SWW bran (29.6% bran + 70.4% flour endosperm) | 1.67 | 71 | 88 | 1.2 | 34.9 | 13 | 28 | 21 | 14 | 39 | 49 |
| Grain Millers fine grind stabilized SWW bran (29.6% bran + 70.4% flour endosperm) | 1.67 | 79 | 102 | 1.1 | 28.8 | 16 | 0.6 | 12.2 | 45.2 | 38.6 | 12.8 |
| Con Agra Ultra Fine Flour | 1.48 | 75.2 | 89.5 | 2.2 | 27.6 | 16.5 | 0 | 1 | 5 | 95 | 1 |
| Climax Flour | 0.51 | 64.9 | 71.32 | 0.74 | 34.7 | 13 | 0.4 | 1 | 20.56 | 79.4 | 1.4 |
| Graham Flour | 1.56 | 64.9 | 71.3 | 1.9 | 34.4 | 11 | 25 | 27.6 | 20.8 | 27.6 | 52.6 |

Whole grain wheat flour made with stabilized medium ground bran component or bran-germ is the flour which demonstrates the baking qualities most similar to standard white refined wheat flour. For the four whole grain wheat flours with less than 30% particle weight greater than or equal to 250 microns, the medium grind, stabilized whole grain wheat flour stabilized at 120° C. for 5 minutes demonstrates unexpectedly superior baking characteristics with a cookie width and bake time closest to the white refined flour control compared to those of: (1) whole grain wheat flour made with commercial stabilized bran-germ, (2) commercial unstabilized fine grind whole grain wheat flour, and (3) whole grain wheat flour made with unstabilized bran-germ.

Figure 5:
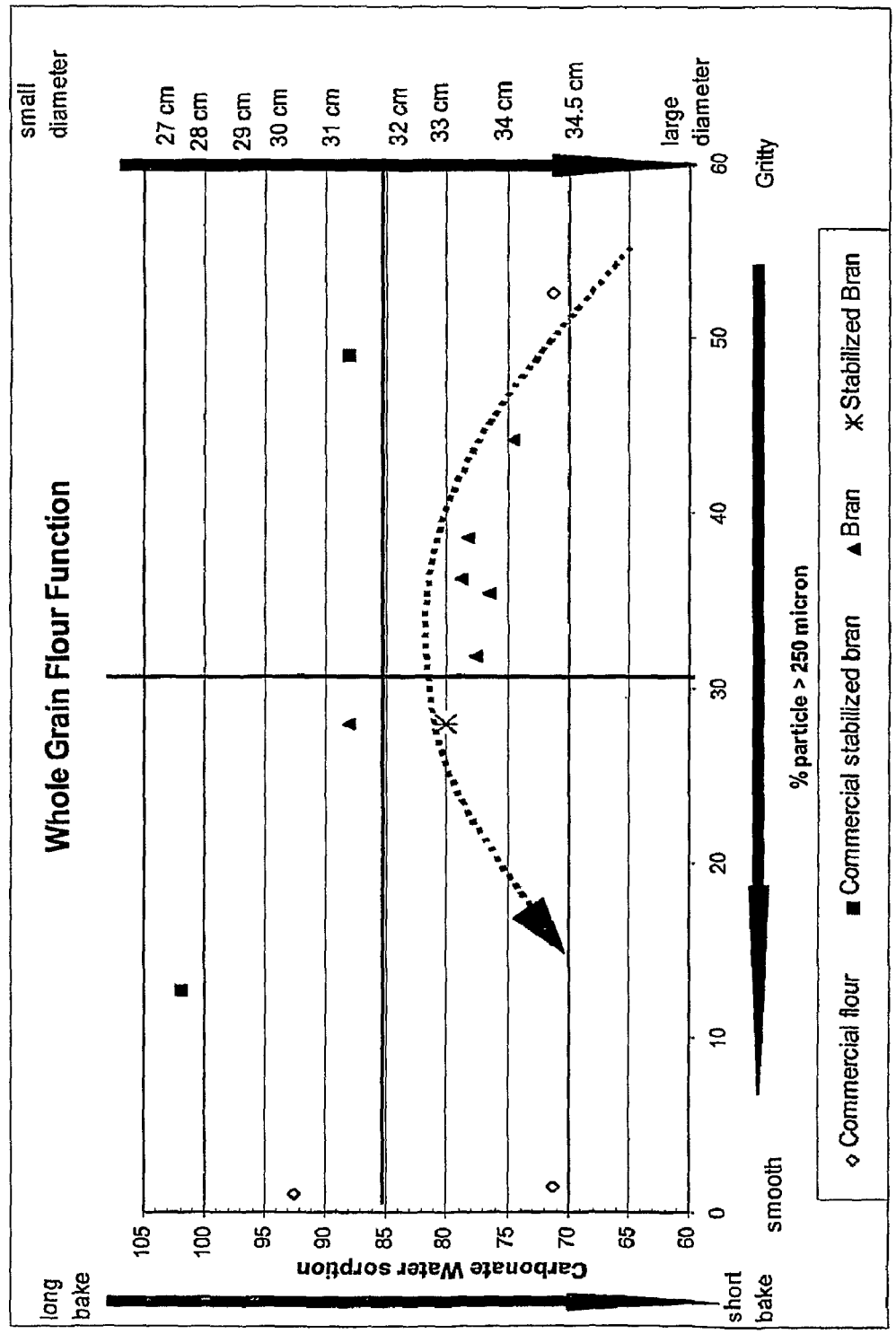
FIG. 5. shows baking functionality of stabilized and unstabilized whole grain wheat flours in terms of sodium carbonate-water solvent retention capacity (carbonate SRC) and cookie spread as a function of the weight percentage of particles greater than 250 microns in size.

In FIG. 5, the carbonate water retention of all flours is plotted as a function of the % weight of particles greater than 250 micron. On the left hand y-axis is shown carbonate water retention capacity. On the right hand y-axis is shown relative cookie diameter. As shown in FIG. 5 and Table 12, the whole grain wheat flour made with a bran component or bran-germ mixture stabilized according to the present invention, demonstrate a reduction of carbonate water retention capacity from 81.7% down to 80%, increased cookie diameter from 30.4 cm up to 33.7 cm, and maintained bake time similar to control white refined flour of 13 minutes at 400° F.

EXAMPLE 5

Effect of Stabilization on the Formation of Free Fatty Acid

In this example the amount of free fatty acids formed, under accelerated storage conditions, in whole grain wheat flour made with ground bran component, stabilized according to the present invention is determined. The following four wheat flours were made with ground bran component made in the production of whole grain wheat flour: (1) Soft Red unstabilized flour, (2) Soft White unstabilized flour, (3) Soft Red stabilized flour, and (4) Soft White stabilized flour. The following two flours were made with ground bran byproduct of white refined flour milling: (5) Whole Grain Flour, unstabilized, and (6) Whole Grain Flour, stabilized. Results were compared to the amount of free fatty acids formed in unstabilized commercial whole grain wheat flour: (7) ConAgra Ultrafine. Whole grain flours were made with a natural proportion of bran component and endosperm obtained from the flour mill. Ideally, stabilization of the bran component would take place immediately after milling to prevent lipase action. However, flour bran components for this study were about one to two weeks old before stabilization could be performed. Bran component (indicated as BG) and endosperm (indicated as Endo) were blended in the ratios show in Table 14. Whole grain flour ash content was used to confirm composition. The bran components, which contain bran and germ were stabilized at about 120° C. for about 5 minutes at about 11% moisture. Lipase activities and particle size distributions were measured as in Example 1 and Example 3, respectively, and are shown in Table 14. Flours were stored in sealed glass jars for 29 days under accelerated storage conditions of 95° F.

Free fatty acid content of the flours was adapted from the method set forth in "Jong, C.; Badings, H. T.; *Journal of High Resolution Chromatography;* 1990; Determination of Free Fatty Acids in Milk and Cheese Procedures for Extraction, Clean up, and Capillary Gas Chromatography Analysis". Lipid extracts, containing free fatty acids, are obtained from foods by extraction with acidified organic solvents. The anhydrous lipid extracts are passed through a weak anion exchange SPE cartridge to isolate the free fatty acids from the coextracted material, particularly neutral glycerides. The procedure is as follows:

Apparatus

The apparatus employed in the determination of the free fatty acids is:
  a. Gas chromatograph (GC) fitted for capillary on-column injection into 0.53 mm internal diameter columns with electronic pressure control (EPC) and flame ionization detector (FID), [example: HP5890 Series II],
  b. Autosampler compatible with the GC, [example: HP7673],
  c. Software system capable of collecting chromatographic data, calculating statistics and tabulating results,
  d. Analytical balance with 0.0001 g resolution, 150 g capacity, e. Centrifuge capable of 3000 rpm (2050 rcf), with temperature control, (optional),
f. Polytron able to homogenize samples at 25000 rpm [example: Brinkmann Instruments, Polytron Kinematica AG Model PT 1300 D],
g. Vortex Mixer,
h. Solvent Dispensers with inert plastic components [example: Brinkmann—two 1-5 mL capacity Cat #2222010-1 and one 5-25 mL capacity Cat #2222030-6], and
I. Crimper for autosampler vials.

Supplies

The supplies employed in the determination of the free fatty acids are:
1. Column: StabilwaxDA 0.25 u, 0.53 mm×15 m [Restek Corp. #11022],
2. SPE cartridges: Bond elute NH2, 3 cc, 500 mg, with stainless steel frits [Varian Part #1212-4038],
3. Glass centrifuge test tubes with TEFLON lined screw caps, size: 16×125 mm,
4. Corex glass centrifuge tubes with TEFLON lined screw caps, 45 mL [example: COREX II No. 8422-A],
5. Whatman Filter paper #1, 125 mm Diameter,
6. Pyrex brand filtering funnel, short stem,
7. Disposable Culture Tubes, borosilicate glass 16×150 mm [example: VWR Cat #47729-580],
8. Glass vials with TEFLON lined screw caps, 4 mL. [example: Kimble Cat #60940A 4],
9. Autosampler vials, borosilicate glass, crimp-top with TEFLON lined caps,
10. Amber borosilicate bottles with TEFLON lined screw cap, 100 mL,
11. Clear borosilicate bottle with TEFLON lined screw cap, 250 mL,
12. Graduated cylinders: 250 mL, 100 mL,
13. Volumetric flasks: 250 mL, 100 mL,
14. Glass volumetric pipettes class A 5, 2, 1 mL and graduated 10, 5 mL,
15. Disposable Pasteur pipettes: 5¾ and 9 inch, and
16. Microspatula, spatula, and polypropylene sample transfer-tubes.

Reagents/Solutions

The reagents, standards, and solutions employed in the determination of the free fatty acids are:

Reagents and Standards

The reagents and standards employed in the determination of the free fatty acids are:
1. Ethanol—200 proof, anhydrous, 99.5%+, stored in amber glass [Aldrich #45, 983-6 or equivalent],
2. Hexanes—GC grade [B&J #216-4 or equivalent],
3. iso-Propanol—GC grade [B&J #323-4 or equivalent],
4. Methyl-tert-butylether (MTBE)—GC grade [B&J #242-4 or equivalent],
5. Methylene chloride—GC grade [B&J #299-4 or equivalent],
6. Acetic acid—purity to be monitored for propionic acid level [Aldrich #32,009-9 or equivalent],
7. Sulfuric acid—ACS reagent, 95.0-98.0% [Fisher Reagent ACS #A800-500 or equivalent],
8. Water Type 1 [Fisher HPLC #W5-4 or equivalent],
9. Diatomaceous Earth [Leco part #502-327 or equivalent], and
10. Standards >99.0% purity 3:0; 4:0; 6:0; 8:0; 9:0; 10:0; 11:0, 12:0; 13:0; 14:0; 16:0; 18:0 [examples: 3:0 Aldrich #24,035-4; 4:0 Aldrich #B10,350-0; 6:0 Aldrich #15,374-5; 8:0 Aldrich #0-390-7; 9:0 Sigma #-5502; 10:0 Aldrich #15,376-1; 11:0 Sigma #U-5503; 12:0 Aldrich #15,378-8; 13:0 Sigma #T-0502; 14:0 Aldrich #15-379-6; 16:0 Nu-Check-Prep, Inc. >99%; 18:0 Nu-Check-Prep, Inc. >99%].

Solutions to be Prepared

The solutions which need to be prepared for the determination of the free fatty acids are:
1. 2.5 M Sulfuric: Dilute 7 mL of concentrated acid with Type 1 water to 50 mL volumetrically.
2. 1:1 (v/v) MTBE:Hexanes
3. 2:1 (v/v) Methylene chloride: 2-Propanol
4. 2% Acetic acid in MTBE: Dilute 5 mL of concentrated acid with MTBE to 250 mL volumetrically.
5. 1:1 (v/v) Hexanes:2-Propanol, rinse solvent for syringe between runs
6. Standards (Standard Preparation See Appendix 13.1)
   a. Internal Standard: 11:0; Surrogates: 9:0 and 13:0.
   b. Matrix Spike (MS) standard working solution in ethanol: MS @~50 μm. This level may be appropriate for low to mid level determinations. Generally the FFA levels vary tremendously within a given matrix. Consequently a spike solution of varying amounts per individual FFA may be necessary per matrix.
   c. Calibration Standards in hexanes establish linear range: On-Column range 1-200 μg/g (ppm), Free fatty acid standards: 3:0, 4:0, 6:0, 8:0, 9:0 surrogate standard, 10:0, 11:0 internal standard, 12:0, 13:0 surrogate standard, 14:0, 16:0, and 18:0. Comment: 18:1 and 18:2 calculations are based on 18:0 response factor.
   d. Continuing calibration standards are prepared in 2% Acetic acid in MTBE, the final eluting solution: Calibration standard #3 @~50 μg/mL prepared in 2% Acetic acid/MTBE is currently used to bracket samples.

Check Samples, Blanks, Duplicates, and Matrix Spikes

Prior to using a new lot of SPE cartridges, the appropriate elution fraction must be determined with a mid level standard. A blank is prepared with each batch of samples. Within the batch each study will contain one duplicate. A matrix spike will be performed for all new matrices and in cases where homogeneity is an issue. An Initial Calibration Verification (ICV) should be prepared to verify correct preparation of calibration standards. Currently, there are no appropriate check samples for this analysis.

Sample Preparation and Storage

The sample preparation and storage conditions employed for the determination of the free fatty acids are:
a. Initial Sample Storage: frozen, refrigerated, or room temperature as specified per individual sample.
b. Samples with active lipases may require special handling, such as enzyme inactivation.
c. Sampling: room temperature, well mixed—homogeneous
d. Sample extracts: solutions stored in tightly sealed, screw capped TEFLON lined vials either in a well-ventilated hood or explosion proof refrigerator.
e. Sample isolates: The final eluate is a mixture of acid and organic solvent. These isolates should be stored in approved flammable storage area away from any bases.

Sample Clean-Up

Procedure for Sample Extraction: Solid and Liquid Matrix
Into 45 mL glass centrifuge test tube add and mix in the following order:

1. Sample, 1.0-1.05 g record weight to ±0.0001 g,
2. Working Internal Standard Solution, 1.0 mL, by pipette,
3. Ethanol, 1.0 mL, by pipette,
4. 2.5 M $H_2SO_4$, 0.3 mL, by pipette,
5. Vortex to form a homogeneous mixture,
6. Add: Diatomaceous earth, 4.5±0.1 g (In cases of very low moisture samples (example—flour) diatomaceous earth absorbs too much of the solvents.
7. Vortex thoroughly,
8. Equilibrate at least 10 minutes (Minimum time for sample and diatomaceous earth interaction is 5 minutes. Diatomaceous earth absorbs water. Presence of sample moisture may result in non-reproducible results. 3:0 and 4:0 readily partition into the water layer. Ten minutes has been set as the minimum. This provides a safety margin to allow the interaction to finish.), and
9. Add 1:1 (v/v) MTBE:Hexanes, 15.0 mL by solvent dispenser.

Extraction Process

The procedure employed for the extraction in the determination of the free fatty acids is:

The setting for the Polytron are 24,000 rpm, with a time of 25-45 seconds depending on solidness of the matrix. As a precaution, gloves should be worn. Rinse the Polytron tip with warm water, towel dry followed by 2-propanol rinse and towel dry the tip again. Kimwipes or disposable paper towels can be used. The Polytron probe may require additional rinses. Some potential carryover issues include high fat content, high FFA content and active lipases. The final rinse prior to samples must be 2-propanol. Next, vortex the sample, filter the entire contents of the centrifuge tube through Whatman #1 paper. Collect filtrate in 16×125 mm glass screw cap test tubes. An alternate option is to maximize supernatant volume, centrifuge @3000 rpm for 30 minutes. If this option is chosen, precautions regarding solvent volatility must be taken into consideration. Transfer the supernatant into 16×125 mm glass screw cap test tubes.

Free Fatty Acid Isolation

Condition SPE cartridge with 3 mL hexanes. A solvent dispenser is appropriate in this case. Additional solvent can be added at this step without any adverse effect, especially if sample extracts are not ready for transfer at this point. The additional hexanes will prevent the cartridge from drying out. Fill the barrel of the SPE cartridge with the sample extract. A Pasteur pipette will suffice in this transfer. The volume of extract loaded onto the SPE is approximately 3 mL. Allow to drain totally without drying. Wash twice with 2 mL methylene chloride: 2-propanol solution to remove the neutral glycerides. A solvent dispenser is recommended. Allow to drain totally. Pipette 2.5 mL 2% Acetic Acid-MTBE. Discard eluate. Transfer the SPE cartridge to sample collection vials. Pipette a second 2.5 mL 2% Acetic Acid-MTBE. Collect the eluate containing FFAs in a 4 mL vial directly. Mix thoroughly.

The elution volumes for free fatty acids must be verified for each new lot of SPE cartridges. Apply one mL of a mid-level working standard, Cal #3, in hexanes to a conditioned cartridge, then elute as follows as shown in Table 13:

TABLE 13

| | | Elution | |
|---|---|---|---|
| Fraction 1 | 2 × 2 mL | Methylene chloride: 2-Propanol | Discard |
| Fraction 2 | 1.5 mL | 2% Acetic in MTBE | Discard |
| Fraction 3 | 1.0 mL | 2% Acetic in MTBE | Collect |
| Fraction 4 | 1.5 mL | 2% Acetic in MTBE | Collect |
| Fraction 5 | 1.0 mL | 2% Acetic in MTBE | Collect |
| Fraction 6 | 1.0 mL | 2% Acetic in MTBE | Collect |

Analyze fractions 3 thru 6 to determine the optimum volume of solution needed to elute all the free fatty acids. Once the appropriate fraction is determined, a screen process can be used to validate the next new lot of SPE cartridges. A blank extract can be split between old and new lot cartridges. If GC analysis of the isolates correlate, then no further action is required. Otherwise, the correct fraction must be optimized by following the aforementioned steps.

Instrument Set-Up

The instrument set-up employed for the determination of the free fatty acids is:
1. Instrument: GC capable of on-column injection, 0.53 mm column, EPC, autosampler
2. Column: StabilwaxDA: 0.25 micron, 0.53 mm×15 m
3. Carrier Gas: Hydrogen Constant flow at 10.0 mL/min or set EPC to 2.0 psi @60° C.
4. Temperature program: 60° C. hold 0.5 min, @50°/min to 100° C., @10°/min to 250° C., hold 1 min
5. Injection Temp: Oven track mode differential 3° C.
6. Injection volume: 1 uL
7. Detector: Flame Ionization Detector @260° C., Range 0

Analysis

Initial Analysis

First, an instrument blank analysis, 2% Acetic Acid in MTBE, must demonstrate a contaminant free system. Second, a standard solution, 1 ppm, should show acceptable detection for each compound. Third, a five point calibration, 5 to 200 ppm, should be prepared to establish the acceptable operating range for quantization.

Calculation may be based on average response factor or linear regression. If response factor calculation is chosen, then the relative standard deviation (RSD) must be within 20% of the average for each compound. Alternatively, with linear regression coefficient ($R^2$) method, a value of 0.999 is required for each compound of interest. This calibration should be verified with an ICV prepared from a secondary source of standards. All compounds in the ICV should be within ±5% of the current calibration.

Continuing Analysis

At each start-up, an instrument blank and a mid-level standard shall be analyzed prior to any sample. The blank must demonstrate lack of contaminant presence. The mid-level standard must be within 10% of expected values based on current calibration. Every fifteen samples must be bracketed with a mid-level standard. If a mid-level standard exceeds the 10% limit, corrective action must be taken and all samples prior to that standard must be re-analyzed. 18:0 peak shape can be used to monitor status of the inlet. Stearic acid peak shape degradation-tailing is indicative of build up on the front end of the column. Actual loss of stearic acid is indicative of injection port leak or contamination.

Evaluation, Calculation and Expression of Results

Evaluation, calculation, and expression of results for the determination of the free fatty acids are:

Evaluation & Calculation

All chromatograms are evaluated for peak shape. Poor peak shape represents a problem with the operating setup. This problem must be addressed prior to further analysis. Standards are additionally evaluated for retention times. The acceptable retention time window for individual FFAs is ±0.02 minutes of current calibration standards. Furthermore, sample FFA levels must be within established calibration limits. If any component exceeds the upper calibration amount, that sample must be diluted appropriately and reanalyzed.

This method is based on internal standard quantization. The five point calibration curve ranges from 5 to 200 ppm.

limits. Any results below lowest calibration point are reported as less than that value, <5 ppm.

The FFAs retained on an amine phase are eluted with 2% acetic acid in methyl-tert-butylether (MTBE). The extract is chromatographed on a capillary column, Stabilwax. Compounds are detected by flame ionization (FID). Amounts of even numbered fatty acids, 4:0 to 18:0, including 3:0, are determined using internal standard quantization, 11:0. 18:1 and 18:2 calculations are based on 18:0 standard. The amount of tetradecanoic (14:0), hexadecanoic (16:0), octadecanoic (18:0), octadecenoic (18:1) and octadecadienoic (18:2) found in the flours were added together to make up the total free fatty acid content of the flour shown in Table 14. Stabilization conditions and particle size distributions for the flours are also shown in Table 14:

TABLE 14

Effect of Stabilization on Total Free Fatty Acid Formation in Whole Grain Wheat Flours

| Whole Grain Flour | Stabilization Conditions | | | Particle Size Distribution, wt. % | | | | | | | (µmole/ hr/0.1 g) Lipase | Total Free Fatty Acid, ppm Time, days | | | | |
|---|---|---|---|---|---|---|---|---|---|---|---|---|---|---|---|---|
| | Temp, °C. | Time, min. | Moisture wt. % | >500 µm | >250 µm | >149 µm | <149 µm | BG wt. % | Endo wt. % | Ash wt. % | | 0 | 9 | 15 | 21 | 29 |
| Soft Red unstabilized flour 7-26 | — | — | — | 25.8 | 31 | 14.2 | 28.6 | 17 | 83 | 1.3 | 1.37 | 1127 | 1592 | 1702 | 2005 | 2218 |
| Soft White unstabilized flour 7-26 | — | — | — | 26.6 | 37.4 | 17.8 | 26.8 | 17 | 83 | 1.28 | 1.54 | 932 | 1434 | 1582 | 1751 | 2005 |
| Soft Red stabilized flour 7-26 | 120 | 5 | 11 | 25.8 | 31 | 14.2 | 28.6 | 17 | 83 | 1.2 | 0.67 | 862 | 1062 | 1244 | 1276 | 1414 |
| Soft White stabilized flour 7-26 | 120 | 5 | 11 | 26.6 | 37.4 | 17.8 | 26.8 | 17 | 83 | 1.33 | 0.79 | 725 | 918 | 1054 | 1078 | 1235 |
| Whole Grain Flour, unstabilized | — | — | — | 25 | 35 | 20 | 20 | 17 | 83 | 1.21 | 1.61 | 1561 | 2551 | 2704 | 2998 | 3354 |
| Whole Grain Flour, stabilized | 120 | 5 | 11 | 25 | 35 | 20 | 20 | 17 | 83 | 1.2 | 0.83 | 1394 | 1914 | 2243 | 2403 | 2713 |
| Commercial Whole Grain Flour | — | — | — | 0 | 1 | 2 | 97 | na | na | 1.29 | 1.86 | 2221 | 2879 | 3088 | 3379 | 3715 |

The five response factors are averaged. Then the average response factor is used to calculate unknown FFAs. Each compound has its own response factor.

Response Factor Calculation:

The response factor may be calculated as:

$$\text{Response Factor}(RF): RF_x = (A_x C_{is})/(A_{is} C_x)$$

$$\text{Average Response Factor}(RF_{avg}): RF_{Xavg} = (RF_{X1} + RF_{X2} + RF_{X3} + RF_{X4} + RF_{X5})/5$$

where: $RF_x$=Response factor of compound X; $A_x$=Peak area of compound X; $C_{is}$=Total (µg) of internal standard added; $A_{is}$=Peak area of internal standard; $C_x$=Total (µg) of compound X; $RF_{Xavg}$=average response factor for compound X derived from a five point calibration.

Unknown Concentration Calculation

The unknown sample concentration may be calculated as:

$$\text{Unknown Sample Concentration}(\mu g/g) = (A_x * C_{is})/(A_{is} * RF_{Xavg} * W)$$

where: W=Weight of sample in (g).

Expression of Results

Figure 6:
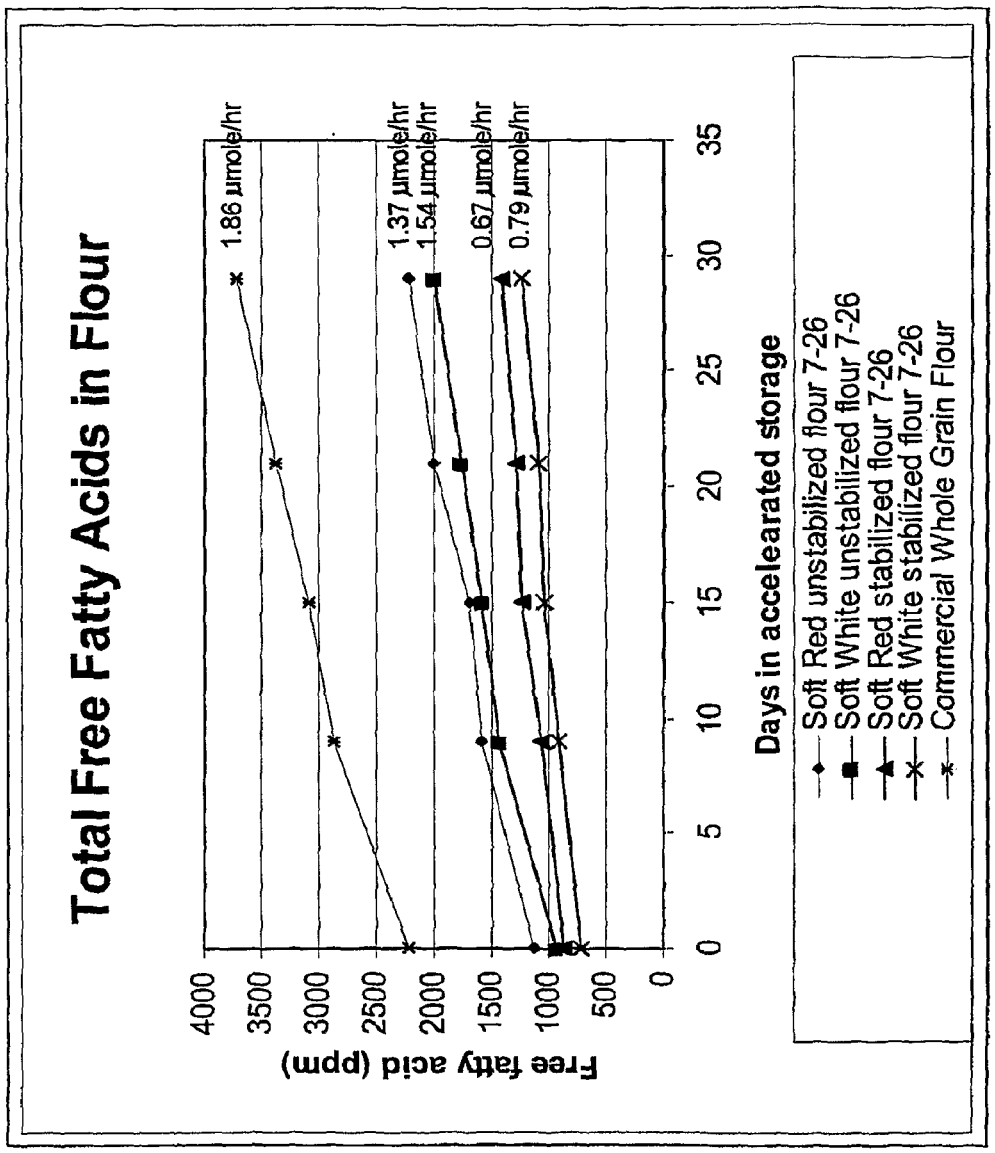
FIG. 6 shows a plot of the total free fatty acids in stabilized and unstabilized whole grain wheat flours made with ground bran components as a function of the length of time in accelerated storage.
Figure 7:
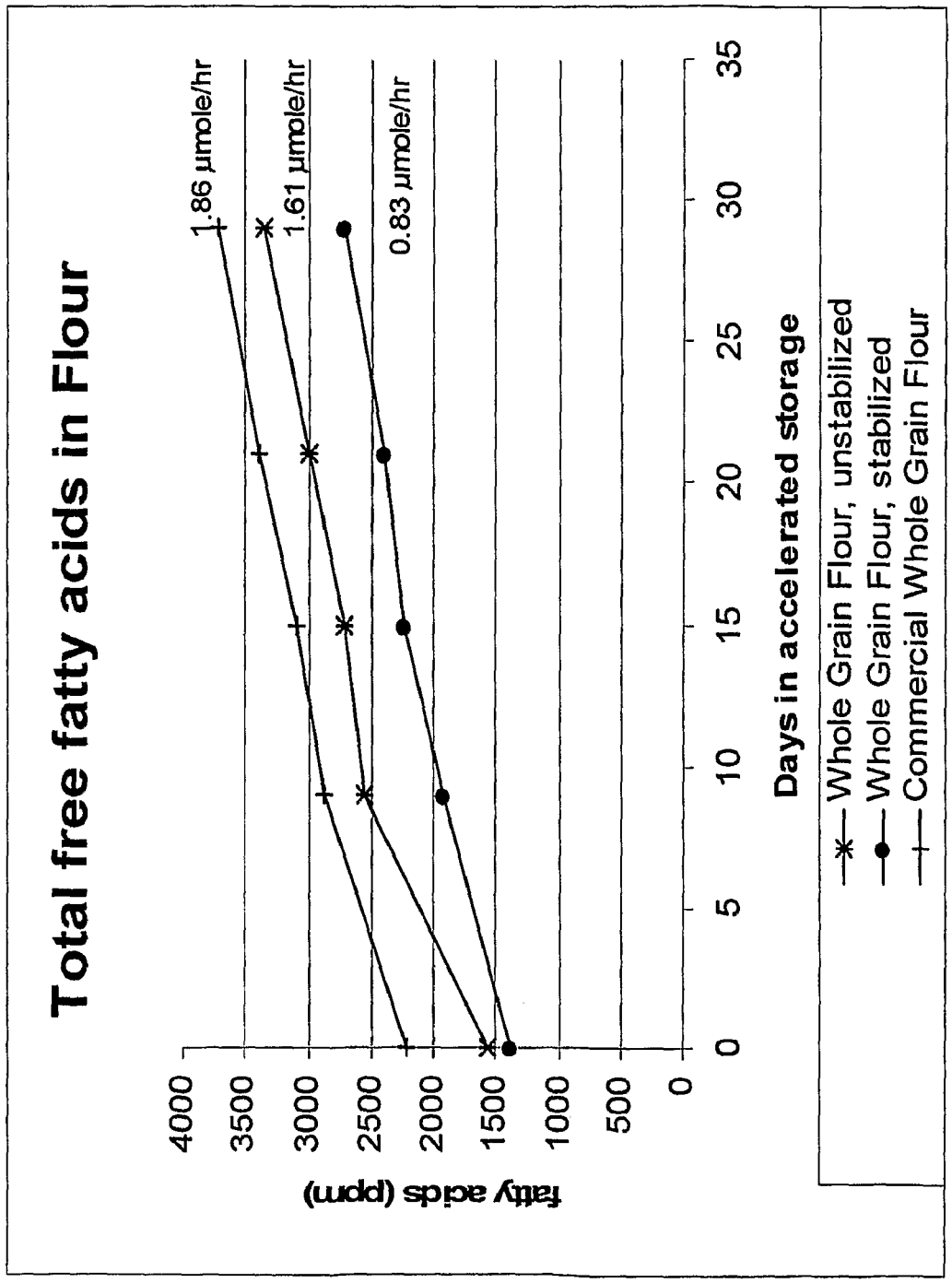
FIG. 7 shows a plot of the total free fatty acids in stabilized and unstabilized whole grain flours made with ground bran byproduct from the production of white refined flour milling as a function of the length of time in accelerated storage.

Results are reported in ppm, µg/g or mg Kg, rounded to the nearest whole number. Prior to sample data generation, the laboratory must establish detection and practical quantization FIG. 6 shows a plot of the total free fatty acids in the whole grain flour made with ground bran component as a function of the length of time in accelerated storage. As shown in Table 14 and FIG. 6, stabilization reduced the amount of free fatty acids in the bran component from 2218 ppm down to 1414 ppm for the soft red wheat flour, and from 2005 ppm down to 1235 ppm for the soft white wheat flour at 29 days of accelerated storage. It is believed that this reduction in free fatty acids, a critical substrate of the lipoxygenase enzyme, substantially reduces the amount of oxidized fat in the flour below the aroma/flavor threshold of about 3,000 ppm (or 10% of total lipid content) and thus extends shelf-life substantially. FIG. 7 shows a plot of the total free fatty acids in the whole grain flours made with ground bran byproduct from the production of white refined flour milling as a function of the length of time in accelerated storage. As shown in Table 14 and FIG. 7, stabilization reduced the amount of free fatty acids in the flour from 3354 ppm down to 2713 ppm for the whole grain wheat flour at 29 days of accelerated storage, which is substantially below the 3715 ppm of total free fatty acids in the commercial whole grain wheat flour.

EXAMPLE 6

Effect of Stabilization Upon Total Antioxidant Capacity of Bran Component

In this example, a stabilized ground wheat bran component, from the milling of untempered soft red whole grain flour milling, is prepared according to the present invention and analyzed to determine the total antioxidant capacity compared to unstabilized ground bran and a leading commercial stabilized bran, Grain Millers bran. The method used to determine the total antioxidant capacity is the oxygen radical absorbance capacity (ORAC) measurement.

The ORAC assay is based on hydrogen atom transfer reactions in which an antioxidant and substrate compete for thermally generated peroxyl radicals through the decomposition of azo compounds. The method used is as follows:

Extraction Protocol for Wheat Bran

The extraction protocol for wheat bran employed in the determination of total antioxidant capacity is:
1. Wheat bran samples (1 gram) were weighed into 50 mL centrifuge tubes and then 15 mL of petroleum ether was added to each tube.
2. The tubes were vortexed for 30 seconds and then centrifuged at 8,000 rpm for 10 minutes.
3. The supernatant was collected and the pellet was re-extracted twice with petroleum ether.
4. The pooled supernatants were dried in a Thermo Savant SPD 1010 SpeedVac and the residues reconstituted in 1 mL of acetone (lipophilic extract).
5. To the remaining pellet, 15 mL of 2M NaOH (sparged with $N_2$) was added.
6. After flushing with $N_2$ and capping, the tubes were shaken at room temperature for 1 hour.
7. Following centrifugation at 8,000 rpm for 10 minutes the supernatants were neutralized with HCl and brought to 100 mL volume with $diH_2O$ (hydrophilic extract).

ORAC Procedure

The reagents and solvents, reagent preparation, microplate procedure, data analysis and calculations used in the ORAC procedure employed in the determination of total antioxidant capacity are:

Reagents and Solvents

The reagents and solvents used in the ORAC procedure are:
1. Trolox, 6-Hydroxy-2,5,7,8-tetramethylchroman-2-carboxylic acid, Aldrich Chemicals, Item 238813-5G, CAS#53188-07-1, F.W. 250.29.
2. Fluorescein disodium salt, Aldrich Chemicals, Item 166308-100G, CAS#518-47-8, F.W. 376.28.
3. AAPH, 2,2'-Azobis(2-amidinopropane) dihydrochloride, Wako Chemicals, Item 992-11062 RN#2997-92-4. F. W. 271.193.
4. Potassium Phosphate Dibasic, Fisher Chemical, CAS# 7758-11-4, F.W. 174.18.
5. Sodium Phosphate Monobasic, Sigma-Aldrich, CAS# 10049-21-5, F.W. 138.00.
6. Randomly Methylated β-Cyclodextrin, Pharm Grade, Cat. No. TRMBP, Cyclodextrin Technologies.
7. Acetone, HPLC Grade, Fisher Chemicals.
8. $diH_2O$

Reagent Preparation

The methods for preparation of the ORAC reagents are:

Phosphate Buffer

The phosphate buffer is prepared by making phosphate buffer stock solutions and using them to make a buffer working solution.

Buffer Stock Solution: To make phosphate buffer, prepare 0.75M $K_2HPO_4$ and 0.75M $NaH_2PO_4$. For 0.75 M $K_2HPO_4$: 130 g of potassium phosphate are dissolved in 1 L of DI water. For 0.75 M $NaH_2PO_4$: 90 g of sodium phosphate is dissolved in 1 L of DI water.

Buffer Working Solution: To make a phosphate buffer working solution, mix 0.75 M $K_2HPO_4$ and 0.75 M $NaH_2PO_4$ solutions ($K_2HPO_4/NaH_2PO_4$, 61.6:38.9, v/v) and dilute with DI water (1:9, v/v). This will yield a 75 mM, pH 7.0 working solution. Store this buffer solution in the refrigerator until it is used.

7% RMCD Solution

A 7% by weight RMCD solution is made by bringing 70 grams of randomly methylated cyclodextrin up to 1 liter in 50% acetone:water.

Fluorescein Solution

The fluorescein solution is prepared by making fluorescein stock solutions and then using them to make a fluorescein working solution.

Fluorescein Stock Solution: Fluorescein stock solution #1 is made by dissolving 0.0225 g in 50 mL of working phosphate buffer and mixing well. Fluorescein stock solution #2 is made by dissolving 50 μL of stock solution #1 in 10 mL of working buffer and vortexing. Then, aliquot stock solution #2 into 1.8 mL Eppendorf tubes and store at −20° C. until it is used.

Fluorescein Working Solution: Pipette 800 μL of stock solution #2 into 50 mL phosphate buffer (for two runs) in a 50 mL conical tube. Before use, incubate in the water bath at 37° C. until thoroughly heated. This solution can be kept in the water bath for many hours.

AAPH Solution

An AAPH solution is made by dissolving 0.108 g of AAPH into 5 mL of incubated phosphate buffer (37° C.) for hydrophilic (or 2.5 mL of incubated buffer for lipophilic) just before the start of the assay.

Microplate Procedure

The microplate procedure employed in the ORAC procedure used in the determination of total antioxidant capacity is:
1. Samples were diluted in phosphate buffer for hydrophilic ORAC and 7% RMCD solution for lipophilic ORAC.
2. Pipette 40 μL of sample, blank and Trolox standard solutions into appropriate wells. Also pipette 400 mL of fluorescein working solution into the selected well for the gain adjustment.
4. Verify that plate reader is warmed up to 37° C. and ready to read samples.
5. Microplate reader added 400 μL fluorescein working solution to each well at cycle 2.
6. Microplate reader added 40 μL AAPH working solution at cycle 4.
7. No. of cycles 35 at 201 seconds per cycle.

Data Analysis and Calculations

The data analysis and calculations used in the ORAC procedure employed in the determination of total antioxidant capacity are:

Calculation of Area Under the Curve (AUC)

The area under the curve (AUC) was calculated as:

$$AUC = (0.5 + f_5/f_4 + f_6/f_4 + f_7/f_4 + \cdots + f_i/f_4)CT$$

where $f_i$=fluorescence reading at cycle I (i.e. $f_4$=initial fluorescence reading at cycle 4), and CT=cycle time in minutes. The net AUC was obtained by subtracting the AUC of the blank from that of a sample.

Calculation of $ORAC_{FL}$ Value

The final $ORAC_{FL}$ values were calculated by using a regression equation (y=a+bx, linear; or y=a+bx+cx$^2$, quadratic) between Standard concentration (μM) and the net area under the FL decay curve (net AUC). Linear regression was used in the range of 6.25-50 μM Trolox. Data is expressed as micromoles of Trolox Equivalents (TE) per gram dry weight of sample (μmol TE/g).

Stabilization

Ground bran component (A bran BM), with 25% particle weight>500 microns, 35% by weight>250 microns, 20% by weight>150 microns and 20% by weight<150 microns was stabilized using three conditions shown in Table 15. The bran moisture was adjusted, prior to stabilization, according to the method discussed in Example 1. The Table 15 stabilization conditions employed are:

TABLE 15

Stabilization Conditions for Bran Components

| | Temperature, °C. | Time, min. | Moisture wt % |
|---|---|---|---|
| LLL | 100 | 3 | 10.29 |
| MMM | 120 | 5 | 11.17 |
| HHH | 140 | 7 | 14.73 |

Total antioxidant capacity of each bran component after stabilization (samples B, C, and D) was measured in triplicate, expressed as Trolox equivalents, and compared to unstabilized control (sample A) and a leading commercial stabilized bran. The results are shown in Table 16:

TABLE 16

Total Antioxidant Capacity for Stabilized and unstabilized Bran Components

| Bran Component Sample | | hydrophilic μmol TE*/g TROLOX | lipophilic μmol TE/g TROLOX | total μmol TE/g TROLOX |
|---|---|---|---|---|
| A Mill Bran BM | A | 165.79 | 19.06 | 184.86 |
| A Mill Bran BM | A | 169.52 | 17.74 | 187.26 |
| A Mill Bran BM | A | 165.22 | 19.48 | 184.70 |
| | AVG. | 166.84 | 18.76 | 185.61 |
| A Mill Bran BM LLL | B | 196.54 | 26.23 | 222.76 |
| A Mill Bran BM LLL | B | 190.45 | 26.19 | 216.64 |
| A Mill Bran BM LLL | B | 195.39 | 26.00 | 221.40 |
| | AVG. | 194.13 | 26.14 | 220.27 |
| A Mill Bran BM MMM | C | 175.93 | 14.92 | 190.85 |
| A Mill Bran BM MMM | C | 181.33 | 15.65 | 196.98 |
| A Mill Bran BM MMM | C | 178.21 | 16.76 | 194.97 |
| | AVG. | 178.49 | 15.78 | 194.27 |
| A Mill Bran BM HHH | D | 191.83 | 13.97 | 205.80 |
| A Mill Bran BM HHH | D | 186.12 | 14.58 | 200.71 |
| A Mill Bran BM HHH | D | 179.14 | 14.78 | 193.92 |
| | AVG. | 185.70 | 14.44 | 200.14 |

TABLE 16-continued

Total Antioxidant Capacity for Stabilized and unstabilized Bran Components

| Bran Component Sample | | hydrophilic μmol TE*/g TROLOX | lipophilic μmol TE/g TROLOX | total μmol TE/g TROLOX |
|---|---|---|---|---|
| Grain Millers Bran | E | 109.54 | 3.05 | 112.59 |
| Grain Millers Bran | E | 125.59 | 3.22 | 128.80 |
| Grain Millers Bran | E | 129.75 | 3.34 | 133.08 |
| | AVG. | 121.62 | 3.20 | 124.83 |

*TE = trolox equivalents

Using Trolox equivalents as the measure of antioxidant capacity for stabilized bran, as shown in Table 16, the stabilized bran antioxidant ranged from about 191 to about 223 μmole TE per g compared with control unstabilized bran antioxidant capacity of about 185 to about 187 μmole TE per gram which indicates that bran stabilized according to the process set forth in Example 6 retains all of its original antioxidant capacity and surpasses the leading commercial stabilized bran antioxidant capacity of about 112 to about 133 μmole TE per g.

EXAMPLE 7

Stabilization of Rice Bran

In this example, a stabilized rice bran component, from the milling of whole rice, is prepared and analyzed to determine the lipase activity and vitamin retention.

Preparation of Stabilized Bran Component

Stabilized rice bran component was produced using bran obtained from the milling of whole rice used in the production of rice flour. The bran had a moisture content of about 9.9% and a relative humidity of about 51%. The particle size of the unstabilized rice bran was measured using a Ro Tap shaker with the aid of silicon beads to break up particle aggregates. The unground rice bran had a particle size distribution representative of between an unground coarse fraction and a ground or milled coarse component. The unground rice bran had a particle size distribution of about 9.1% particle weight>841 micron, about 36%>500 microns but less than 841 microns, about 38.17%>250 microns, but less than 500 microns, about 7.1%>149 microns but less than 250 microns, and about 9.7%<149 microns. The bran contained about 12.9% by weight starch as determined by iodometric measurement using a method as described in Example 1. Prior to stabilization, the bran moisture was adjusted by placing the bran in a desiccator containing a saturated salt solution for one week at room temperature, or in an atmosphere-controlled room, to uniformly adjust the bran moisture in increments from about 9.5% to 12.13% moisture content according to Table 17:

TABLE 17

Moisture Equilibration Conditions for Rice Bran

| Saturated Salt Solution | Relative Humidity | Rice Bran Moisture |
|---|---|---|
| Mg(NO$_3$)$_2$•6H$_2$O | 52% | 9.45% |
| Atmosphere controlled room | 63% | 10.01% |
| NH$_4$Cl | 79% | 12.13% |

The bran, 20 g, was placed in a sealed foil bag with three to four small pinholes to release pressure upon heating. An Omega temperature non-reversible label was placed inside each bag to serve as an internal temperature recording instrument. The study was performed according to the experimental design outlined in Table 18. The bran was heated in a pre-heated forced air convection oven (Thelco Model 26, Precision Scientific) for either 3, 5 or 7 minutes and at either 100° C., 120° C. and 140° C., in order to determine the effect of bran moisture, heating time and temperature on lipase activity and vitamin retention. Immediately after heating, the foil bags containing the bran were cooled in a refrigerator, and the bran was placed in a sealed glass container and stored frozen. A portion of the sample was analyzed to determine lipase activity and vitamin retention.

Determination of Lipase Activity

The lipase activity, expressed as µmoles hydrolysis product formed per hour per unit weight of bran, was found to be 10.72 µmole/h/0.1 g for the starting material and was reduced to 1.57 to 2.09 µmole/hr/0.1 g at 10.01% moisture after stabilization treatment for 5 minutes at 120° C.

The experimental design for the stabilization conditions for treating the coarse rice bran fraction is shown in Table 18:

TABLE 18

Experimental Design for Rice Bran Coarse Fraction

| Sample No. | Factor 1 A: Temp. ° C. | Factor 2 B: Time, min. | Factor 3 C: Moisture (wt %) |
|---|---|---|---|
| 1 | 100 | 3 | 9.45 |
| 2 | 100 | 3 | 12.13 |
| 3 | 100 | 7 | 9.45 |
| 4 | 100 | 7 | 12.13 |
| 5 | 120 | 5 | 10.01 |
| 6 | 120 | 5 | 10.01 |
| 7 | 140 | 3 | 9.45 |
| 8 | 140 | 3 | 12.13 |
| 9 | 140 | 7 | 9.45 |
| 10 | 140 | 7 | 12.13 |
| 11 | 140 | 7 | 10.01 |
| 12 | 140 | 3 | 10.01 |

Vitamin Analysis

Retention of Vitamin E (tocopherol), 131 (thiamine) and B2 (riboflavin) in the stabilized bran was measured according to standard methods for vitamin analysis in foods.

Measurement of Lipase Activity

The method used for lipase esterase activity measurement involves: 1) determining the optimum substrate (p-nitrophenyl butyrate (Sigma, 9876-5G) in acetonitrile) concentration for maximum lipase activity; 2) dispersing the bran in pH 7.5 buffer; 3) adding p-nitrophenyl butyrate substrate; 4) spectrophotometric measurement of the esterase activity of the bran through release of p-nitrophenol which absorbs at 340 nm.

The materials, instruments, and methods employed to measure lipase activity are:

Materials:
1. Phosphate buffer (pH 7.5, 0.2 M)
2. p-Nitrophenyl Butyrate p-NPB) (Sigma, 9876-5G)
3. acetonitrile Instruments:
1. Spectrophotometer
2. Centrifuge, capable of reaching 1000 g's Method:
A. Determination of Optimum Substrate Concentration
   1. Dissolve p-NPB in acetonitrile so that its concentration is 10.75 mM.
   2. Weigh 0.02 g of bran sample into centrifuge tube.
   3. Add 9.7, 9.5 or 9.3 ml of phosphate buffer (pH 7.5) in the tube.
   4. Add 0.3, 0.5, or 0.7 ml of 10.75 mM p-NPB, correspondingly, to make up a total sample volume of 10 ml. Record the exact time of p-NPB addition and shake the sample tube.
   5. Place in 25° C. water bath for 20 min.
   6. After 20 min of p-NPB addition, centrifuge the sample at 1000 g's for 5 min.
   7. Measure the supernatant absorbance (total absorbance, $A_t$) at 400 nm at exactly 30 min. after p-NPB addition.
   8. To determine bran absorbance ($A_s$), repeat steps 2 and 3 above, except that 10 ml of phosphate buffer and no p-NPB should be added, and the time should be recorded after the buffer addition. Repeat steps 5, 6 and 7.
   9. Use deionized water as blank ($A_0$).
   10. Calculate the sample absorbance (A) by subtracting blank and bran absorbance from the total absorbance, as follows: sample absorbance (A)=total absorbance ($A_t$)–blank absorbance ($A_0$)–bran absorbance ($A_s$)
   11. Calculate lipase activity based on the following calibration curve values:
      µmole of p-NPB hydrolyzed=(A–0.0555)/1380 and making adjustments for sample weight and reaction time, as follows:
      µmole of p-NPB hydrolyzed/hour/0.1 g
   12. Choose optimum substrate concentration based on highest lipase activity recorded (see Table 19):

TABLE 19

Determination of Optimum Substrate Concentration

| Volume of 10.75 mM p-NPB added (ml) | Volume of pH 7.5 phosphate buffer added (ml) | Lipase Activity (µmole/h/0.1 g) |
|---|---|---|
| 0.3 | 9.7 | 6.91 |
| 0.5 | 9.5 | 8.74 |
| 0.7 | 9.3 | 5.32 |

B. Determination of Lipase Activity in Experimental Design Samples
   1. Based on the results shown in Table 19, the optimum substrate concentration was 0.5 ml of 10.75 mM p-NPB.
   2. In order to obtain absorbance values below 0.8 (to be within the spectrophotometer linear range), and keeping the same sample to substrate concentration (0.02 g bran+0.5 ml p-NPB), an extra 10 ml of buffer solution (total of 19.5 ml buffer solution) have to be added. The sample absorbance is then adjusted as follows: sample absorbance (A)=[total absorbance ($A_t$)–blank absorbance ($A_0$)–bran absorbance ($A_s$)]*2 to correct for sample dilution.
   3. Follow same procedure as in (A) "Determination of Optimum Substrate Concentration."

Results:

Summarized in Table 20, for the stabilization treatment of twelve course rice bran samples, two commercially available stabilized rice bran samples, and one unstabilized rice bran control sample, are: 1) the amount of lipase enzyme activity, dry weight basis, 2) percent lipase activity reduction, 3) treatment conditions including moisture, time, and temperature, and 4) vitamin content:

TABLE 20

Lipase Activity and Vitamin Retention in Rice Bran

| Sample No. | Sample storage | Real Temp °C. | Temp °C. | Time min | Moisture Before wt. % | After wt. % | RH Before %, °C. | Lipase Activity μmole/h/0.1 g | % Red. | Vitamin Retention E (IU/100 g) | B1 (mg/100 g) | B2 (mg/100 g) |
|---|---|---|---|---|---|---|---|---|---|---|---|---|
| 1 | Mg(NO$_3$)$_2$ | 100 | 82-88 | 3 | 9.455 | 9.422 | 47.4, 23.7 | 6.43 | 40.00 | 4.8 | 2.19 | 0.18 |
| 2 | NH$_4$Cl | 100 | 82-88 | 3 | 12.129 | 11.807 | 69.9, 24.6 | 1.64 | 84.72 | | | |
| 3 | Mg(NO$_3$)$_2$ | 100 | 88 | 7 | 9.455 | 8.717 | 47.4, 23.7 | 1.91 | 82.19 | 4.4 | 2.25 | 0.17 |
| 4 | NH$_4$Cl | 100 | 88 | 7 | 12.129 | 11.007 | 69.9, 24.6 | 1.31 | 87.78 | | | |
| 5 | 63% room | 120 | 99 | 5 | 10.013 | 9.694 | 54.9, 22.9 | 2.09 | 80.48 | | | |
| 6 | 63% room | 120 | 99 | 5 | 10.013 | 9.495 | 54.9, 22.9 | 1.57 | 85.35 | | | |
| 7 | Mg(NO$_3$)$_2$ | 140 | 104 | 3 | 9.455 | 9.003 | 47.4, 23.7 | 1.94 | 81.90 | 4.5 | 2.14 | 0.17 |
| 8 | NH$_4$Cl | 140 | 104 | 3 | 12.129 | 11.56 | 69.9, 24.6 | 1.36 | 87.28 | 2.2 | 2.12 | 0.17 |
| 9 | Mg(NO$_3$)$_2$ | 140 | 121 | 7 | 9.455 | 6.762 | 47.4, 23.7 | 1.30 | 87.83 | | | |
| 10 | NH$_4$Cl | 140 | 121 | 7 | 12.129 | 8.312 | 69.9, 24.6 | 1.30 | 87.88 | | | |
| 11 | 63% room | 140 | 121 | 7 | 10.013 | 7.054 | 54.9, 22.9 | 1.59 | 85.12 | | | |
| 12 | 63% room | 140 | 104 | 3 | 10.013 | 8.067 | 54.9, 22.9 | 1.36 | 87.29 | | | |
| | Unstabilized rice bran | | | | 9.924 | | 51.2, 23.9 | 10.72 | | 7.0 | 2.2 | 0.17 |
| | Stabilized rice bran (full fat), commercial | | | | 8.177 | | 46.1, 25.4 | 0.00 | 100.00 | 4.0 | 1.74 | 0.11 |
| | Stabilized rice bran (defatted), commercially | | | | 10.446 | | 51.5, 26.0 | 0.00 | 100.00 | 1.2 | 1.91 | 0.17 |

As indicated in Table 20, treatment of the unground, coarse rice bran component at a moisture content in the range of about 9.5% by weight to about 12.13% by weight for about 3 minutes to about 7 minutes at about 100° C. to about 140° C. reduced lipase activity from about 10.72 μmole/hour/0.1 g for the non-stabilized starting material down to the range of from 6.43 μmole/hour/0.1 g to about 1.30 μmole/hour/0.1 g, depending upon treatment conditions, with the longest treatment time, highest moisture content and highest treatment temperature providing the lowest lipase activity. The results also indicate the values of Vitamin E (tocopherol), Vitamin B1 (Thiamine), and Vitamin B2 (Riboflavin) were well retained. The unground coarse rice bran exhibited lipase percent reductions ranging from 40% to 87.88%, depending upon stabilization conditions. Higher percentage reductions in lipase activity, at any given stabilization condition would be obtained if the rice bran were ground to a smaller particle size of a coarse ground bran component prior to stabilization because grinding would increase access of moisture and heat for deactivation. However, conducting the grinding after stabilization could increase the lipase activity because lipase is a surface active enzyme, and the grinding increases the surface area and increases accessability to the enzyme substrate.

EXAMPLE 8

Stabilization of Oat Bran

In this example, a stabilized oat bran component, from the milling of whole, de-hulled oat groats, is prepared and analyzed to determine the lipase activity and vitamin retention.
Preparation of Stabilized Bran Component Stabilized oat bran component was produced using bran obtained from the milling of whole, de-hulled oat groats into whole oat flour. The portion of the whole oat flour remaining on sieve #60 (U.S. standard) was considered to be the bran portion. The bran had a moisture content of about 9.8% and a relative humidity of about 29%. The particle size of the unstabilized, ground oat bran was measured using a Ro Tap shaker with the aid of silicon beads to break up particle aggregates. The ground oat bran had a particle size distribution of about 0% particle weight>841 micron, about 32.87%>500 microns but less than 841 microns, about 35.12%>250 microns, but less than 500 microns, about 5.59%>149 microns but less than 250 microns, and about 26.42%<149 microns. The bran contained about 22.5% by weight starch as determined by iodometric measurement using a method as described in Example 1. Prior to stabilization, the bran moisture was adjusted by placing the bran in a desiccator containing a saturated salt solution for one week at room temperature, or in an atmosphere-controlled room, to uniformly adjust the bran moisture in increments from about 10.97% to 13.89% moisture content according to Table 21:

TABLE 21

Moisture Equilibration Conditions for Oat Bran

| Saturated Salt Solution | Relative Humidity | Oat Bran Moisture |
|---|---|---|
| Mg(NO$_3$)$_2$•6H$_2$O | 52% | 10.97% |
| Atmosphere controlled room | 63% | 12.25% |
| NH$_4$Cl | 79% | 13.89% |

The bran, 20 g, was placed in a sealed foil bag with three to four small pinholes to release pressure upon heating. An Omega temperature non-reversible label was placed inside each bag to serve as an internal temperature recording instrument. The study was performed according to the experimental design outlined in Table 22. The bran was heated in a pre-heated forced air convection oven (Thelco Model 26, Precision Scientific) for either 3, 5 or 7 minutes and at either 100° C., 120° C. and 140° C., in order to determine the effect of bran moisture, heating time and temperature on lipase activity and vitamin retention. Immediately after heating, the foil bags containing the bran wee cooled in a refrigerator, the bran was placed in a sealed glass container and stored frozen. A portion of the sample was analyzed to determine lipase activity and vitamin retention.
Determination of Lipase Activity The lipase activity, expressed as μmoles hydrolysis product formed per hour per unit weight of bran, was found to be 5.81 μmole/h/0.1 g for the starting material and was reduced to 0.60 to 0.63 μmole/hr/0.1 g at 12.25% moisture after stabilization treatment for 5 minutes at 120° C.

The experimental design for the stabilization conditions for treating the ground coarse oat bran fraction is shown in Table 22:

TABLE 22

Experimental Design for Oat Bran Ground Coarse Fraction

| Sample No. | Factor 1 A: Temp, °C. | Factor 2 B: Time, min. | Factor 3 C: Moisture (wt. %) |
|---|---|---|---|
| 1 | 100 | 3 | 10.97 |
| 2 | 100 | 3 | 13.89 |
| 3 | 100 | 7 | 10.97 |
| 4 | 100 | 7 | 13.89 |
| 5 | 120 | 5 | 12.25 |
| 6 | 120 | 5 | 12.25 |
| 7 | 140 | 3 | 10.97 |
| 8 | 140 | 3 | 13.89 |
| 9 | 140 | 7 | 10.97 |
| 10 | 140 | 7 | 13.89 |
| 11 | 140 | 7 | 12.25 |
| 12 | 140 | 3 | 12.25 |

Vitamin Analysis

Retention of Vitamin E (tocopherol), B1 (thiamine) and B2 (riboflavin) in the stabilized bran was measured according to standard methods for vitamin analysis in foods.

Measurement of Lipase Activity

The method used for lipase esterase activity measurement involves: 1) determining the optimum substrate (p-nitrophenyl butyrate (Sigma, 9876-5G) in acetonitrile) concentration for maximum lipase activity; 2) dispersing the bran in pH 7.5 buffer; 3) adding p-nitrophenyl butyrate substrate; 4) spectrophotometric measurement of the esterase activity of the bran through release of p-nitrophenol which absorbs at 340 nm.

The materials, instruments, and methods employed to measure lipase activity are:

Materials:
1. Phosphate buffer (pH 7.5, 0.2 M)
2. p-Nitrophenyl Butyrate (p-NPB) (Sigma, 9876-5G)
3. Acetonitrile Instruments:
1. Spectrophotometer
2. Centrifuge, capable of reaching 1000 g's Method:
A. Determination of Optimum Substrate Concentration
  1. Dissolve p-NPB in acetonitrile so that its concentration is 10.75 mM.
  2. Weigh 0.02 g of bran sample into centrifuge tube.
  3. Add 9.5, 9.0 or 8.5 ml of phosphate buffer (pH 7.5) in the tube.
  4. Add 0.5, 1.0, or 1.5 ml of 10.75 mM p-NPB, correspondingly, to make up a total sample volume of 10 ml. Record the exact time of p-NPB addition and shake the sample tube.
  5. Place in 25° C. water bath for 20 min.
  6. After 20 min of p-NPB addition, centrifuge the sample at 1000 g's for 5 min.
  7. Measure the supernatant absorbance (total absorbance, $A_t$) at 400 nm at exactly 30 min. after p-NPB addition.
  8. To determine bran absorbance ($A_s$), repeat steps 2 and 3 above, except that 10 ml of phosphate buffer and no p-NPB should be added, and the time should be recorded after the buffer addition. Repeat steps 5, 6 and 7.
  9. Use deionized water as blank ($A_0$).
  10. Calculate the sample absorbance (A) by subtracting blank and bran absorbance from the total absorbance, as follows:

sample absorbance (A)=total absorbance ($A_t$)−blank absorbance ($A_0$)−bran absorbance ($A_s$)

11. Calculate lipase activity based on the following calibration curve values:

μmole of p-NPB hydrolyzed=(A−0.0555)/1380 and making adjustments for sample weight and reaction time, as follows:

μmole of p-NPB hydrolyzed/hour/0.1 g

12. Choose optimum substrate concentration based on highest lipase activity recorded (see Table 23):

TABLE 23

Determination of Optimum Substrate Concentration

| Volume of 10.75 mM p-NPB added (ml) | Volume of pH 7.5 phosphate buffer added (ml) | Lipase Activity (μmole/h/0.1 g) |
|---|---|---|
| 0.5 | 9.5 | 6.91 |
| 1 | 9.0 | 8.74 |
| 1.5 | 8.5 | 5.32 |

B. Determination of Lipase Activity in Experimental Design Samples
  1. Based on the results shown in Table 23, the optimum substrate concentration was 1.0 ml of 10.75 mM p-NPB.
  2. In order to obtain absorbance values below 0.8 (to be within the spectrophotometer linear range), and keeping the same sample to substrate concentration (0.02 g bran+1.0 ml p-NPB), an extra 10 ml of buffer solution (total of 19.0 ml buffer solution) have to be added. The sample absorbance is then adjusted as follows:

sample absorbance (A)=[total absorbance ($A_t$)−blank absorbance ($A_0$)−bran absorbance ($A_s$)]*2 to correct for sample dilution.

3. Follow same procedure as in (A) "Determination of optimum substrate concentration."

Results:

Summarized in Table 24, for the stabilization treatment of twelve ground course oat bran samples, one commercially available stabilized oat bran sample, and one unstabilized ground coarse oat bran control sample, are: 1) the amount of lipase enzyme activity, dry weight basis, 2) percent lipase activity reduction, 3) treatment conditions including moisture, time, and temperature, and 4) vitamin content:

TABLE 24

Lipase Activity and Vitamin Retention in Oat Bran

| Sample No. | Sample storage | Temp ° C. | Real Temp ° C. | Time min | Moisture Before wt. % | Moisture After wt. % | RH Before %, ° C. | Lipase Activity μmole/ h/0.1 g | % Red. | Vitamin Retention E (IU/100 g) | Vitamin Retention B1 (mg/100 g) | Vitamin Retention B2 (mg/100 g) |
|---|---|---|---|---|---|---|---|---|---|---|---|---|
| 1 | Mg(NO$_3$)$_2$ | 100 | 82-88 | 3 | 10.968 | 10.813 | 48.4, 24.7 | 4.39 | 24.51 | 0.90 | 0.99 | 0.12 |
| 2 | NH$_4$Cl | 100 | 82-88 | 3 | 13.891 | 13.015 | 68.2, 23.8 | 1.46 | 74.90 | | | |
| 3 | Mg(NO$_3$)$_2$ | 100 | 88-93 | 7 | 10.968 | 10.251 | 48.4, 24.7 | 2.03 | 65.11 | 1.00 | 1.01 | 0.12 |
| 4 | NH$_4$Cl | 100 | 88-93 | 7 | 13.891 | 12.762 | 68.2, 23.8 | 0.18 | 96.92 | | | |
| 5 | 63% room | 120 | 99-104 | 5 | 12.252 | 11.237 | 55.5, 22.6 | 0.60 | 89.66 | | | |
| 6 | 63% room | 120 | 99-104 | 5 | 12.252 | 10.641 | 55.5, 22.6 | 0.63 | 89.13 | | | |
| 7 | Mg(NO$_3$)$_2$ | 140 | 104-110 | 3 | 10.968 | 10.150 | 48.4, 24.7 | 0.87 | 85.07 | 0.90 | 0.97 | 0.12 |
| 8 | NH$_4$Cl | 140 | 104-110 | 3 | 13.891 | 12.164 | 68.2, 23.8 | 0.77 | 86.82 | 0.80 | 0.95 | 0.12 |
| 9 | Mg(NO$_3$)$_2$ | 140 | 121-127 | 7 | 10.968 | 9.100 | 48.4, 24.7 | 0.65 | 88.74 | | | |
| 10 | NH$_4$Cl | 140 | 121-127 | 7 | 13.891 | 7.700 | 68.2, 23.8 | 0.26 | 95.50 | | | |
| 11 | 63% room | 140 | 121-127 | 7 | 12.252 | 8.088 | 55.5, 22.6 | 0.18 | 96.90 | | | |
| 12 | 63% room | 140 | 104-110 | 3 | 12.252 | 11.101 | 55.5, 22.6 | 0.32 | 94.47 | | | |
| | Unstabilized oat bran | | | | 9.842 | | 29.3, 23.6 | 5.81 | | 1.00 | 1.10 | 0.13 |
| | Stabilized oat bran, commercially | | | | 6.156 | | 16.5, 23.3 | 0.00 | 100.00 | 0.50 | 0.74 | 0.10 |

As indicated in Table 24, treatment of the ground, coarse oat bran component at a moisture content in the range of about 10.97% by weight to about 13.89% by weight for about 3 minutes to about 7 minutes at about 100° C. to about 140° C. reduced lipase activity from about 5.81 μmole/hour/0.1 g for the non-stabilized starting material down to the range of from 4.39 μmole/hour/0.1 g to about 0.18 μmole/hour/0.1 g, depending upon treatment conditions, with both: 1) the longest treatment time, and highest treatment temperature, and 2) the longest treatment time and highest moisture content providing the lowest lipase activity. The results also indicate the values of Vitamin E (tocopherol), Vitamin B1 (Thiamine), and Vitamin B2 (Riboflavin) were well retained. The ground coarse oat bran exhibited lipase percent reductions ranging from 24.51% to 96.92%, depending upon stabilization conditions.

EXAMPLE 9

Stabilization of Corn Bran

In this example, a stabilized corn bran component, from the milling of whole corn kernels, is prepared and analyzed to determine the lipase activity and vitamin retention.

Preparation of Stabilized Bran Component

Stabilized corn bran component was produced using bran obtained from the milling of whole corn kernels into whole corn flour. The portion of the whole corn flour retained on sieve #50 (U.S. Standard) was considered to be the bran portion. The bran had a moisture content of about 10.76% and a relative humidity of about 42.0%. The particle size of the unstabilized, ground corn bran was measured using a Ro Tap shaker with the aid of silicon beads to break up particle aggregates. The ground corn bran had a particle size distribution of about 0% particle weight>841 micron, about 6.94%>500 microns but less than 841 microns, about 51.53%>250 microns, but less than 500 microns, about 27.92%>149 microns but less than 250 microns, and about 13.61%<149 microns. The bran contained about 34.6% by weight starch as determined by iodometric measurement using a method as described in Example 1. Prior to stabilization, the bran moisture was adjusted by placing the bran in a desiccator containing a saturated salt solution for one week at room temperature, or in an atmosphere-controlled room, to uniformly adjust the bran moisture in increments from about 11.42% to 13.85% moisture content according to Table 25:

TABLE 25

Moisture Equilibration Conditions for Corn Bran

| Saturated Salt Solution | Relative Humidity | Corn Bran Moisture |
|---|---|---|
| Mg(NO$_3$)$_2$•6H$_2$O | 52% | 11.42% |
| Atmosphere controlled room | 63% | 11.74% |
| NH$_4$Cl | 79% | 13.85% |

The bran, 20 g, was placed in a sealed bag with three to four small pinholes to release pressure upon heating. An Omega temperature non-reversible label was placed inside each bag to serve as an internal temperature recording instrument. The study was performed according to experimental design outlined in Table 26. The bran was heated in a pre-heated forced air convection oven (Thelco Model 26, Precision Scientific) for either 3, 5 or 7 minutes and at either 100° C., 120° C. and 140° C., in order to determine the effect of bran moisture, heating time and temperature on lipase activity and vitamin retention. Immediately after heating, the foil bags containing the bran were cooled in a refrigerator, the bran was placed in a sealed glass container and stored frozen. A portion of the sample was analyzed to determine lipase activity and vitamin retention.

Determine of Lipase Activity

The lipase activity, expressed as μmoles hydrolysis product formed per hour per unit weight of bran, was found to be 1.96 μmole/h/0.1 g for the starting material and was reduced to 0 μmole/hr/0.1 g at 11.74% moisture after stabilization treatment for 5 minutes at 120° C.

The experimental design for the stabilization conditions for treating the ground coarse corn bran fraction is shown in Table 26:

TABLE 26

Experimental Design for Corn Bran Ground Coarse Fraction

| Sample No. | Factor 1 A: Temp, ° C. | Factor 2 B: Time, min. | Factor 3 C: Moisture (wt. %) |
|---|---|---|---|
| 1 | 100 | 3 | 11.42 |
| 2 | 100 | 3 | 13.85 |

TABLE 26-continued

Experimental Design for Corn Bran Ground Coarse Fraction

| Sample No. | Factor 1 A: Temp, °C. | Factor 2 B: Time, min. | Factor 3 C: Moisture (wt. %) |
|---|---|---|---|
| 3 | 100 | 7 | 11.42 |
| 4 | 100 | 7 | 13.85 |
| 5 | 120 | 5 | 11.74 |
| 6 | 120 | 5 | 11.74 |
| 7 | 140 | 3 | 11.42 |
| 8 | 140 | 3 | 13.85 |
| 9 | 140 | 7 | 11.42 |
| 10 | 140 | 7 | 13.85 |
| 11 | 140 | 7 | 11.74 |
| 12 | 140 | 3 | 11.74 |

Vitamin Analysis

Retention of Vitamin E (tocopherol), B1 (thiamine) and B2 (riboflavin) in the stabilized bran was measured according to standard methods for vitamin analysis in foods.

Measurement of Lipase Activity

The method used for lipase esterase activity measurement involves: 1) determining the optimum substrate (p-nitrophenyl butyrate (Sigma, 9876-5G) in acetonitrile) concentration for maximum lipase activity; 2) dispersing the bran in pH 7.5 buffer; 3) adding p-nitrophenyl butyrate substrate; 4) spectrophotometric measurement of the esterase activity of the bran through release of p-nitrophenol which absorbs at 340 nm.

The materials, instruments, and methods employed to measure lipase activity are:

Materials:
1. Phosphate buffer (pH 7.5, 0.2 M)
2. p-Nitrophenyl Butyrate (p-NPB) (Sigma, 9876-5G)
3. Acetonitrile Instruments:
1. Spectrophotometer
2. Centrifuge, capable of reaching 1000 g's Method:
A. Determination of Optimum Substrate Concentration
   1. Dissolve p-NPB in acetonitrile so that its concentration is 10.75 mM.
   2. Weigh 0.02 g of bran sample into centrifuge tube.
   3. Add 9.8, 9.5 or 9.0 ml of phosphate buffer (pH 7.5) in the tube.
   4. Add 0.2, 0.5, or 1.0 ml of 10.75 mM p-NPB, correspondingly, to make up a total sample volume of 10 ml. Record the exact time of p-NPB addition and shake the sample tube.
   5. Place in 25° C. water bath for 20 min.
   6. After 20 min of p-NPB addition, centrifuge the sample at 1000 g's for 5 min.
   7. Measure the supernatant absorbance (total absorbance, $A_t$) at 400 nm at exactly 30 min. after p-NPB addition.
   8. To determine bran absorbance ($A_s$), repeat steps 2 and 3 above, except that 10 ml of phosphate buffer and no p-NPB should be added, and the time should be recorded after the buffer addition. Repeat steps 5, 6 and 7.
   9. Use deionized water as blank ($A_0$).
   10. Calculate the sample absorbance (A) by subtracting blank and bran absorbance from the total absorbance, as follows:
      sample absorbance (A)=total absorbance ($A_t$)–blank absorbance ($A_0$)— bran absorbance ($A_s$)
   11. Calculate lipase activity based on the following calibration curve values:
      μmole of p-NPB hydrolyzed=(A–0.0555)/1380 and making adjustments for sample weight and reaction time, as follows:
      μmole of p-NPB hydrolyzed/hour/0.1 g
   12. Choose optimum substrate concentration based on highest lipase activity recorded (see Table 27):

TABLE 27

Determination of Optimum Substrate Concentration

| Volume of 10.75 mM p-NPB added (ml) | Volume of pH 7.5 phosphate buffer added (ml) | Lipase Activity (μmole/h/0.1 g) |
|---|---|---|
| 0.2 | 9.8 | 1.21 |
| 0.5 | 9.5 | 1.60 |
| 1.0 | 9.0 | 1.46 |

B. Determination of Lipase Activity in Experimental Design Samples
   1. Based on the results shown in Table 27, the optimum substrate concentration was 0.5 ml of 10.75 mM p-NPB.
   2. The absorbance values were below 0.8, thus, no necessary adjustments were needed to be within the spectrophotometer linear range. Total sample volume was kept at 10 ml.
   3. Follow same procedure as in (A) "Determination of optimum substrate concentration."

Results:

Summarized in Table 28, for the stabilization treatment of twelve ground course corn bran samples, one commercially available stabilized corn bran sample, and one unstabilized ground coarse corn bran control sample, are: 1) the amount of lipase enzyme activity, dry weight basis, 2) percent lipase activity reduction, 3) treatment conditions including moisture, time, and temperature, and 4) vitamin content:

TABLE 28

Lipase Activity and Vitamin Retention in Corn Bran

| Sample No. | Sample storage | Temp °C. | Real Temp °C. | Time min | Moisture Before wt. % | Moisture After wt. % | RH Before %, °C. | Lipase Activity μmole/h/0.1 g | % Red. | Vitamin Retention E (IU/100 g) | Vitamin Retention B1 (mg/100 g) | Vitamin Retention B2 (mg/100 g) |
|---|---|---|---|---|---|---|---|---|---|---|---|---|
| 1 | Mg(NO$_3$)$_2$ | 100 | 82-88 | 3 | 11.423 | 11.373 | 51.1, 24.0 | 1.37 | 30.07 | 0.80 | 0.18 | 0.04 |
| 2 | NH$_4$Cl | 100 | 82-88 | 3 | 13.847 | 13.647 | 72.9, 24.2 | 0.20 | 89.73 | | | |
| 3 | Mg(NO$_3$)$_2$ | 100 | 88-93 | 7 | 11.423 | 10.767 | 51.1, 24.0 | 0.35 | 82.40 | 0.70 | 0.16 | 0.04 |
| 4 | NH$_4$Cl | 100 | 88-93 | 7 | 13.847 | 12.998 | 72.9, 24.2 | 0.01 | 99.74 | | | |
| 5 | 63% room | 120 | 99-104 | 5 | 11.743 | 10.756 | 56.2, 24.2 | 0.00 | 100.00 | | | |
| 6 | 63% room | 120 | 99-104 | 5 | 11.743 | 11.334 | 56.2, 24.2 | 0.00 | 100.00 | | | |

TABLE 28-continued

Lipase Activity and Vitamin Retention in Corn Bran

| Sample No. | Sample storage | Temp °C. | Real Temp °C. | Time min | Moisture Before wt. % | Moisture After wt. % | RH Before %, °C. | Lipase Activity μmole/h/0.1 g | % Red. | Vitamin Retention E (IU/100 g) | Vitamin Retention B1 (mg/100 g) | Vitamin Retention B2 (mg/100 g) |
|---|---|---|---|---|---|---|---|---|---|---|---|---|
| 7 | Mg(NO$_3$)$_2$ | 140 | 104-110 | 3 | 11.423 | 10.922 | 51.1, 24.0 | 0.24 | 87.94 | 0.90 | 0.16 | 0.03 |
| 8 | NH$_4$Cl | 140 | 104-110 | 3 | 13.847 | 13.755 | 72.9, 24.2 | 0.00 | 100.00 | 0.80 | 0.16 | 0.04 |
| 9 | Mg(NO$_3$)$_2$ | 140 | 116-121 | 7 | 11.423 | 9.212 | 51.1, 24.0 | 0.00 | 100.00 | | | |
| 10 | NH$_4$Cl | 140 | 104-110 | 7 | 13.847 | 9.772 | 72.9, 24.2 | 0.00 | 100.00 | | | |
| 11 | 63% room | 140 | 116-121 | 7 | 11.743 | 9.040 | 56.2, 24.2 | 0.00 | 100.00 | | | |
| 12 | 63% room | 140 | 99-104 | 3 | 11.743 | 11.735 | 56.2, 24.2 | 0.00 | 100.00 | | | |
| Unstabilized corn bran | | | | | 10.764 | | 42.0, 22.3 | 1.96 | | 0.80 | 0.16 | 0.04 |
| Maize Wise 80 | | | | | 8.880 | | 43.1, 23.2 | 0.90 | 54.18 | 0.80 | 0.07 | 0.05 |

As indicated in Table 28, treatment of the ground, coarse oat bran component at a moisture content in the range of about 11.42% by weight to about 13.85% by weight for about 3 minutes to about 7 minutes at about 100° C. to about 140° C. reduced lipase activity from about 1.96 μmole/hour/0.1 g for the non-stabilized starting material down to the range of from 1.37 μmole/hour/0.1 g to 0.00 μmole/hour/0.1 g, depending upon treatment conditions, with the longest treatment time, the highest moisture content, and the highest treatment temperature, providing the lowest lipase activity. The results also indicate the values of Vitamin E (tocopherol), Vitamin B1 (Thiamine), and Vitamin B2 (Riboflavin) were well retained. The ground coarse corn bran exhibited lipase percent reductions ranging from 30.07% to 100.00%, depending upon stabilization conditions.

What is claimed is:

1. A method for making a stabilized whole grain flour comprising:
   a. subjecting a coarse fraction comprising bran, germ and starch to grinding or milling to reduce grittiness of the coarse fraction without substantially damaging the starch, the amount of bran being at least about 50% by weight, based upon the weight of the coarse fraction,
   b. stabilizing the coarse fraction by heating the coarse fraction to substantially reduce the lipase activity of the coarse fraction, wherein the stabilized, ground coarse fraction has a starch melting enthalpy of greater than about 4 J/g, based upon the weight of starch in the stabilized ground coarse fraction, as measured by differential scanning calorimetry (DSC), at a peak temperature of from about 65 ° C. to about 70° C., and a sodium carbonate-water solvent retention capacity (SRC sodium carbonate) of less than about 200%, and
   c. combining the stabilized coarse fraction with a fine fraction comprising endosperm to obtain a stabilized whole grain flour, wherein said stabilized whole grain flour has a sodium carbonate-water solvent retention capacity (SRC sodium carbonate) of less than about 85%.

2. A method as claimed in claim 1 wherein said stabilizing of the coarse fraction avoids substantial production of acrylamide, while also avoiding substantial loss of tocopherols, thiamin and riboflavin, and maintaining an antioxidant free radical scavenging capacity of not less than about 150 micromoles Trolox equivalents per gram.

3. A method as claimed in claim 1 wherein said coarse fraction is subjected to said grinding or milling before said stabilizing of the coarse fraction.

4. A method as claimed in claim 1 wherein said coarse fraction is subjected to said grinding or milling after said stabilizing of the coarse fraction.

5. A method as claimed in claim 1 wherein the amount of starch is from about 15% by weight to about 35% by weight, based upon the weight of the coarse fraction.

6. A method as claimed in claim 1 wherein before said grinding or milling the coarse fraction has a particle size distribution of at least about 75% by weight having a particle size of greater than or equal to 500 microns, less than or equal to about 5% by weight having a particle size of less than 149 microns, and about 15% by weight to about 25% by weight having a particle size of less than 500 microns but greater than or equal to 149 microns, and the coarse fraction is ground or milled to obtain a ground or milled fraction or bran component with at least about 40% by weight of the fraction having a particle size greater than or equal to 149 microns, and less than or equal to about 35% by weight having a particle size greater than or equal to 500 microns.

7. A method as claimed in claim 6 wherein said ground or milled fraction or bran component has a particle size distribution of about 0.5% by weight to about 5% by weight greater than or equal to 841 microns, about 10% by weight to about 30% by weight less than 841 microns but greater than or equal to 500 microns, about 25% by weight to about 70% by weight greater than or equal to 149 microns but less than 500 microns, and less than or equal to about 60% by weight less than 149 microns, said percentages adding up to a total of 100% by weight.

8. A method as claimed in claim 1 wherein the fine fraction is not subjected to stabilization, in order to avoid substantial gelatinization of starch, and stabilization of the coarse fraction by heating avoids substantial gelatinization of starch contained in the coarse fraction.

9. A method as claimed in claim 1 wherein the lipase activity is reduced to less than about 3 micromole butyrate free acid formed per hour per 0.1 gram of the stabilized coarse fraction.

10. A method as claimed in claim 1 wherein said stabilizing of the coarse fraction avoids an acrylamide content of greater than about 150 ppb, based upon the weight of the stabilized coarse fraction.

11. A method as claimed in claim 1 wherein said stabilization comprises heating at a temperature of from about 100° C. to about 140° C.

12. A method as claimed in claim 11 wherein said coarse fraction which is subjected to said stabilization has a moisture content of from about 9% by weight to about 14% by weight, based upon the weight of the coarse fraction.

13. A method as claimed in claim 1 wherein said coarse fraction comprises at least about 60% by weight bran, and at least about 10% by weight germ, based upon the weight of the coarse fraction, and said fine fraction comprises at least about 90% by weight endosperm on a solids basis, and has a particle size distribution of less than about 10% by weight having a particle size of greater than or equal to 500 microns, less than or equal to about 80% by weight having a particle size of less than 149 microns, and about 20% by weight to about 65% by weight having a particle size of less than 500 microns but greater than or equal to 149 microns.

14. A method as claimed in claim 1 wherein said stabilization includes treating said coarse fraction with an edible alkali metabisulfite in a stabilizing amount.

15. A method as claimed in claim 1 wherein said stabilized whole grain flour has a particle size distribution of less than about 10% by weight on a No. 35 (500 micron) U.S. Standard Sieve, and less than about 70% by weight through a No. 100 (149 micron) U.S. Standard Sieve.

16. A method as claimed in claim 1 wherein said stabilized whole grain flour has a particle size distribution of less than about 10% by weight on a No. 35 (500 micron) U.S. Standard Sieve, about 20% by weight to about 40% by weight on a No. 60 (250 micron) U.S. Standard Sieve, about 10% by weight to about 60% by weight on a No. 100 (149 micron) U.S. Standard Sieve, and less than about 70% by weight through a No. 100 (149 micron) U.S. Standard Sieve.

17. A method as claimed in claim 1 wherein said stabilized whole grain flour has a free fatty acid content of less than about 10% by weight of total flour lipids at three months or less than about 3,000 ppm, based upon the weight of the stabilized whole grain flour, and a hexanal content of less than about 10 ppm after 1 month accelerated storage at 95° C., based upon the weight of the stabilized whole grain flour.

18. A method as claimed in claim 1 wherein said stabilized whole grain flour is produced continuously and said stabilization of the coarse fraction is conducted in from about 0.25 minutes to about 12 minutes.

19. A method as claimed in claim 1 wherein said stabilized whole grain flour is a stabilized whole grain wheat flour, a stabilized whole grain corn flour, a stabilized whole grain oat flour, or a stabilized whole grain rice flour.

20. A method as claimed in claim 19 wherein the amount of starch is from about 10% by weight to about 40% by weight, based upon the weight of the coarse fraction.

21. A method as claimed in claim 1 wherein said stabilized whole grain flour is a stabilized whole grain corn flour, a stabilized whole grain oat flour, or a stabilized whole grain rice flour.

22. A method as claimed in claim 1 wherein said stabilization includes treating said coarse fraction with an edible stabilizing agent in a stabilizing amount.

23. A method as claimed in claim 22 wherein said edible stabilizing agent comprises at least one member selected from the group consisting of edible alkali bisulfates, bisulfites, metabisulfites, and metabisulfates, organic acids, sulfur dioxide, cysteine, thioglycolic acid, glutathione, and hydrogen sulfide.

24. A method as claimed in claim 22 wherein said edible stabilizing agent comprises at least one organic acid.

25. A method for making a stabilized whole grain flour comprising:
   a. comminuting whole cereal grains to obtain ground whole cereal grains,
   b. subjecting the ground cereal grains to a separation operation to obtain a coarse fraction comprising bran, germ, and starch, and a fine fraction comprising endosperm, said coarse fraction having a bran content of at least about 50% by weight, based upon the weight of the coarse fraction,
   c. grinding the coarse fraction to obtain a ground fraction having a particle size distribution of at least about 40% by weight having a particle size of greater than or equal to 149 microns, and less than or equal to about 35% by weight having a particle size greater than or equal to 500 microns,
   d. stabilizing the ground fraction by heating to reduce the lipase activity to less than about 3 micromole butyrate free acid formed per hour per 0.1 gram of the stabilized ground fraction, while avoiding an acrylamide content of greater than about 150 ppb, based upon the weight of the stabilized ground fraction, wherein the stabilized, ground coarse fraction has a starch melting enthalpy of greater than about 4 J/g, based upon the weight of starch in the stabilized ground coarse fraction, as measured by differential scanning calorimetry (DSC), at a peak temperature of from about 65° C. to about 70° C., and a sodium carbonate-water solvent retention capacity (SRC sodium carbonate) of less than about 200%, and
   e. combining the fine fraction with the stabilized ground fraction to obtain a stabilized whole grain flour with a lipase activity of less than about 1.5 micromole butyrate free acid formed per hour per 0.1 gram of the stabilized whole grain flour and an acrylamide content of less than about 45 ppb, based upon the weight of the stabilized whole grain flour, wherein said stabilized whole grain flour has a sodium carbonate-water solvent retention capacity (SRC sodium carbonate) of less than about 85%.

26. A method as claimed in claim 25 wherein the amount of starch in said coarse fraction is from about 15% by weight to about 35% by weight, based upon the weight of the coarse fraction.

27. A method as claimed in claim 25 wherein said stabilization includes treating said coarse fraction with an edible stabilizing agent in a stabilizing amount.

28. A method as claimed in claim 27 wherein said edible stabilizing agent comprises at least one member selected from the group consisting of edible alkali bisulfates, bisulfites, metabisulfites, and metabisulfates, organic acids, sulfur dioxide, cysteine, thioglycolic acid, glutathione, and hydrogen sulfide.

29. A method as claimed in claim 27 wherein said edible stabilizing agent comprises at least one organic acid.

30. A method for making a stabilized bran component comprising:
   a. subjecting a coarse fraction comprising bran, germ and starch to grinding or milling to reduce grittiness of the coarse fraction without substantially damaging the starch, the amount of bran being at least about 50% by weight, based upon the weight of the coarse fraction, and
   b. stabilizing the coarse fraction by heating the coarse fraction to substantially reduce the lipase activity of the coarse fraction, the stabilized, ground coarse fraction having a particle size distribution of at least about 40% by weight of the fraction having a particle size of at least 149 microns, and less than or equal to about 35% by weight having a particle size greater than or equal to 500 microns, wherein the stabilized, ground coarse fraction has a starch melting enthalpy of greater than about 4 J/g, based upon the weight of starch in the stabilized ground coarse fraction, as measured by differential scanning calorimetry (DSC), at a peak temperature of from about 65° C. to about 70° C., and a sodium carbonate-water solvent retention capacity (SRC sodium carbonate) of less than about 200%, wherein said stabilized bran component comprises a stabilized wheat bran component, a stabilized corn bran component, a stabilized oat bran component, or a stabilized rice bran component.

31. A method as claimed in claim 30 wherein said stabilizing of the coarse fraction avoids substantial production of acrylamide, while also avoiding substantial loss of tocopherols, thiamin and riboflavin, and maintaining an antioxidant free radical scavenging capacity of not less than about 150 micromoles Trolox equivalents per gram.

32. A method as claimed in claim 30 wherein said coarse fraction is subjected to said grinding or milling before said stabilizing of the coarse fraction.

33. A method as claimed in claim 30 wherein said coarse fraction is subjected to said grinding or milling after said stabilizing of the coarse fraction.

34. A method as claimed in claim 30 wherein the amount of starch is from about 15% by weight to about 35% by weight, based upon the weight of the coarse fraction, and before said grinding or milling the coarse fraction has a particle size distribution of at least about 75% by weight having a particle size of greater than or equal to 500 microns, less than or equal to about 5% by weight having a particle size of less than 149 microns, and about 15% by weight to about 25% by weight having a particle size of less than 500 microns but greater than or equal to 149 microns, and the coarse fraction is ground or milled to obtain a ground or milled fraction or bran component with at least about 40% by weight of the fraction having a particle size greater than or equal to 149 microns, and less than or equal to about 35% by weight having a particle size greater than or equal to 500 microns.

35. A method as claimed in claim 34 wherein said ground or milled fraction or bran component has a particle size distribution of about 0.5% by weight to about 5% by weight greater than or equal to 841 microns, about 10% by weight to about 30% by weight less than 841 microns but greater than or equal to 500 microns, about 25% by weight to about 70% by weight greater than or equal to 149 microns but less than 500 microns, and less than or equal to about 60% by weight less than 149 microns, said percentages adding up to a total of 100% by weight.

36. A method as claimed in claim 30 wherein stabilization of the coarse fraction is by heating which avoids substantial gelatinization of starch contained in the coarse fraction.

37. A method as claimed in claim 30 wherein the lipase activity is reduced to less than about 3 micromole butyrate free acid formed per hour per 0.1 gram of the stabilized coarse fraction.

38. A method as claimed in claim 30 wherein said stabilizing of the coarse fraction avoids an acrylamide content of greater than about 150 ppb, based upon the weight of the stabilized coarse fraction.

39. A method as claimed in claim 30 wherein said stabilization comprises heating at a temperature of from about 100° C. to about 140° C.

40. A method as claimed in claim 39 wherein said coarse fraction which is subjected to said stabilization has a moisture content of from about 9% by weight to about 14% by weight, based upon the weight of the coarse fraction.

41. A method as claimed in claim 30 wherein said coarse fraction comprises at least about 60% by weight bran, and at least about 10% by weight germ, based upon the weight of the coarse fraction.

42. A method for making a stabilized bran component as claimed in claim 30 wherein said stabilized bran component is a stabilized wheat bran component or a stabilized corn bran component.

43. A method for making a stabilized bran component as claimed in claim 30 wherein said stabilized bran component is a stabilized corn bran component, a stabilized oat bran component, or a stabilized rice bran component.

44. A method for making a stabilized bran component as claimed in claim 30 wherein the amount of starch is from about 10% by weight to about 40% by weight, based upon the weight of the coarse fraction.

45. A method as claimed in claim 30 wherein the amount of starch in said coarse fraction is from about 15% by weight to about 35% by weight, based upon the weight of the coarse fraction.

46. A method as claimed in claim 30 wherein said stabilization includes treating said coarse fraction with an edible stabilizing agent in a stabilizing amount.

47. A method as claimed in claim 46 wherein said edible stabilizing agent comprises at least one member selected from the group consisting of edible alkali bisulfates, bisulfites, metabisulfites, and metabisulfates, organic acids, sulfur dioxide, cysteine, thioglycolic acid, glutathione, and hydrogen sulfide.

48. A method as claimed in claim 46 wherein said edible stabilizing agent comprises at least one organic acid.

49. A stabilized bran component comprising a ground or milled, heat-treated coarse fraction comprising bran, germ and starch, the amount of bran being at least about 50% by weight, based upon the weight of the coarse fraction, the stabilized, ground coarse fraction having:
  a. a particle size distribution of at least about 40% by weight of the fraction having a particle size of at least 149 microns, and less than or equal to about 35% by weight having a particle size greater than or equal to 500 microns,
  b. a lipase activity of less than about 3 micromole butyrate free acid formed per hour per 0.1 gram of the stabilized bran component,
  c. an acrylamide content less than or equal to about 150 ppb, based upon the weight of the stabilized bran component,
  d. a starch melting enthalpy of greater than about 4 J/g, based upon the weight of starch in the stabilized ground coarse fraction, as measured by differential scanning calorimetry (DSC), at a peak temperature of from about 65° C. to about 70° C., and
  e. a sodium carbonate-water solvent retention capacity (SRC sodium carbonate) of less than about 200%, wherein said stabilized bran component comprises a stabilized wheat bran component, a stabilized corn bran component, a stabilized oat bran component, or a stabilized rice bran component.

50. A stabilized bran component as claimed in claim 49 wherein the amount of starch is from about 15% by weight to about 35% by weight, based upon the weight of the coarse fraction.

51. A stabilized bran component as claimed in claim 49 wherein said ground or milled fraction or bran component has a particle size distribution of about 0.5% by weight to about 5% by weight greater than or equal to 841 microns, about 10% by weight to about 30% by weight less than 841 microns but greater than or equal to 500 microns, about 25% by weight to about 70% by weight greater than or equal to 149 microns but less than 500 microns, and less than or equal to about 60% by weight less than 149 microns, said percentages adding up to a total of 100% by weight.

52. A stabilized bran component as claimed in claim 49 wherein said coarse fraction comprises at least about 60% by weight bran, and at least about 10% by weight germ, based upon the weight of the coarse fraction.

53. A stabilized bran component as claimed in claim 49 wherein said stabilized bran component is a stabilized wheat bran component, and the amount of starch is from about 10% by weight to about 40% by weight, based upon the weight of the coarse fraction.

54. A stabilized bran component as claimed in claim 49 wherein said stabilized bran component is a stabilized corn bran component, a stabilized oat bran component, or a stabilized rice bran component, and the amount of starch is from about 10% by weight to about 40% by weight, based upon the weight of the coarse fraction.

55. A stabilized bran component as claimed in claim 49 made from grains comprising whole soft white wheat berries, oats, corn, or rice.

56. A stabilized whole grain flour comprising bran, germ and endosperm, wherein only a portion of the endosperm is subjected to heat stabilization and at least a substantial portion of the bran and germ is subjected to stabilization by heating, the stabilized whole grain flour having a particle size distribution of less than about 10% by weight on a No. 35 (500 micron) U.S. Standard Sieve, the starch melting enthalpy of the starch contained in the stabilized whole grain wheat flour being greater than about 4 J/g, based upon the weight of starch in the stabilized whole grain flour, as measured by differential scanning calorimetry (DSC), at a peak temperature of from about 65° C. to about 70° C., and the stabilized whole grain wheat flour having a sodium carbonate-water solvent retention capacity (SRC sodium carbonate) of less than about 85%.

57. A stabilized whole grain flour as claimed in claim 56 wherein the lipase activity is less than about 1.5 micromole butyrate free acid formed per hour per 0.1 gram of the stabilized whole grain flour, and the acrylamide content is less than about 45 ppb, based upon the weight of stabilized whole grain flour.

58. A stabilized whole grain flour as claimed in claim 56 having a particle size distribution of less than about 5% by weight on a No. 35 (500 micron) U.S. Standard Sieve, and less than about 70% by weight through a No. 100 (149 micron) U.S. Standard Sieve.

59. A stabilized whole grain flour as claimed in claim 56 having a particle size distribution of less than about 10% by weight on a No. 35 (500 micron) U.S. Standard Sieve, about 20% by weight to about 40% by weight on a No. 60 (250 micron) U.S. Standard Sieve, about 10% by weight to about 60% by weight on a No. 100 (149 micron) U.S. Standard Sieve, and less than about 70% by weight through a No. 100 (149 micron) U.S. Standard Sieve.

60. A stabilized whole grain flour as claimed in claim 56 having a free fatty acid content of less than about 10% by weight of total flour lipids at three months or less than about 3,000 ppm, based upon the weight of the stabilized whole grain flour, and a hexanal content of less than about 10 ppm after 1 month accelerated storage at 95° C., based upon the weight of the stabilized whole grain flour.

61. A stabilized whole grain flour as claimed in claim 56 which is a stabilized whole grain wheat flour, a stabilized whole grain corn flour, a stabilized whole grain oat flour, or a stabilized whole grain rice flour.

62. A stabilized whole grain flour as claimed in claim 56 which is a stabilized whole grain corn flour, a stabilized whole grain oat flour, or a stabilized whole grain rice flour.

63. A stabilized whole grain flour comprising bran, germ and endosperm, the stabilized whole grain flour having:
   a. a lipase activity of less than about 1.5 micromole butyrate free acid formed per hour per 0.1 gram of the stabilized whole grain flour,
   b. an acrylamide content less than about 45 ppb, based upon the weight of stabilized whole grain flour,
   c. a particle size distribution of less than about 10% by weight on a No. 35 (500 micron) U.S. Standard Sieve, and less than about 70% by weight through a No. 100 (149 micron) U.S. Standard Sieve,
   d. a starch melting enthalpy of the starch contained in the stabilized whole grain wheat flour of greater than about 4 J/g, based upon the weight of starch in the stabilized whole grain flour, as measured by differential scanning calorimetry (DSC), at a peak temperature of from about 65° C. to about 70° C., and
   e. a sodium carbonate-water solvent retention capacity (SRC sodium carbonate) of less than about 85%.

64. A stabilized whole grain flour as claimed in claim 63 having a particle size distribution of less than about 10% by weight on a No. 35 (500 micron) U.S. Standard Sieve, about 20% by weight to about 40% by weight on a No. 60 (250 micron) U.S. Standard Sieve, about 10% by weight to about 60% by weight on a No. 100 (149 micron) U.S. Standard Sieve, and less than about 70% by weight through a No. 100 (149 micron) U.S. Standard Sieve.

65. A stabilized whole grain flour as claimed in claim 63 having a free fatty acid content of less than about 10% by weight of total flour lipids at three months or less than about 3,000 ppm, based upon the weight of the stabilized whole grain flour, and a hexanal content of less than about 10 ppm after 1 month accelerated storage at 95° C., based upon the weight of the stabilized whole grain flour.

66. A stabilized whole grain flour as claimed in claim 63 made from grains comprising whole white wheat berries, oats, corn, or rice.

67. A stabilized whole grain flour as claimed in claim 63 made from grains comprising whole red wheat berries, oats, corn, or rice.

68. A food product comprising a stabilized bran component as claimed in claim 49.

69. A food product comprising a stabilized whole grain flour as claimed in claim 63.

70. A farinaceous food product comprising a stabilized whole grain flour of claim 63.

71. A biscuit product comprising a stabilized whole grain flour of claim 63.

72. A food product selected from the group consisting of bakery products and snack foods, wherein the food product includes a stabilized whole grain flour of claim 63.

73. A food product as claimed in claim 72 wherein the food product is a bakery product selected from the group consisting of cookies, crackers, pizza crusts, pie crusts, breads, bagels, pretzels, brownies, muffins, waffles, pastries, cakes, quickbreads, sweet rolls, donuts, fruit and grain bars, tortillas, and par-baked bakery products.

74. A food product as claimed in claim 72 wherein the food product is selected from the group consisting of cookies, crackers, and cereal crunch bars.

75. A food product as claimed in claim 74 wherein the food product is a cookie.

76. A food product as claimed in claim 75 wherein the cookie has a cookie spread of at least about 130% of the original prebaked dough diameter, as measured according to the AACC 10-53 bench-top method.

77. A stabilized whole grain flour as claimed in claim 63 which is a stabilized whole grain wheat flour, a stabilized whole grain corn flour, a stabilized whole grain oat flour, or a stabilized whole grain rice flour.

78. A stabilized whole grain flour as claimed in claim 63 which is a stabilized whole grain corn flour, a stabilized whole grain oat flour, or a stabilized whole grain rice flour.

79. A stabilized whole grain wheat flour as claimed in claim 63 made from berries comprising whole soft white wheat berries, oats, corn, or rice.

80. A method for making a stabilized whole grain flour comprising:
   a. subjecting a coarse fraction comprising bran, germ and starch to grinding or milling to reduce grittiness of the coarse fraction without substantially damaging the starch, the amount of bran being at least about 50% by weight, based upon the weight of the coarse fraction,
   b. stabilizing the coarse fraction by heating the coarse fraction and/or by treatment of the course fraction with an edible stabilizing agent to substantially reduce the lipase activity of the coarse fraction, wherein the stabilized, ground coarse fraction has a starch melting enthalpy of greater than about 4 J/g, based upon the weight of starch in the stabilized ground coarse fraction, as measured by differential scanning calorimetry (DSC), at a peak temperature of from about 65° C. to about 70° C., and a sodium carbonate-water solvent retention capacity (SRC sodium carbonate) of less than about 200%, and
   c. combining the stabilized coarse fraction with a fine fraction comprising endosperm to obtain a stabilized whole grain flour, wherein said stabilized whole grain flour has a sodium carbonate-water solvent retention capacity (SRC sodium carbonate) of less than about 85%.

81. A method as claimed in claim 80 wherein said edible stabilizing agent comprises at least one member selected from the group consisting of edible alkali bisulfates, bisulfites, metabisulfites, and metabisulfates, organic acids, sulfur dioxide, cysteine, thioglycolic acid, glutathione, and hydrogen sulfide.

82. A method as claimed in claim 80 wherein said edible stabilizing agent comprises at least one organic acid.

* * * * *

UNITED STATES PATENT AND TRADEMARK OFFICE
CERTIFICATE OF CORRECTION

PATENT NO. : 8,173,193 B2  Page 1 of 1
APPLICATION NO. : 12/302665
DATED : May 8, 2012
INVENTOR(S) : Haynes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 419 days.

Signed and Sealed this
Thirteenth Day of November, 2012

David J. Kappos
*Director of the United States Patent and Trademark Office*